United States Patent
Iyer et al.

(10) Patent No.: US 12,096,356 B2
(45) Date of Patent: Sep. 17, 2024

(54) UE POWER SAVINGS IN MULTI-BEAM OPERATION

(71) Applicant: InterDigital Patent Holdings, Inc., Wilmington, DE (US)

(72) Inventors: Lakshmi R. Iyer, King of Prussia, PA (US); Qing Li, Princeton Junction, NJ (US); Patrick Svedman, Stockholm (SE); Guodong Zhang, Woodbury, NY (US); Mohamed Awadin, Plymouth Meeting, PA (US); Yifan Li, Conshohocken, PA (US); Allan Y. Tsai, Boonton, NJ (US); Pascal M. Adjakple, Great Neck, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 264 days.

(21) Appl. No.: 17/765,494

(22) PCT Filed: Oct. 2, 2020

(86) PCT No.: PCT/US2020/053934
§ 371 (c)(1),
(2) Date: Mar. 31, 2022

(87) PCT Pub. No.: WO2021/067690
PCT Pub. Date: Apr. 8, 2021

(65) Prior Publication Data
US 2022/0369225 A1    Nov. 17, 2022

Related U.S. Application Data

(60) Provisional application No. 62/909,993, filed on Oct. 3, 2019.

(51) Int. Cl.
*H04W 52/02*   (2009.01)
*H04L 5/00*    (2006.01)

(52) U.S. Cl.
CPC ....... *H04W 52/0216* (2013.01); *H04L 5/0053* (2013.01)

(58) Field of Classification Search
CPC ......... H04W 52/0225; H04W 52/0209; H04W 52/143; H04W 52/0216; H04W 76/28;
(Continued)

(56) References Cited

U.S. PATENT DOCUMENTS 11,212,747 B2 *  12/2021  Zhou .................. H04W 76/15
11,438,775 B2 *   9/2022  Cirik .................. H04W 72/53
(Continued)

FOREIGN PATENT DOCUMENTS

WO    2018/228487 A1    12/2018

OTHER PUBLICATIONS

M. Khoshnevisan, K. Jayasinghe, R. Chen, A. Davydov and L. Guo, "Enhanced Reliability and Capacity with Multi-TRP Transmission," in IEEE Communications Standards Magazine, vol. 6, No. 1, pp. 13-19, Mar. 2022, doi: 10.1109/MCOMSTD.0001.2100059. (Year: 2022).*
(Continued)

*Primary Examiner* — William D Cumming
(74) *Attorney, Agent, or Firm* — Flaster Greenberg PC

(57) ABSTRACT

Methods, systems, and devices may enable UE power savings in multi-beam connectivity using multi-TRPs or multi-UE panels. Methods, systems, and devices may enable PDCCH skipping in the active duration of the UE by skipping PDCCH monitoring associated with groups of CORESETs.

19 Claims, 35 Drawing Sheets

(58) Field of Classification Search
CPC ..... H04W 76/15; H04W 72/53; H04W 72/23; H04W 74/0833
See application file for complete search history.

(56) References Cited

U.S. PATENT DOCUMENTS

| | | | |
|---|---|---|---|
| 11,895,584 B2* | 2/2024 | Zhou | H04W 52/143 |
| 2020/0029316 A1* | 1/2020 | Zhou | H04W 74/0833 |
| 2020/0314747 A1* | 10/2020 | Zhou | H04W 52/143 |
| 2020/0351682 A1* | 11/2020 | Cirik | H04L 5/0091 |
| 2022/0078707 A1* | 3/2022 | Zhou | H04W 76/28 |
| 2022/0279442 A1* | 9/2022 | Luo | H04W 76/28 |
| 2022/0369225 A1* | 11/2022 | Iyer | H04W 52/0216 |
| 2022/0417775 A1* | 12/2022 | Cirik | H04L 1/0025 |
| 2023/0090764 A1* | 3/2023 | Zhou | H04W 52/0209 713/320 |
| 2024/0031931 A1* | 1/2024 | Bala | H04W 52/0225 |
| 2024/0137864 A1* | 4/2024 | Zhou | H04W 72/23 |

OTHER PUBLICATIONS

CATT: "Power saving signal/channel design and performance", 3GPP TSG RAN WG1 Meeting #98, R1-1908605, Aug. 17, 2019, Aug. 26, 2019.

\* cited by examiner

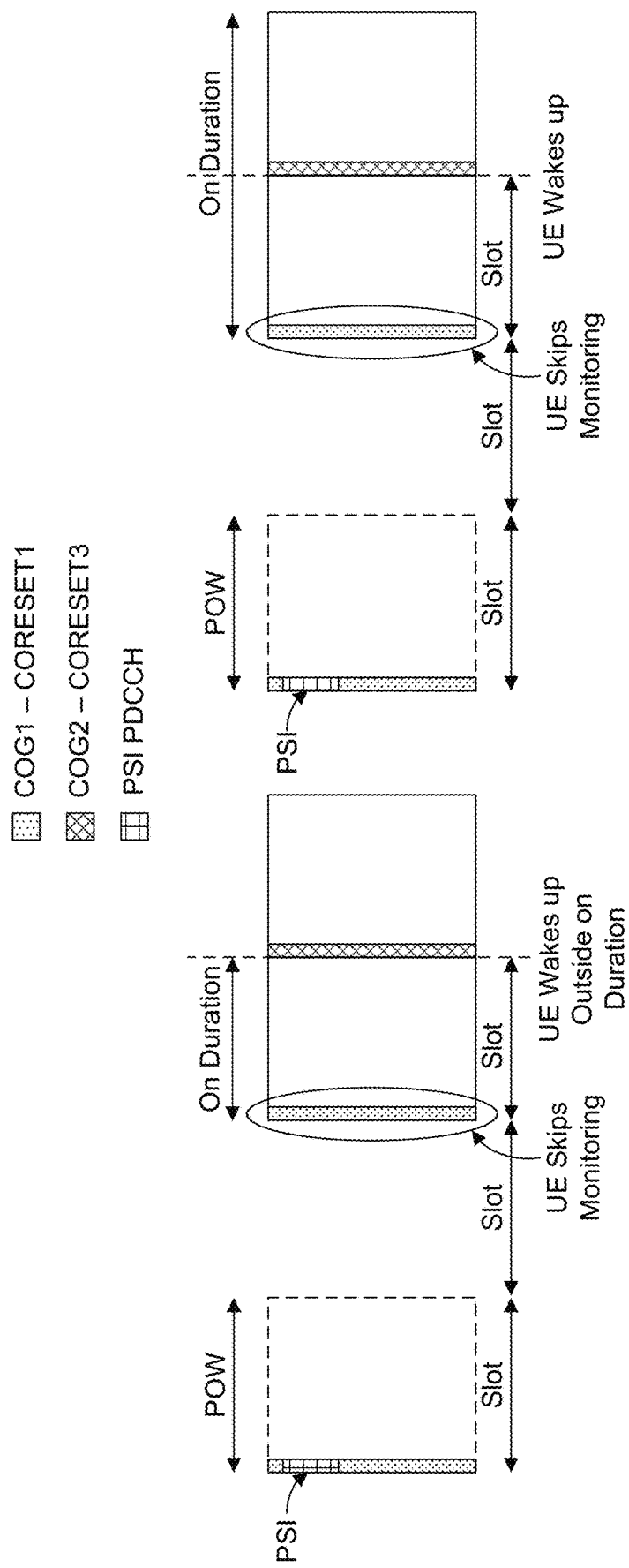

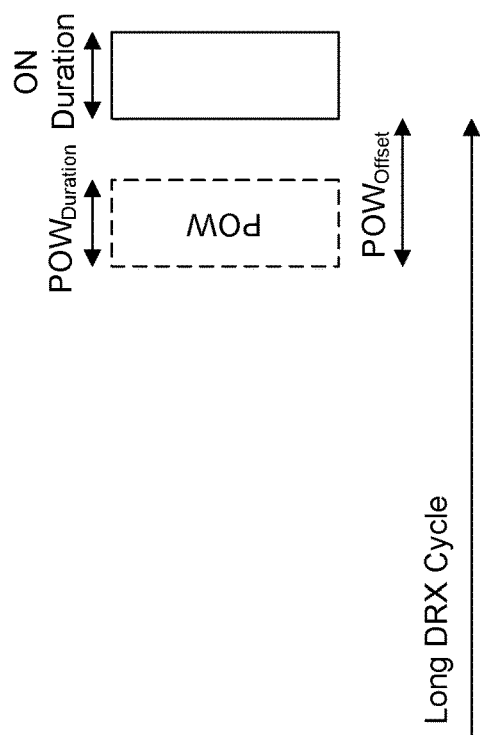 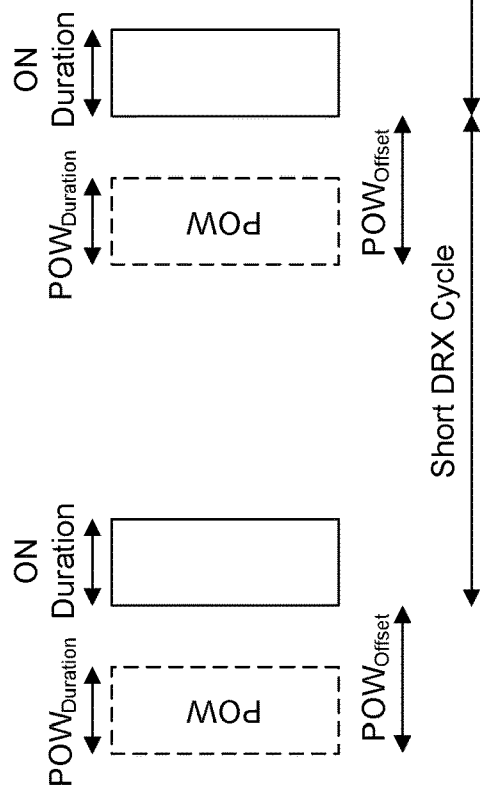
FIG. 11A
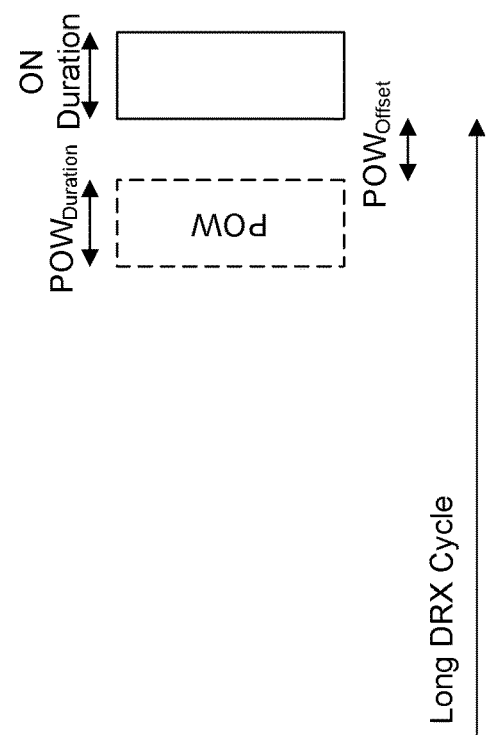 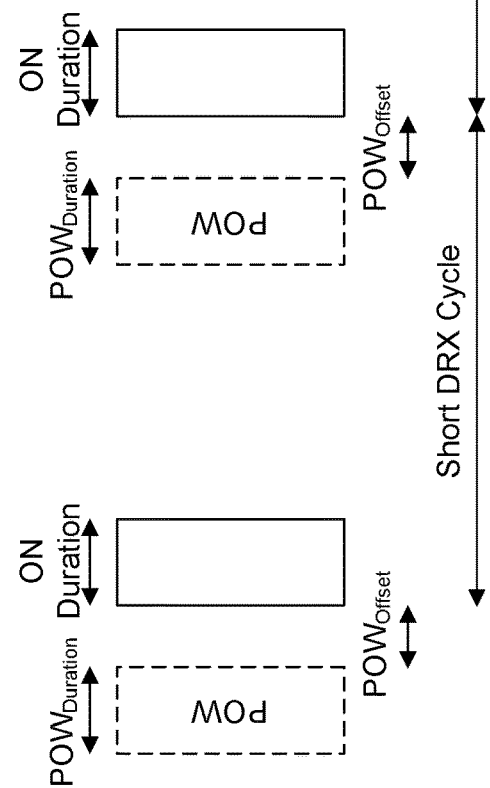
FIG. 11B

UE POWER SAVINGS IN MULTI-BEAM OPERATION

CROSS-REFERENCE TO RELATED APPLICATIONS

This application is the National Stage Application of International Patent Application No. PCT/US2020/053934, filed Oct. 2, 2020, which claims the benefit of U.S. Provisional Patent Application No. 62/909,993, filed Oct. 3, 2019, entitled "UE Power Savings in Multi-Beam Operations", the contents of which are hereby incorporated by reference herein.

BACKGROUND

UE Power Savings.

PDCCH monitoring is a primary source of excess power consumption in the RRC-CONNECTED state and can be improved by reducing excessive PDCCH monitoring. The power savings can come by avoiding unnecessary PDCCH decoding especially if the UE is not being scheduled. The discontinuous reception (DRX) framework was introduced to allow the UE to sleep for significant periods of time to reduce power consumption. Here, the UE wakes up and monitors PDCCH during the ON Duration. If it does not receive a grant in the ON Duration, it goes back to sleep. If it receives a grant, it sets the DRX inactivity Timer and continues to monitor PDCCH until the timer expires or the network signals it to sleep through a MAC CE. The UE resets the inactivity timer every time it receives a grant. However, this did not address excessive PDCCH monitoring within the UE's active time which may include the ON duration and the period when the inactivity timer is running.

A power savings indication (PSI) may be considered to indicate if a UE must wake up for the On Duration of a DRX cycle or if the UE can skip monitoring in the On Duration. This indication is signaled outside the active time of the UE. The concept is shown in FIG. 1.

A power savings indication (PSI) may also be considered to indicate a power savings configuration within the active time of the UE to change the cross-slot scheduling parameters so that UE can save power by optimizing its processing and avoiding unnecessary and early buffering of PDSCH. K0 and K2 parameters for indicating the grant-to-PDSCH and grant-to-PUSCH timing can be set in a way that enables low power consumption. With small values of minimum K0 and minimum K2, the power consumption is usually higher. This is because the UE does not know the actual K0 and K2 values which are signaled in the DCI until it finishes the decoding, but it must plan to buffer the symbols according to the minimum values of K0 or process the transport block according to the minimum value of K2. Smaller K0 and K2 values are preferred for URLLC and larger values suffice for eMBB.

Multi-TRP and Multi-Panel Transmissions.

Increased diversity and robustness are achieved by both ideal and non-ideal backhaul networks using multi-Transmission and Reception Point (TRP) and multi-panel transmissions and receptions.

A panel may be a group of physical antennas for transmission or reception. A panel may be a logical entity to which a set of physical antennas are mapped. In some cases, a panel (for transmission) is associated with a transmitter chain. In some cases, a panel (for transmission) is associated with multiple transmitter chains. In some cases, a panel (for reception) is associated with a receiver chain. In some cases, a panel (for reception) is associated with multiple receiver chains. In some cases, the Tx beams on different panels for transmission (of a TRP or a UE) can be controlled independently. In some cases, the Rx beams on different panels for transmission (of a TRP or a UE) can be controlled independently. A group of physical antennas for transmission corresponding to a panel may be the same as a group of physical antennas for reception corresponding to a panel. This could mean that the panels for transmission and the panels for reception (of a TRP or UE) correspond to the same groups of physical antennas. In other cases, however, some or all of the panels for transmission (of a TRP or UE) correspond to different groups of physical antennas than the panels for reception. In some cases, the number of panels for transmission and the number of panels for reception are the same in a TRP or UE, and in other cases the number is different. In some cases, panels may point in different directions, e.g. provide different transmission or reception directivity, for example since the physical antennas of a panel have the same (or similar) directivity, while physical antennas of different panels may have different directivity. In some cases, the physical antennas of a panel are mounted on a plane, e.g. a 2-D physical plane comprising M rows and N columns of cross-polarized physical antenna pairs, where example numbers could be M=1, 2, 4, 8 and N=1, 2, 4, 8 in various combinations.

In a multi-TRP network, the UE communicates with multiple TRPs as shown in FIG. 2. Typically, the TRPs are accessed by the UE on different transmit and receive beams. A TRP may be equipped with one or multiple panels for transmission or reception. In some cases, the term TRP and panel can be used inter-changeably. In some cases, different TRPs may refer to geographically separated points for transmission or reception, for example separated by ten meters or more. In some cases, the multiple panels of a TRP are also physically separated, for example by a few meters or less. In some cases, different panels of a TRP point in different directions, e.g. provide different transmission or reception directivity. Therefore, for simplicity, the term "TRP" as used herein may refer to a single- or multi-panel TRP or to one or more panels of a TRP. The terms network-side panel refers to panels on the TRP.

Also, a UE may be equipped with one or multiple panels. The panels of a UE may also be physically separated or provide different directivity. For example, the two panels of a mobile phone UE may have phone front and phone back directivity, respectively. Therefore, for simplicity, the term "panel" as used herein may refer to a panel of a UE.

Multi-panel transmissions, wherein a UE may transmit from multiple panels is known to provide increased spectral efficiency—the transmissions from the panels may be coherent or non-coherent. The concept of multi-panel transmission is shown in FIG. 3. Each UE panel is assumed to have a different orientation, and therefore the best beam and or TRP for reception may be different for each UE panel.

Ideal backhaul such as point-to-point connection using optical fiber allows very high throughput and very low latency between TRPs and the core network. However, non-ideal backhaul such as xDSL, microwave, and relay networks can have a latency of several 10s of ms in the network.

The latency may determine the extent of scheduling flexibility of a TRP. It is advantageous to allow A/N for TRP1's transmissions to be sent separately to TRP1 and A/N for TRP2's transmissions to be sent separately to TRP2. Accordingly support for multiple HARQ ACK codebooks was introduced to support separate A/N transmissions to multiple TRPs. Latency in some deployments may tolerate joint A/N transmission in response to PDSCH from multiple TRPs to a single TRP.

Generally, the higher the back-haul latency, the greater the need to enable independent scheduling decisions at the TRPs. Accordingly, the state of art is evaluating the problems associated with dynamic BWP switching triggered independently by multiple TRPs. This can cause some ambiguity if a UE is switched to BWP1 but TRP2 which needs to schedule the UE is not aware that the UE is operating in BWP1. Similarly, when TRP1 sends a preemption indication dynamically, it will typically not have the knowledge of the preemption status of TRP2 in a non-ideal back haul network.

Multi-Beam Operation in FR2 and Higher Frequencies.

In FR2 frequencies, multiple antenna elements are used to beam-form narrow beams to attain sufficient range. The link quality may be highly sensitive to the device orientation and slight rotations may cause significant degradation in signal power. So, for reliability and robustness against blockage, a UE may maintain multiple beam connections with multiple TRPs.

This background information is provided to reveal information believed by the applicant to be of possible relevance to the present invention. No admission is necessarily intended, nor should be construed, that any of the preceding information constitutes prior art against the present invention.

SUMMARY

In a multi-beam network, where a UE monitors grants on a number of beams (which may be from multiple TRPs, or from a single TRP providing increased robustness), the UE may have to perform significant PDCCH processing which can result in excessive power consumption. Disclosed herein are methods, systems, and devices that enable UE power savings in multi-beam connectivity using multi-TRPs or multi-UE panels. Methods, systems, and devices are described to enable PDCCH skipping in the active duration of the UE by skipping PDCCH monitoring associated with groups of CORESETs. For UE power savings, the disclosed methods, systems, and devices may reduce excessive PDCCH monitoring across the beams.

The below examples alone or in combination, may address some of the UE power saving issues. In an example, Multiple CORESETs may be grouped into a CORESET-Group (COG).

In an example, the PSI is transmitted as a control information in a search space associated with a CORESET.

In an example, UE is instructed to sleep in order to skip monitoring a COG in the active time or wake up to monitor a COG in the active time through a power-savings indication (PSI) that is monitored in the pre-OnDuration-Window (POW) occurring prior to the DRX ON Duration.

In an example, the CORESETs in a COG may correspond to transmissions from a single TRP.

In an example, the CORESETs in a COG may correspond to the receptions of single panel of the UE.

In an example, the CORESETs in a COG may correspond to multiple CORESETs grouped based on UE feedback.

In an example, a CORESET may belong to multiple COGs.

In an example, a UE may be configured with multiple COGs.

In an example, the COGs are configured to the UE through RRC signaling.

In an example, a CORESET from a COG in which the PSI is received outside the active time indicates the UE to perform power savings as per that PSI in the CORESETs in the COG within the active time.

In an example, a CORESET from a COG in which the PSI is received within the active time indicates the UE to perform power savings as per that PSI in the CORESETs in that COG within the active time.

In an example, a PSI received on a CORESET1 from a COG1 may indicate the UE power savings behavior (e.g., sleep/skip/wake up) on COG2 to which CORESET1 does not belong to.

In an example, PSI indicated in COG1 inside or outside the active time may indicate the sleep/wake-up state for COG2 in the active time.

In an example, PSI received outside the active time may indicate the UE to skip monitoring occasions of a CORESET or a COG or TRP or panel within the active time.

In an example, PSI received in active time may indicate the UE to skip PDCCH monitoring in N successive monitoring occasions where the occasion belongs to one CORESET or one COG or one TRP or one panel.

In an example, if the PSI outside the active time indicates a UE to skip monitoring CORESET1, the UE need not monitor CORESET1 even if it is within the ON Duration of the DRX cycle.

In an example, if the PSI outside the active time indicates a UE to wake up to monitoring CORESET1 occasions, but CORESET1 occasions do not occur within the ON Duration, the UE continues to monitor after the ON Duration even if does not receive a grant in the ON Duration.

In an example, a single PSI may provide the power savings indication for multiple CORESETs or COGs or TRPs or panels.

In an example, the PSI received outside the active time may be common to multiple UEs, with the PSI instruction for each UE in a separate field.

In an example, if a UE does not receive PSI for a pre-determined or pre-configured duration, it may perform one or more beam management procedures such as beam alignment, beam failure detection, and beam failure recovery.

In an example, the POW is configured as an offset from the DRX On-duration. The POW may include one or more PDCCH monitoring occasions from one or more beams.

In an example, multiple POWs may be configured to a UE.

In an example, POW parameters such as offset and duration may depend on whether the POW precedes the short DRX cycle or the long DRX cycle.

In an example, minimum values of grant-to-PDSCH (K0) and grant-to-PUSCH (K2) times may be indicated to the UE during the active time. Different K0 and K2 values may be applied to different CORESETs or COGs or TRPs or panels.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

Figure 11C:
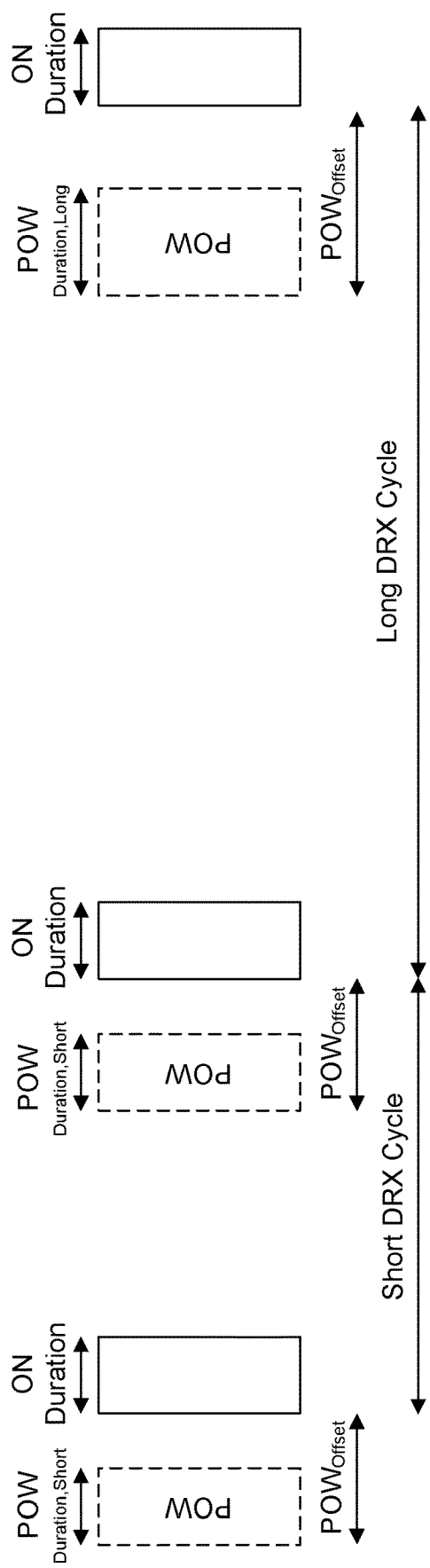
Figure 11D:
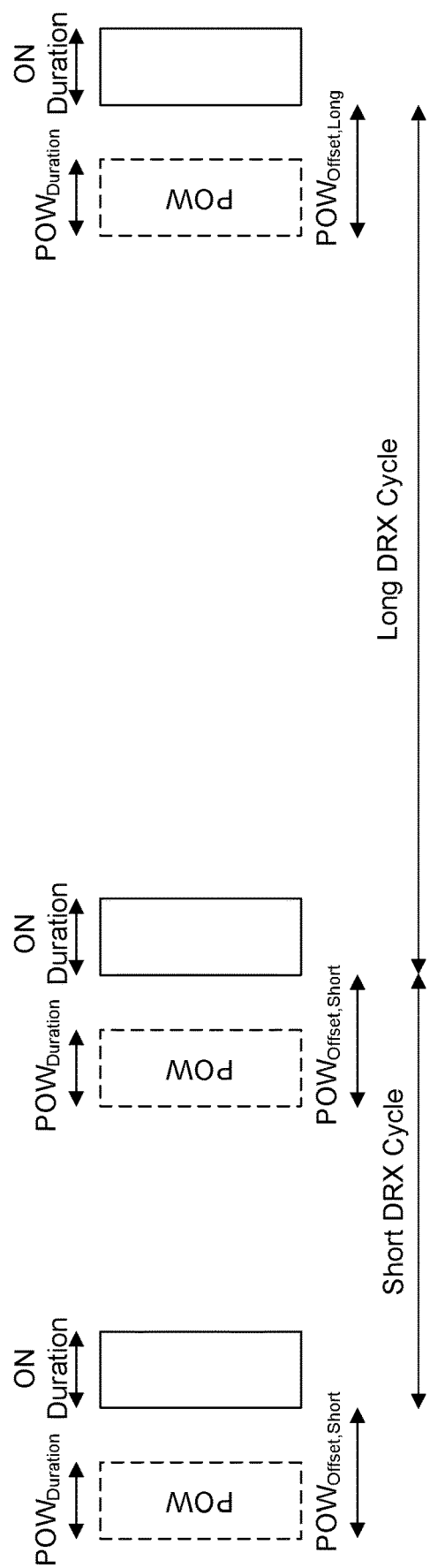
Figure 11E:
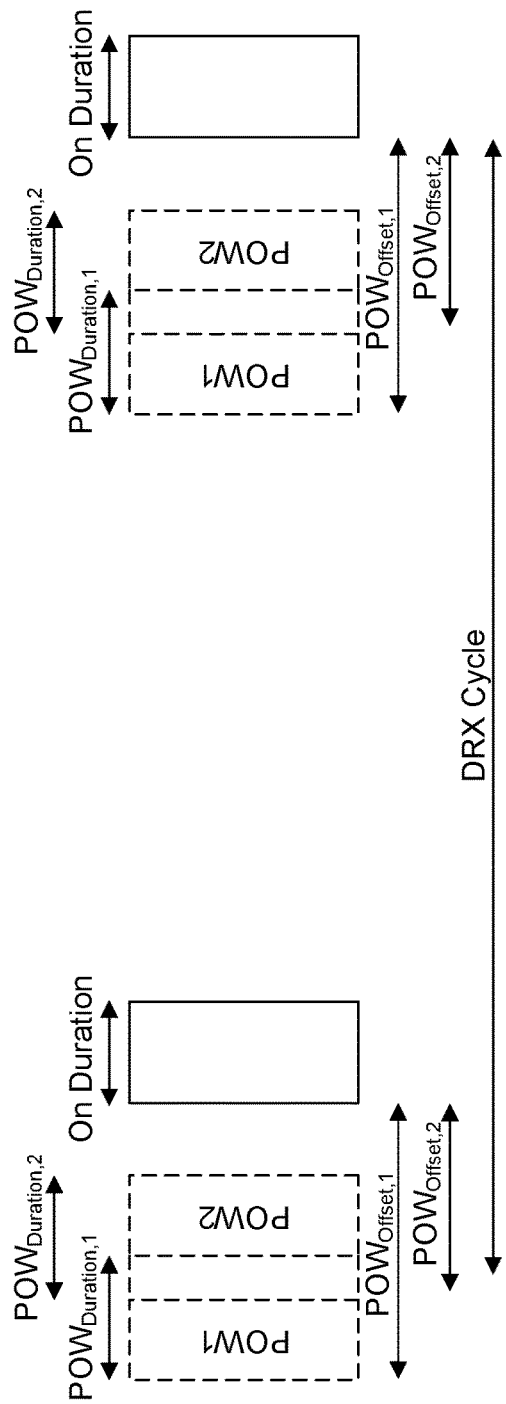
Figure 11F:
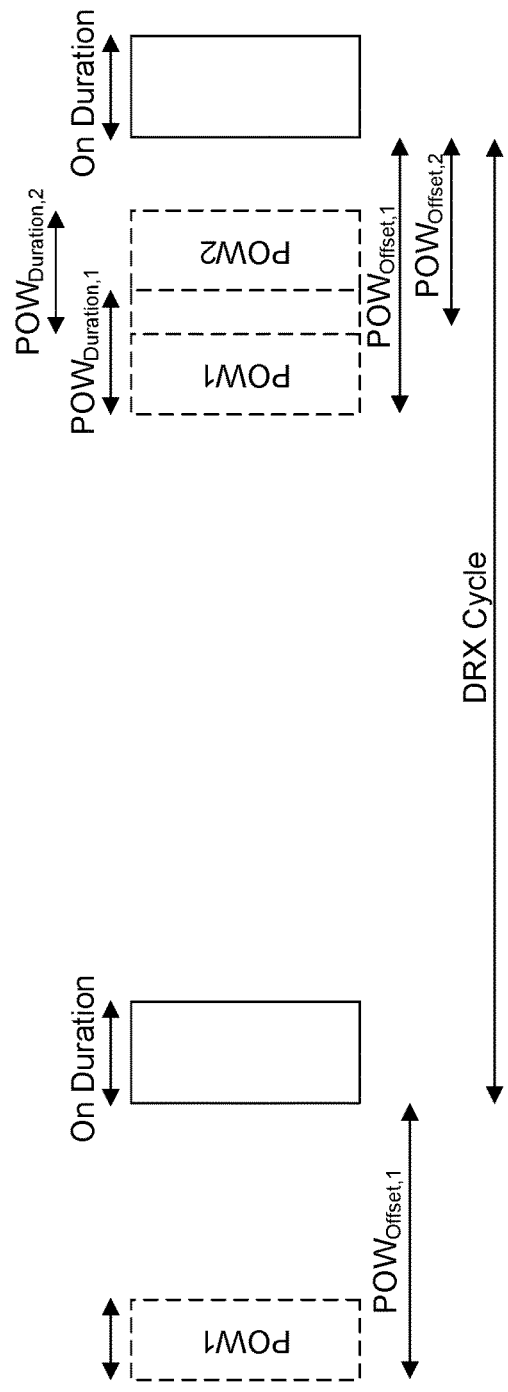
Figure 12:
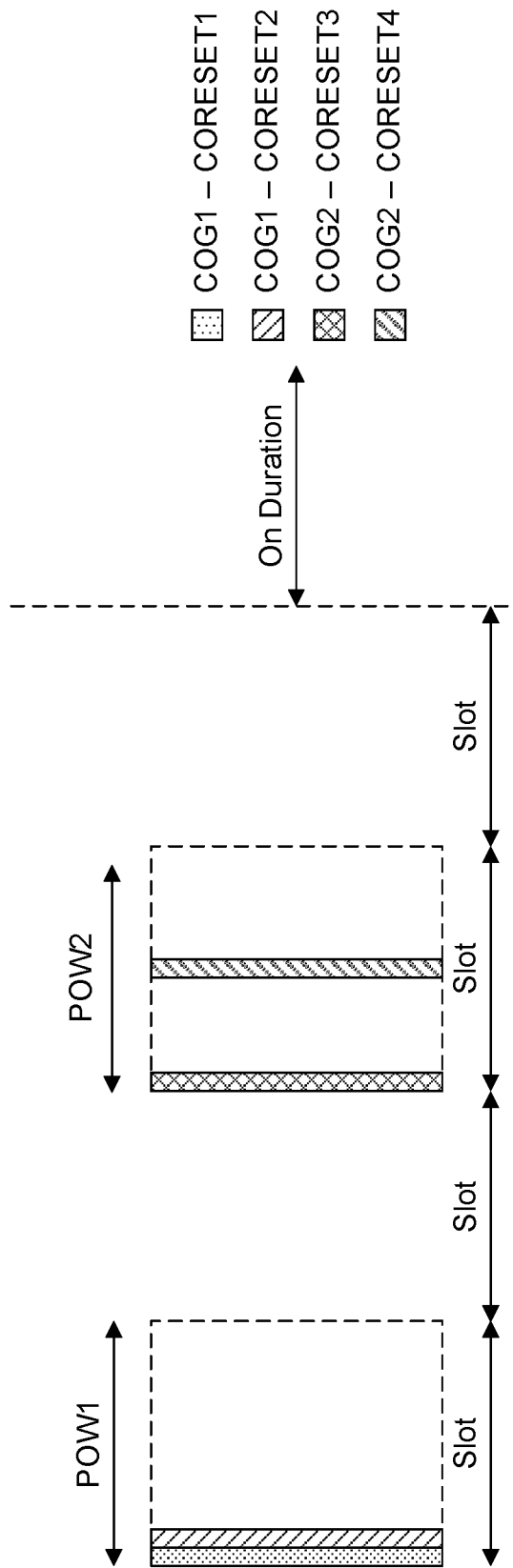
Figure 13A:
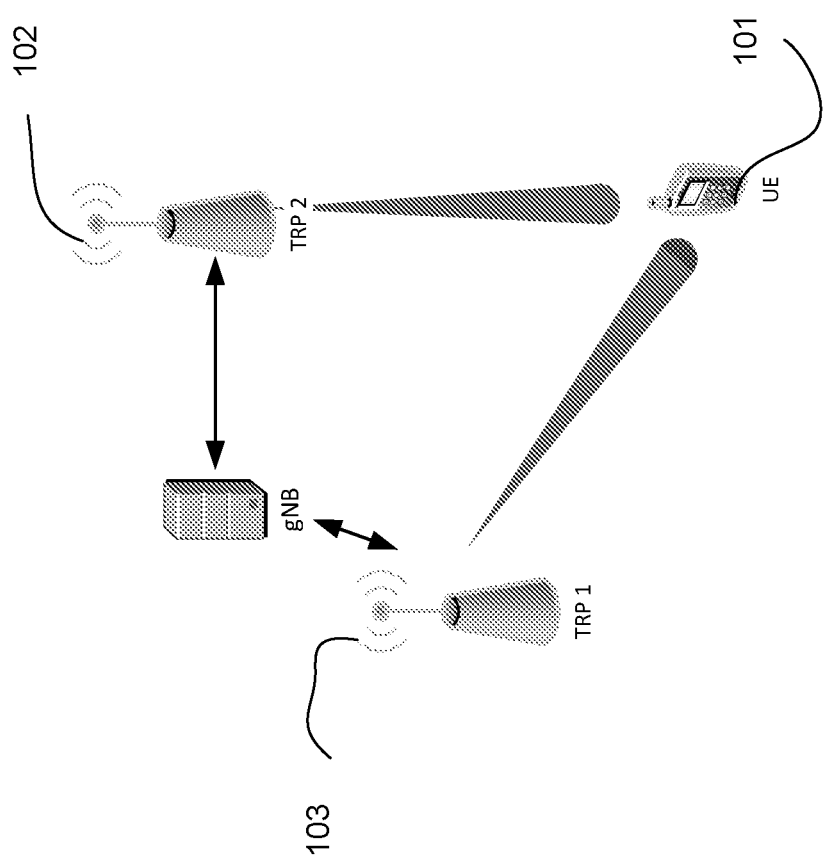
Figure 13B:
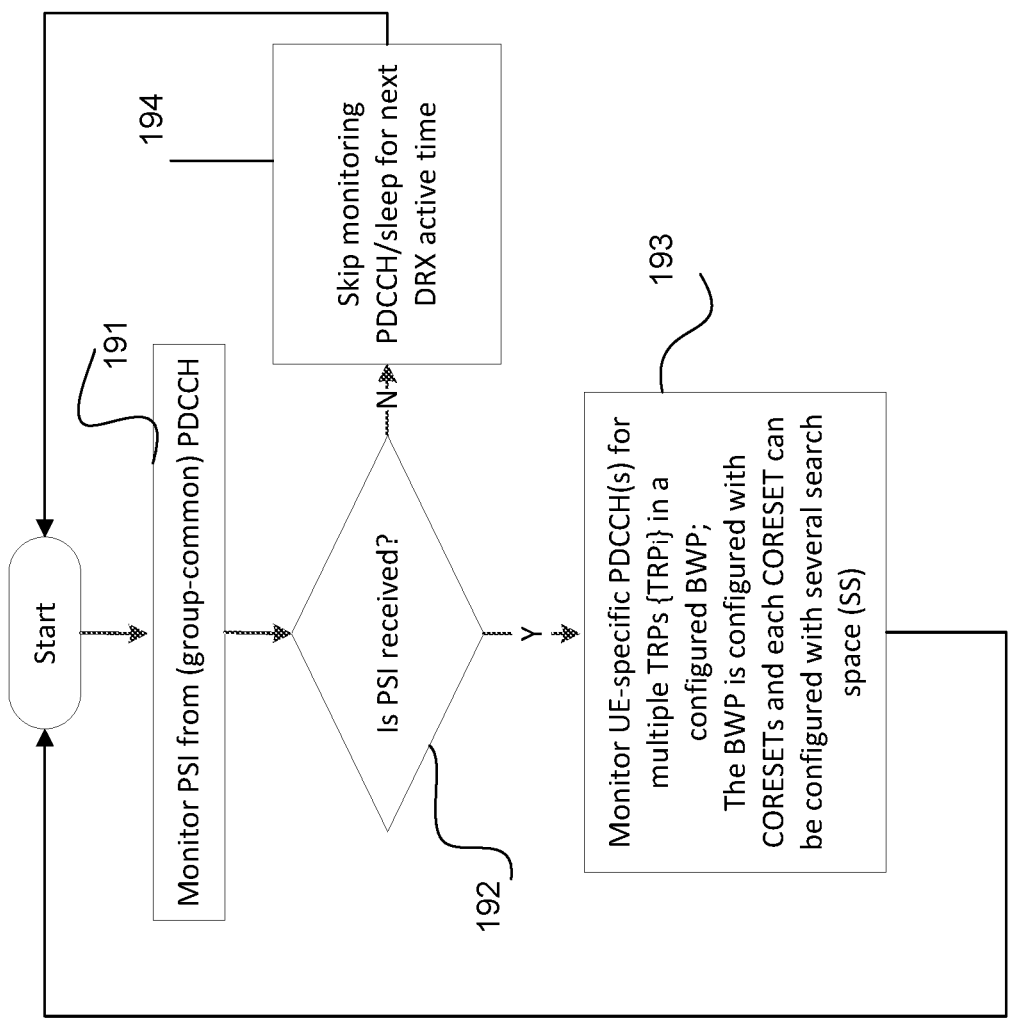
Figure 13C:
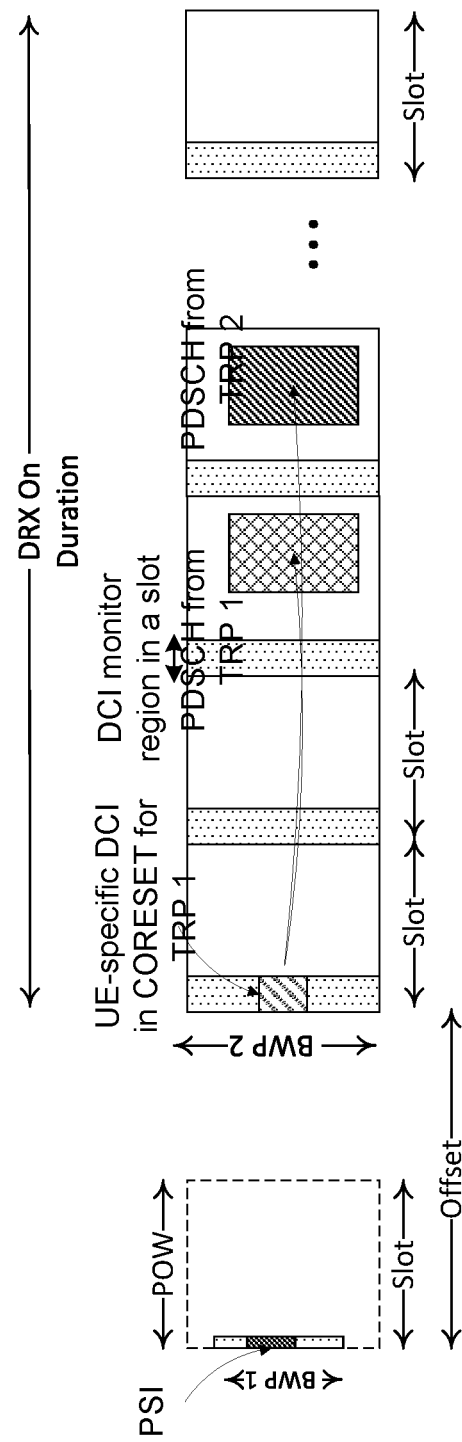
Figure 13D:
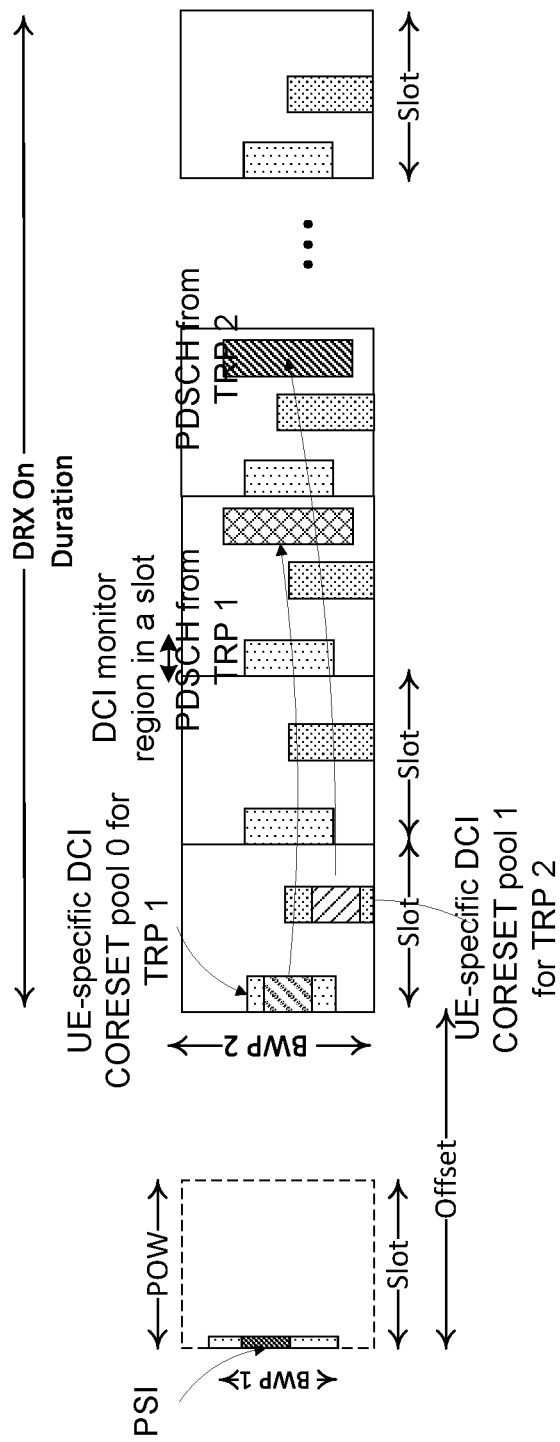
Figures 14A, 14B:
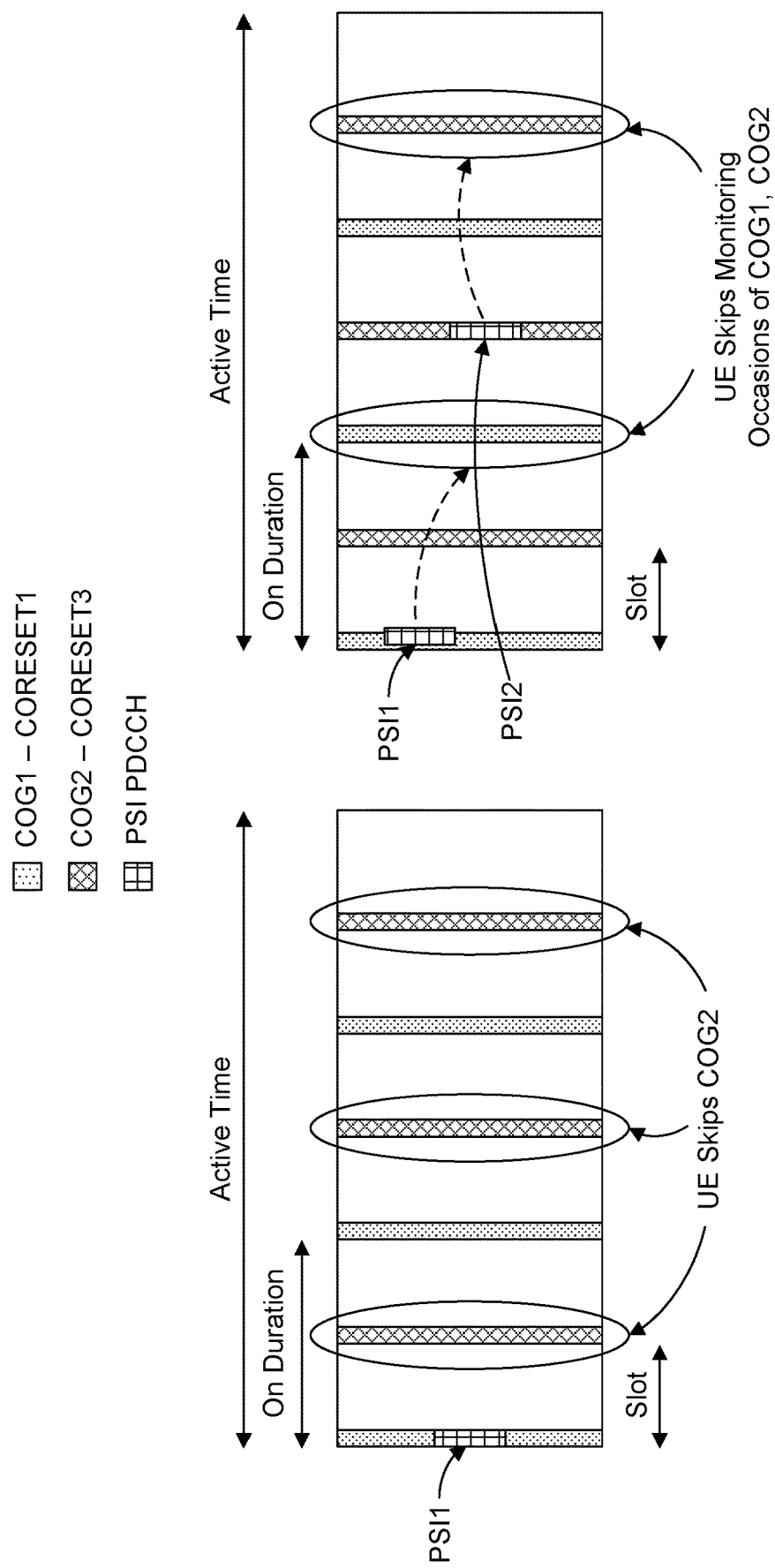
Figures 15A, 15B:
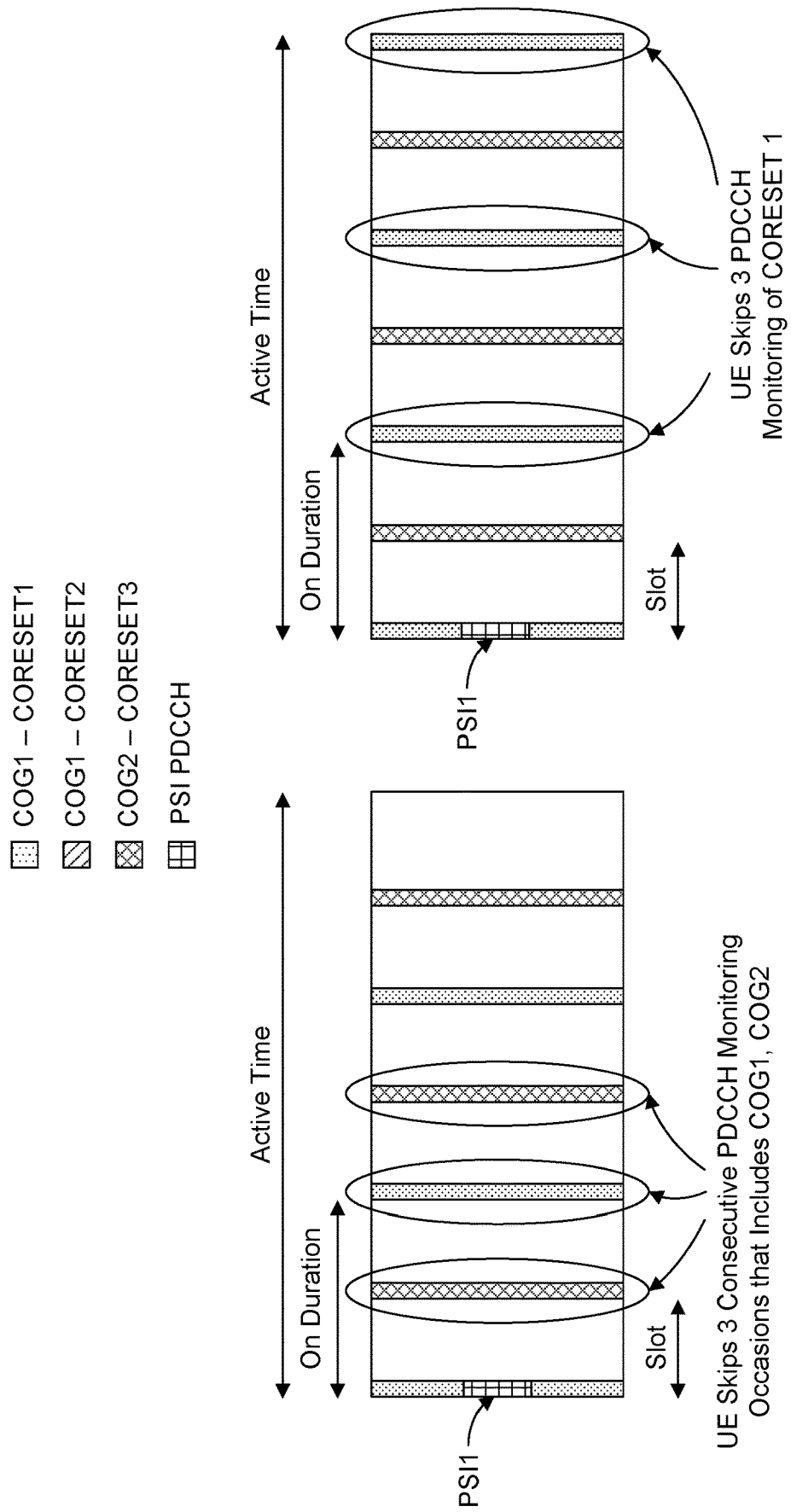
Figure 15C:
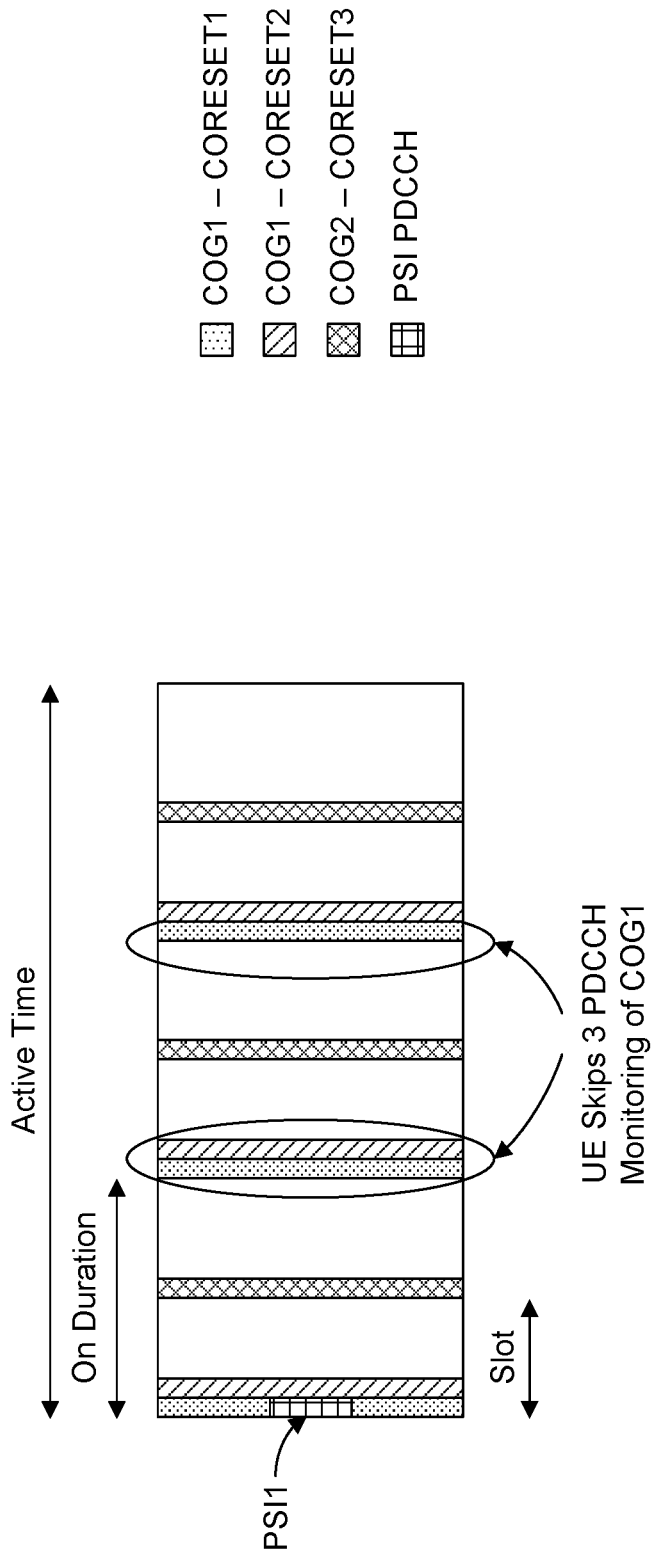
Figure 16:
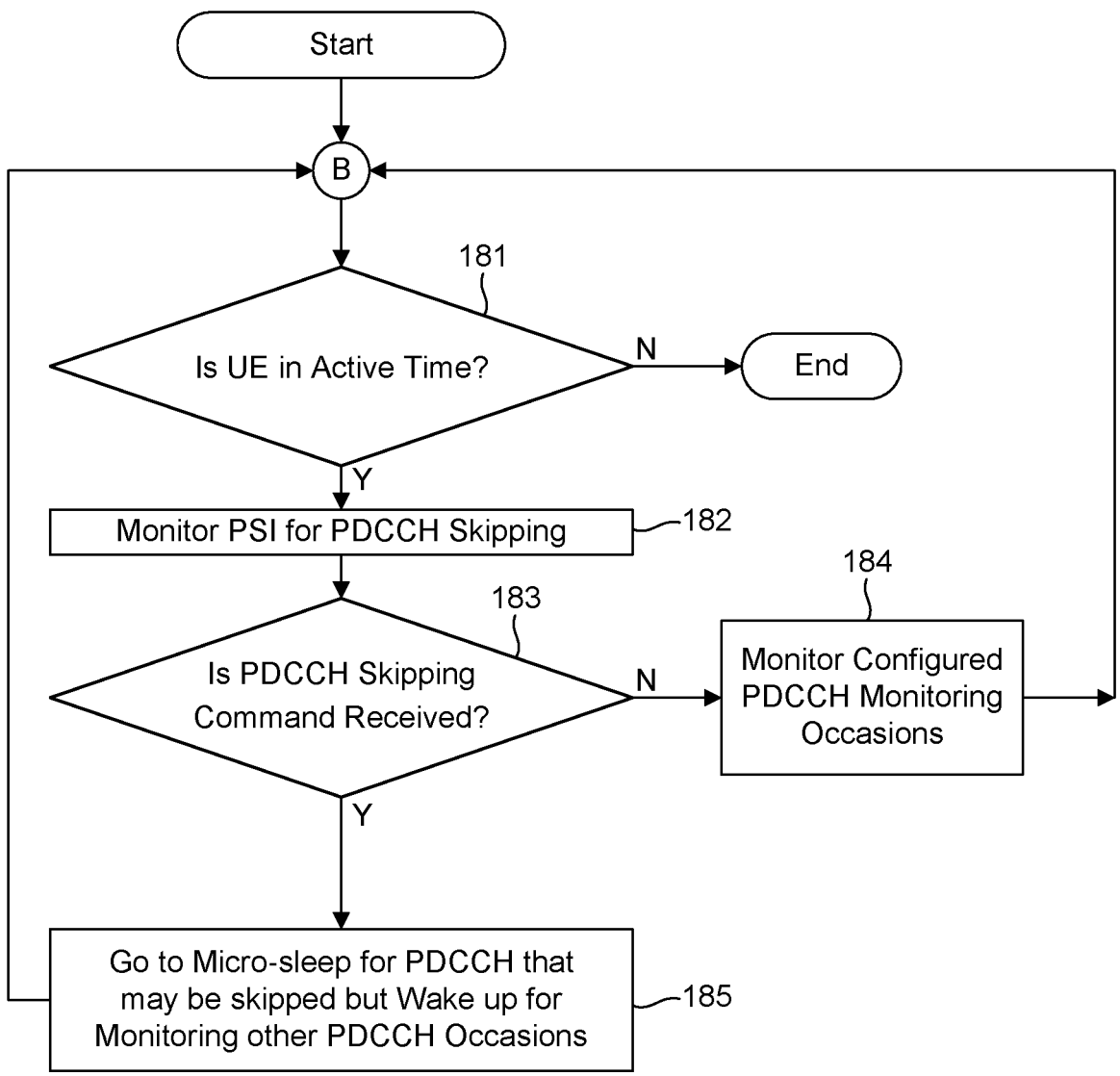
Figures 17A, 17B:
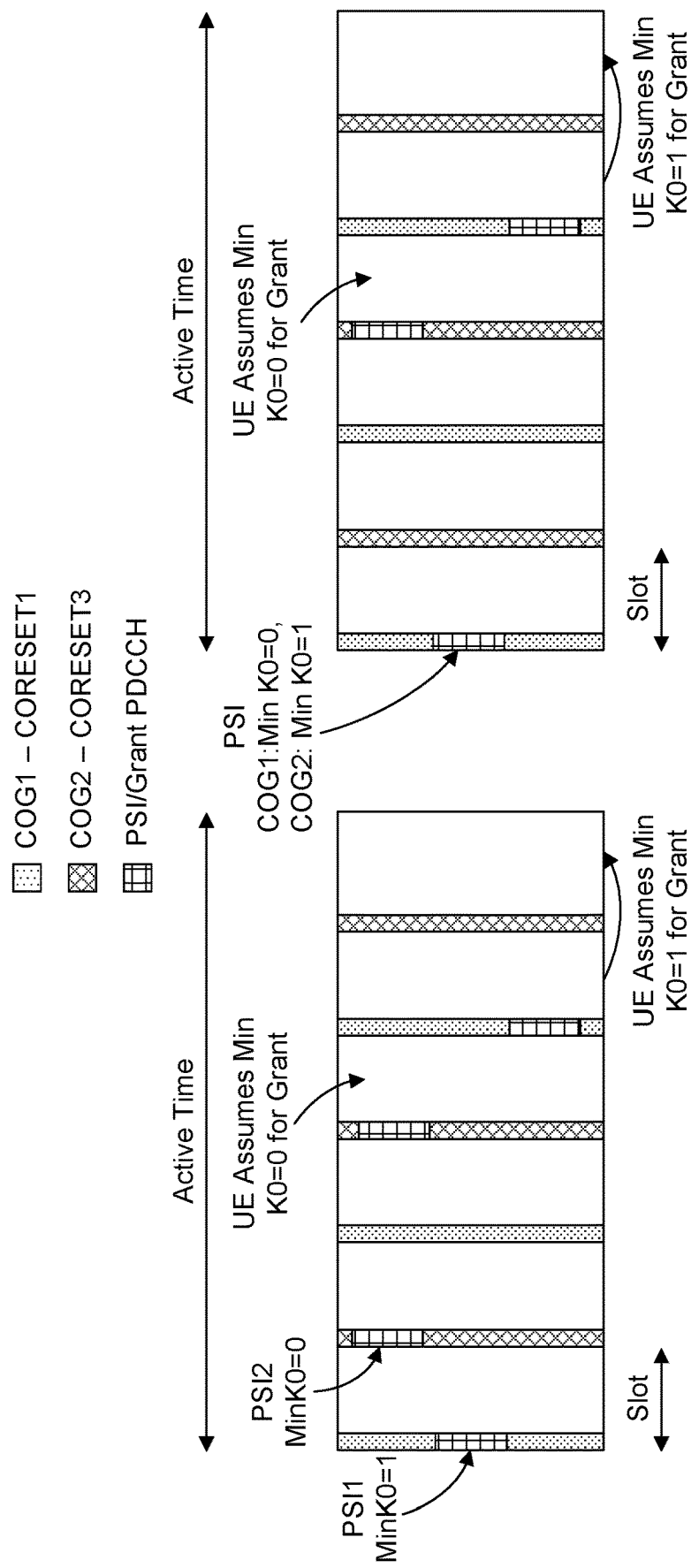
Figure 18:
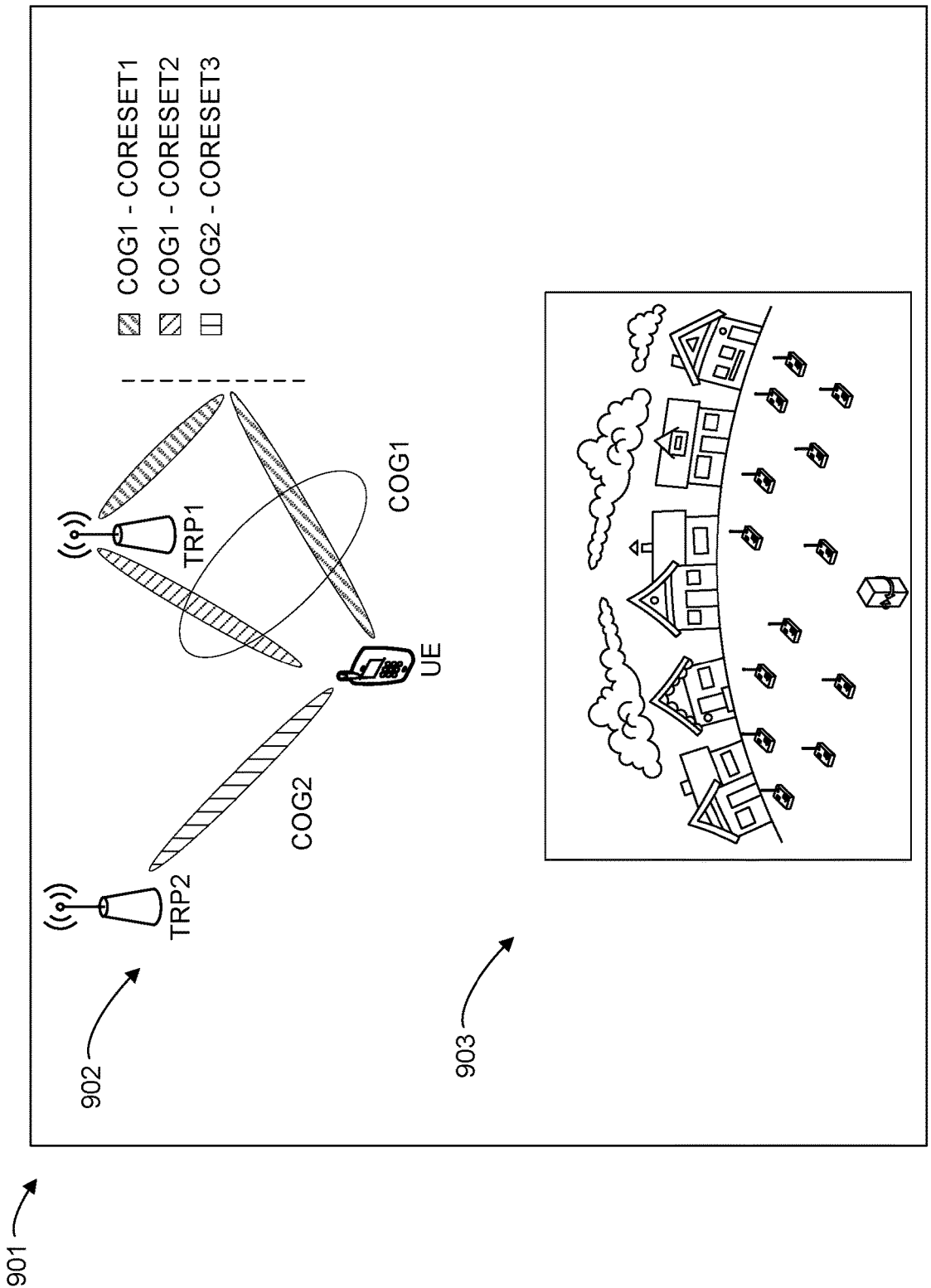

FIG. TOA illustrates a single PSI indicating UE to monitor COG2 and skip COG1 (A) UE wakes up to monitor COG2, whose first monitoring occasion occurs outside the ONDuration;

FIG. 10 illustrates a single PSI indicating UE to monitor COG2 and skip COG1 (B) UE wakes up to monitor COG2 in the middle of the ON Duration;

FIG. 11A illustrates configuration of POW in which offset indicates the start of the POW relative to the On Duration;

FIG. 11B illustrates configuration of POW in which offset indicates the end of the POW relative to the On Duration;

FIG. 11C illustrates configuration of POW for long and short POW durations;

FIG. 11D illustrates configuration of POW for long and short POW offsets;

FIG. 11E illustrates configuration of POW for multiple POWs;

FIG. 11F illustrates configuration of POW for multiple POWs used with certain DRX cycles;

FIG. 12 illustrates POW configuration for UE—POW1 corresponds to TRP1's beams in COG1 and POW2 corresponds to TRP2's beams in COG2;

FIG. 13A illustrates an exemplary system for UE power savings in multi-beam operation;

FIG. 13B illustrates an exemplary method for UE power savings in multi-beam operation;

FIG. 13C illustrates an exemplary system for UE power savings in multi-beam operation in which UE monitors PDCCH for PSI in the POW;

FIG. 13D illustrates an exemplary system for UE power savings in multi-beam operation in which UE monitors PDCCH for PSI in the POW;

FIG. 14A illustrates PSI indication for PDCCH skipping in active time (A) If PSI (grant) is not received in ON Duration from a TRP, the UE skips that TRP's CORESETs;

FIG. 14B illustrates PSI indication for PDCCH skipping in active time (B) PSI from one TRP indicates PDCCH skipping on its own CORESET;

FIG. 15A illustrates PDCCH skipping methods in which UE skips consecutive monitoring occasions which may include different COGs;

FIG. 15B illustrates PDCCH skipping methods in which UE skips successive monitoring occasions of a specific CORESET;

FIG. 15C illustrates PDCCH skipping in which UE skips successive monitoring occasions of a COG;

FIG. 16 illustrates UE procedure for skipping PDCCH monitoring based on received PSI:

FIG. 17A illustrates minimum K0 value indication per COG—separate PSI per COG;

FIG. 173 illustrates minimum K0 value indication per COG—common PST for COG1 and COG2;

FIG. 18 illustrates an exemplary display that may be generated based on the methods, systems, and devices of UE power savings in multi-beam, operation.

Figure 19A:
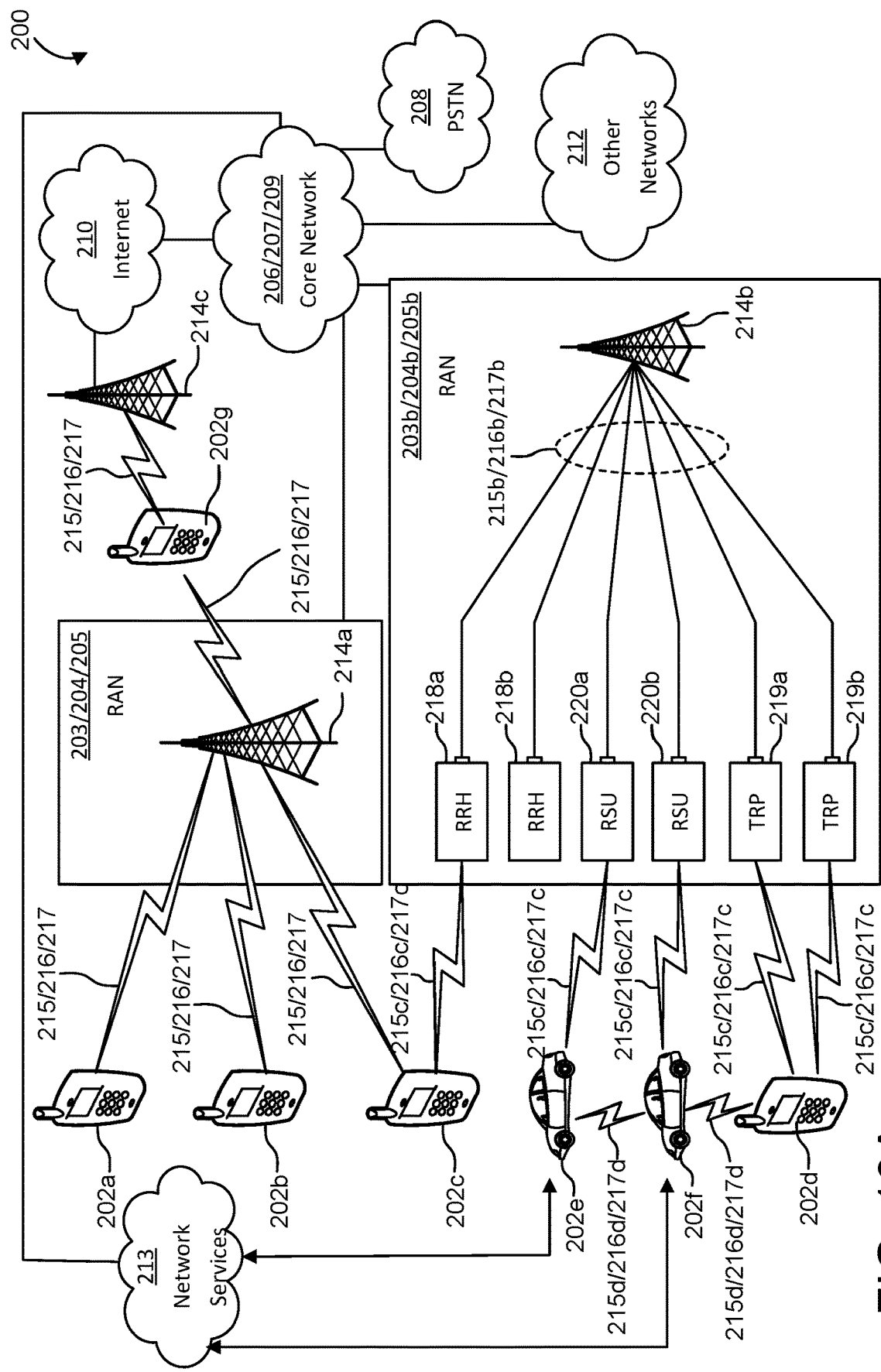
Figure 19B:
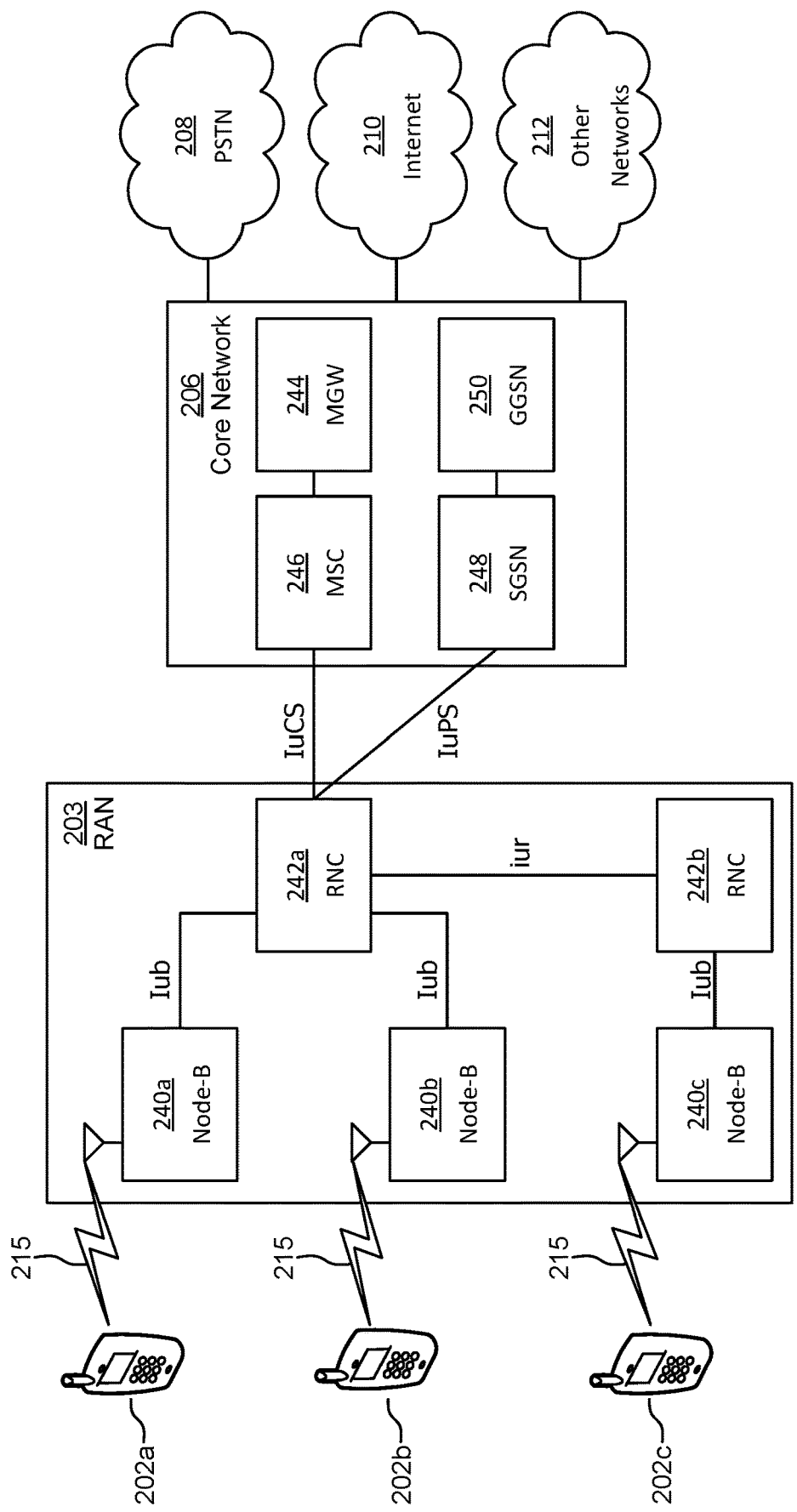
Figure 19C:
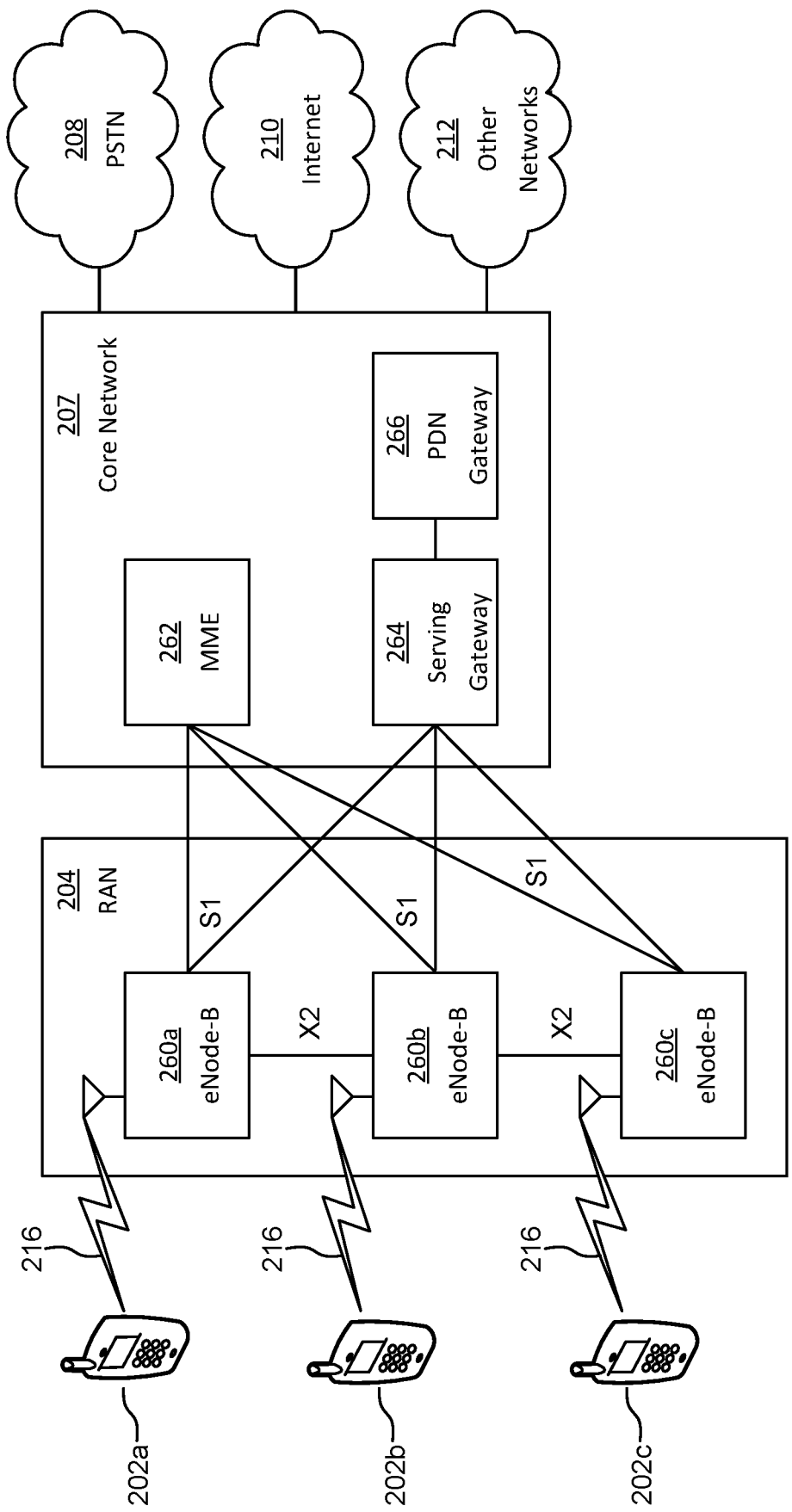
Figure 19D:
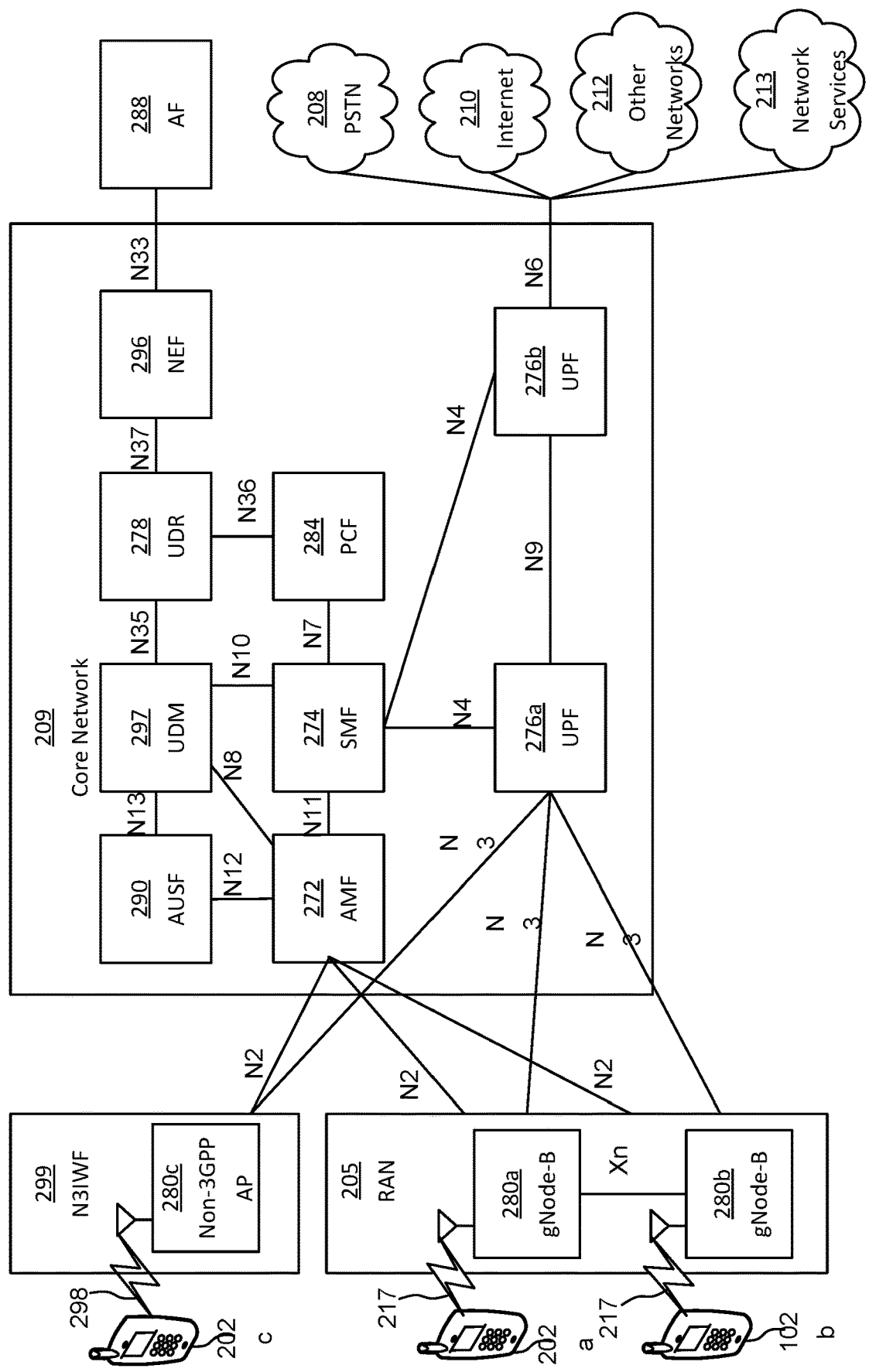
Figure 19E:
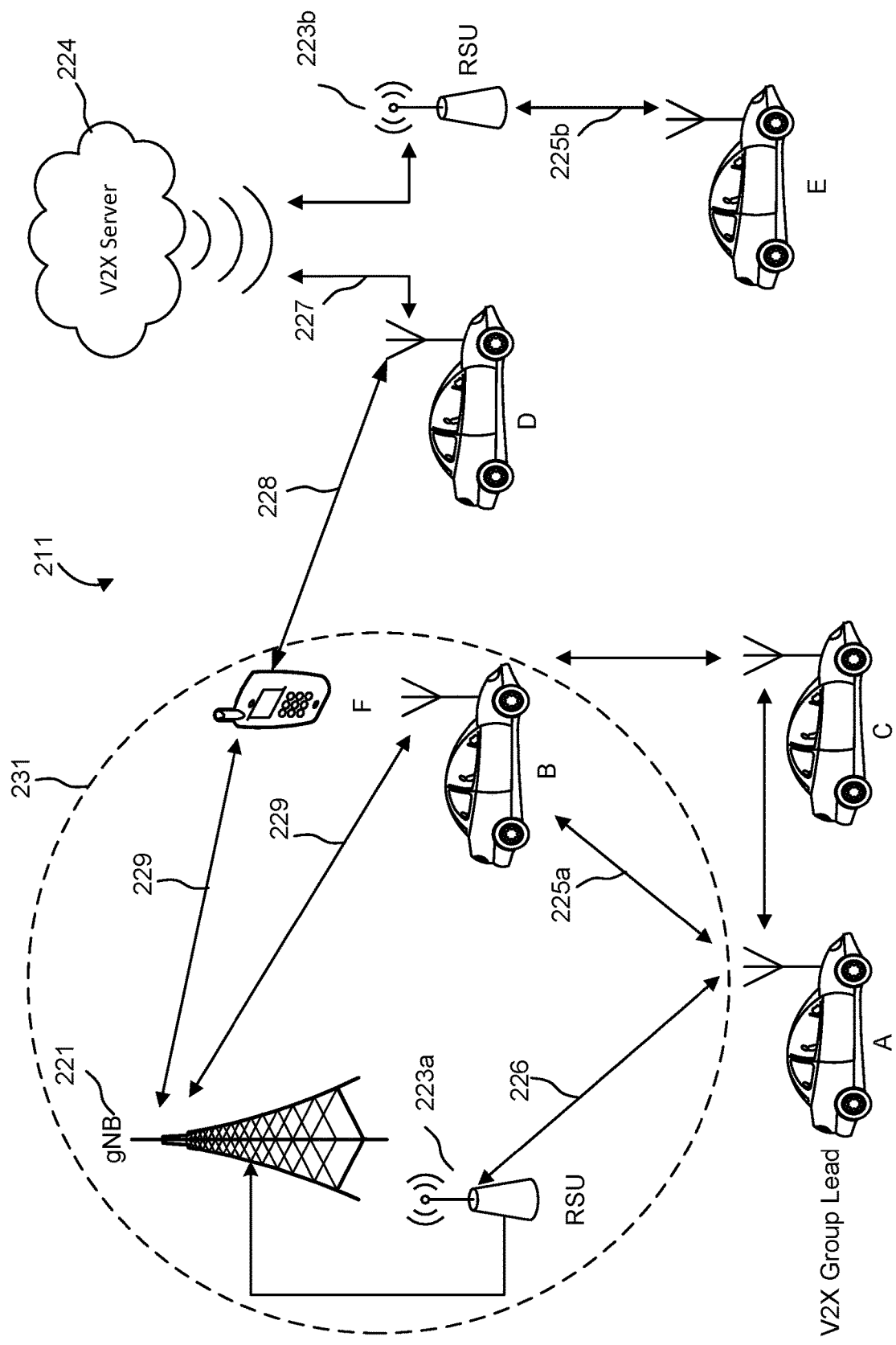
Figure 19F:
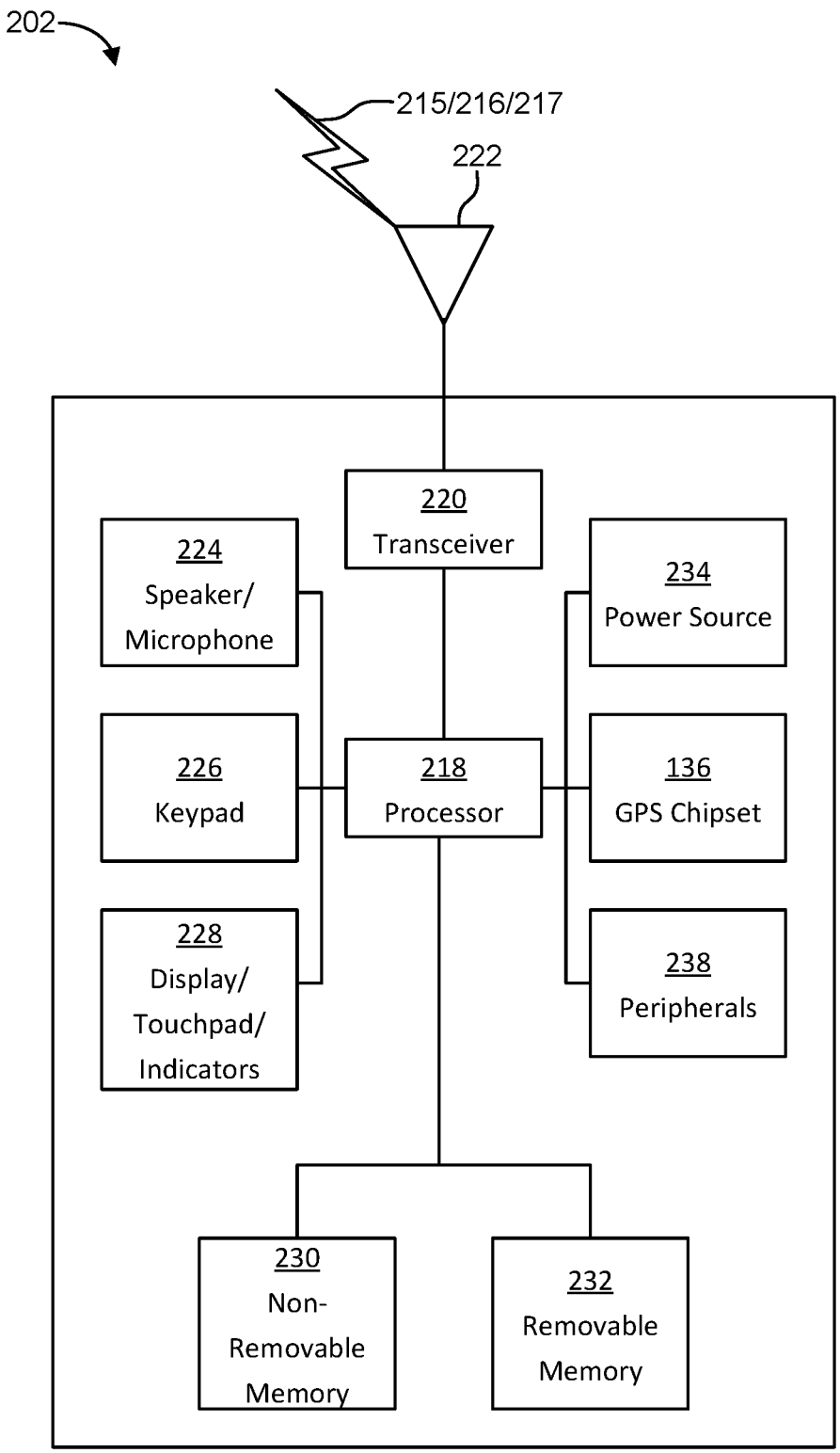
Figure 19G:
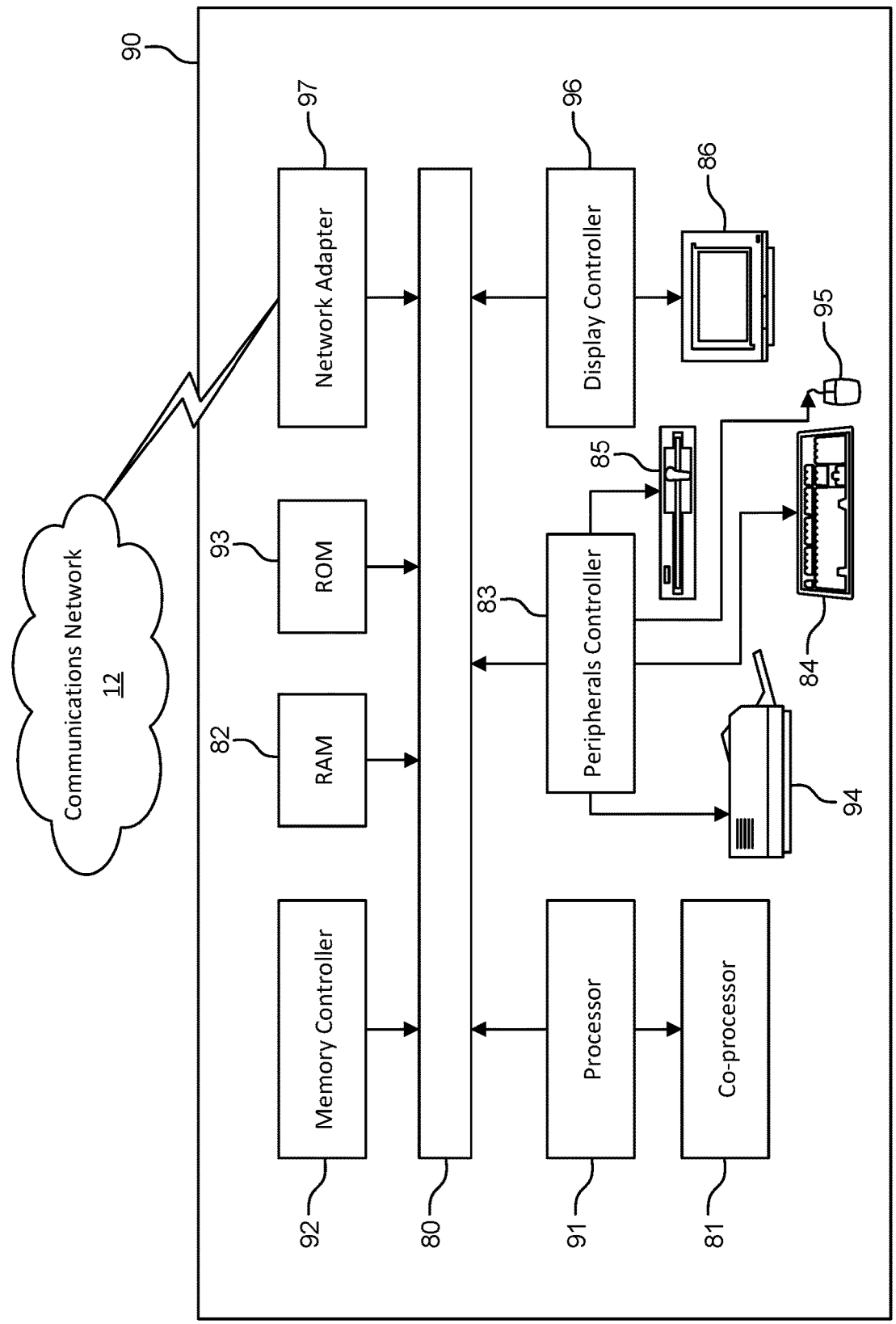

FIG. 19A illustrates an example communications system;

FIG. 19B illustrates an exemplary system that includes RANs and core networks;

FIG. 19C illustrates an exemplary system that includes RANs and core networks;

FIG. 19D illustrates an exemplary system that includes RANs and core networks;

FIG. 19E illustrates another example communications system;

FIG. 19F is a block diagram of an example apparatus or device, such as a WTRU; and FIG. 19G is a block diagram of an exemplary computing system.

DETAILED DESCRIPTION

In a multi-beam network, where a UE monitors grants on a number of beams (which may be from multiple TRPs, or from a single TRP providing increased robustness), the UE may have to perform significant PDCCH processing which can result in excessive power consumption. Disclosed herein are methods, systems, and devices that enable UE power savings in multi-beam connectivity using multi-TRPs or multi-UE panels. Methods, systems, and devices are described to enable PDCCH skipping in the active duration of the UE by skipping PDCCH monitoring associated with groups of CORESETs.

A UE may be configured with one or more cells, e.g. an SpCell or SCell(s). For a configured cell, a UE may be configured with one or multiple BWPs. A BWP of a UE may be configured with one or more control resource sets (CORESETs). A CORESET may be configured with a group index. In some cases, CORESETs across BWPs, e.g. active BWPs, or configured cells with the same configured group index form a CORESET-group (COG). In some cases, CORESETs without a configured group index form a CORESET-group. A COG may also be configured based on the UE's panel; for example, the CORESET beams that a UE may receive on a single panel may be grouped into one COG.

From a UE's perspective, TRPi may be associated with a CORESET-group COGi which may include one or more CORESETs configured to the UE. When the UE receives control information on a CORESET in COGi, the UE may identify that TRPi has transmitted it. In some cases, no explicit association may be known to the UE between a COG and the TRP.

Alternatively, TRPi may be associated with a SearchSpaceSet-group SSSGi which may include one or more search space sets configured to the UE. When the UE receives control information on a search space in SSSGi, the UE may identify that TRPi has transmitted it. In some cases, no explicit association may be known to the UE between a SSSG and the TRP.

In the disclosed examples, the association of a TRP to a COG is used to illustrate the signaling and procedures in the proposals. But the ideas can be generalized to apply to associations between a TRP and a SSSG. The ideas can also be generalized to apply to associations between a UE's panel and one or more COGs or a UE's panel and one or more SSSGs.

A scheduling-TRP for a particular grant is the TRP associated with the CORESET on which the grant was received by the UE. The UE may identify a scheduling-TRP from the CORESET on which it receives DL and UL grants when configured with TRP-COG associations. Similarly, a UE may identify the scheduling-TRP from the resources on which it receives a power saving indication (PSI) which may be in the form of a Wake-Up-Signal (WUS) or a Go-to-sleep signal (GTS) command to the UE. The PSI may be in the form of a DCI and the CORESET on which the corresponding PDCCH is transmitted indicates the TRP to the UE.

The COG or SSSG association with TRP may be configured to the UE through higher layer signaling or inferred by the UE through signaling and measurements.

Figure 1:
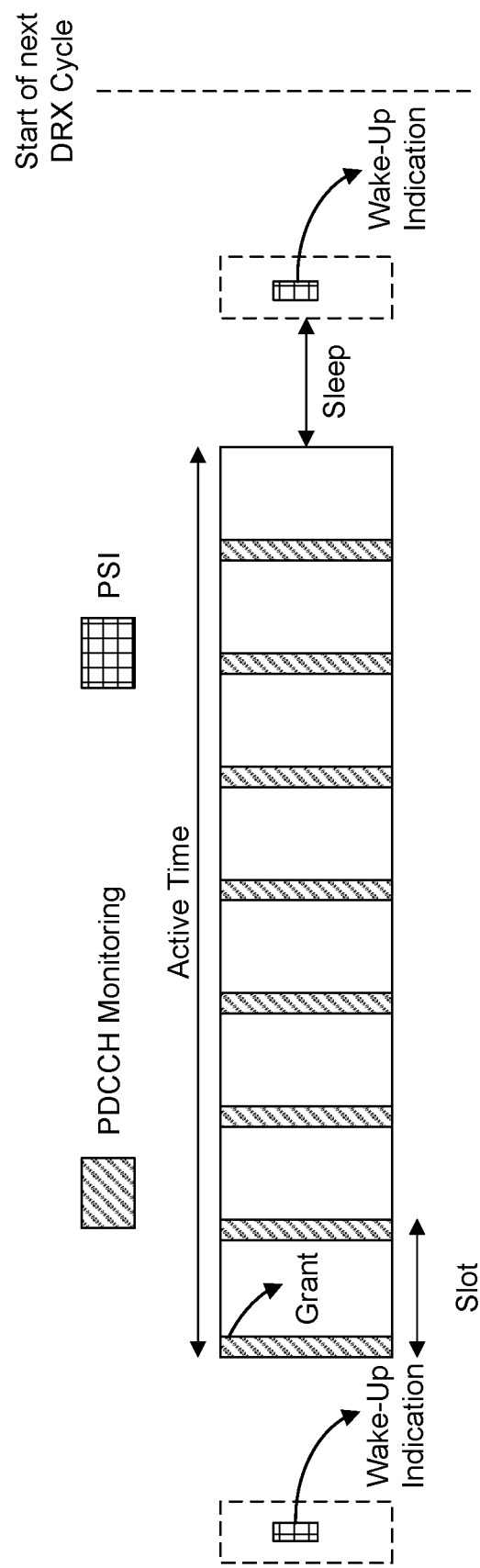
FIG. 1 illustrates a PSI to wake-up UE from outside the active time.
Figure 2:
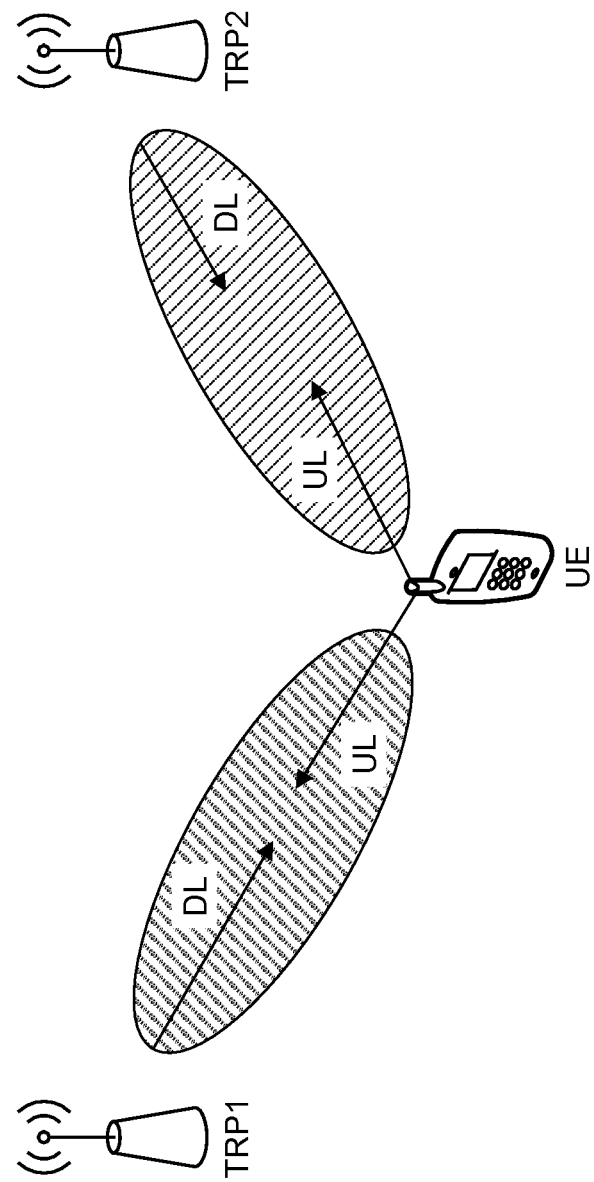
FIG. 2 illustrates a Multi-TRP transmission.
Figure 3:
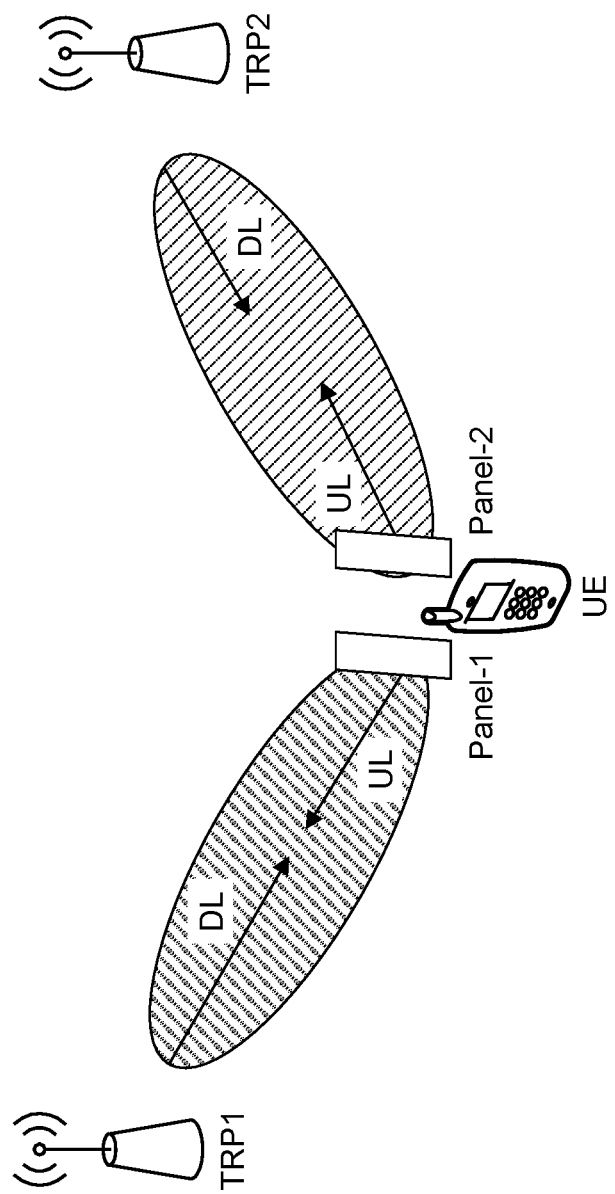
FIG. 3 illustrates a multi-panel transmission.
Figure 4:
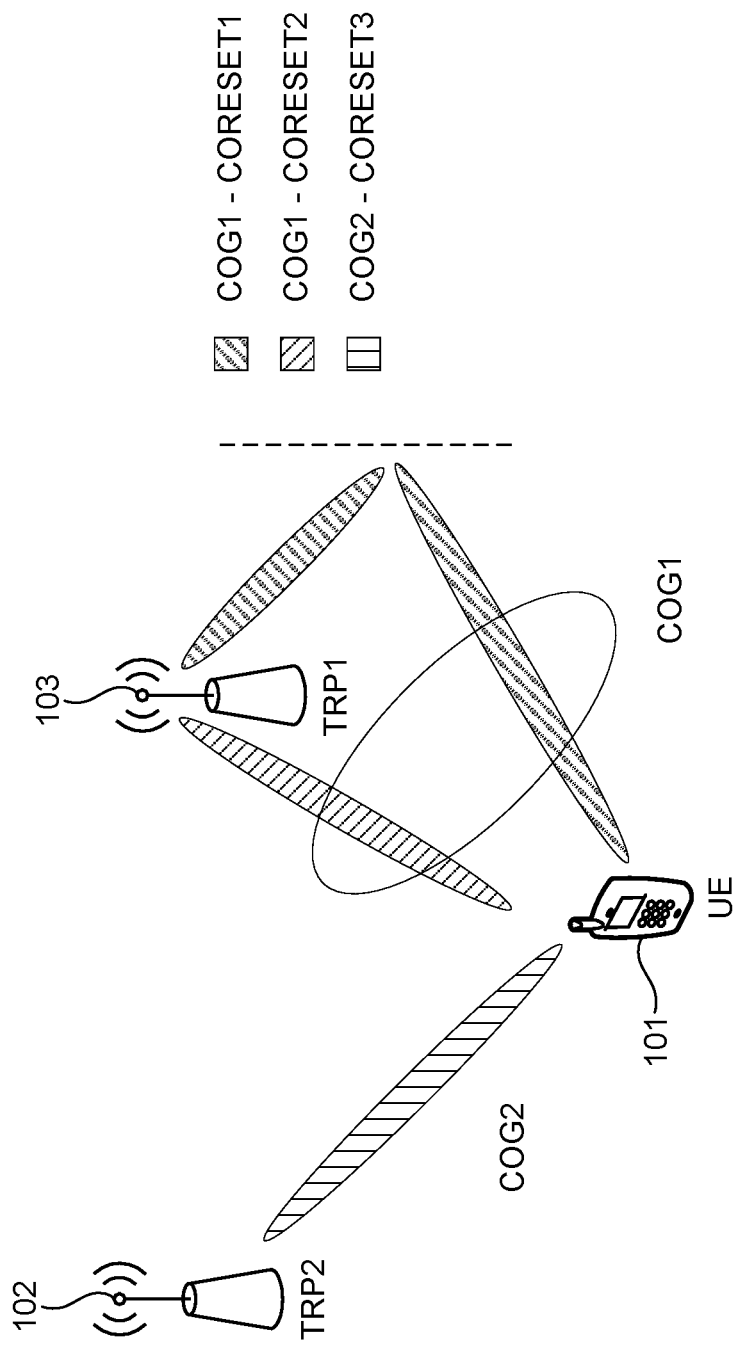
FIG. 4 illustrates a COG associated with a TRP.

In the example in FIG. 4, UE 101 is connected to TRP 103 and TRP 102 of the same cell. UE 101's CORESETs CORESET1 and CORESET2 are in COG1 which is associated with TRP 103. UE 101's CORESET CORESET3 is in COG2 which is associated with TRP 102.

Note that examples here are presented in the context of multi-TRP communications but the concept of CORESET grouping can also apply to a single TRP based communication; the single TRP's beams may be grouped into multiple COGs. It is also possible that the CORESET grouping functionality of assigning a higher layer index for a CORESET is independently configured from the UL control signaling enhancement. Consequently, the power saving enhancements described here, which may rely on COGs, may also be used in single-TRP, single-beam scenarios. The techniques may give more control to the network on how to enable power savings by dynamically controlling UE 101 monitoring of different CORESETs/COGs.

Monitoring Power Saving Indications Outside Active Time

Figure 5:
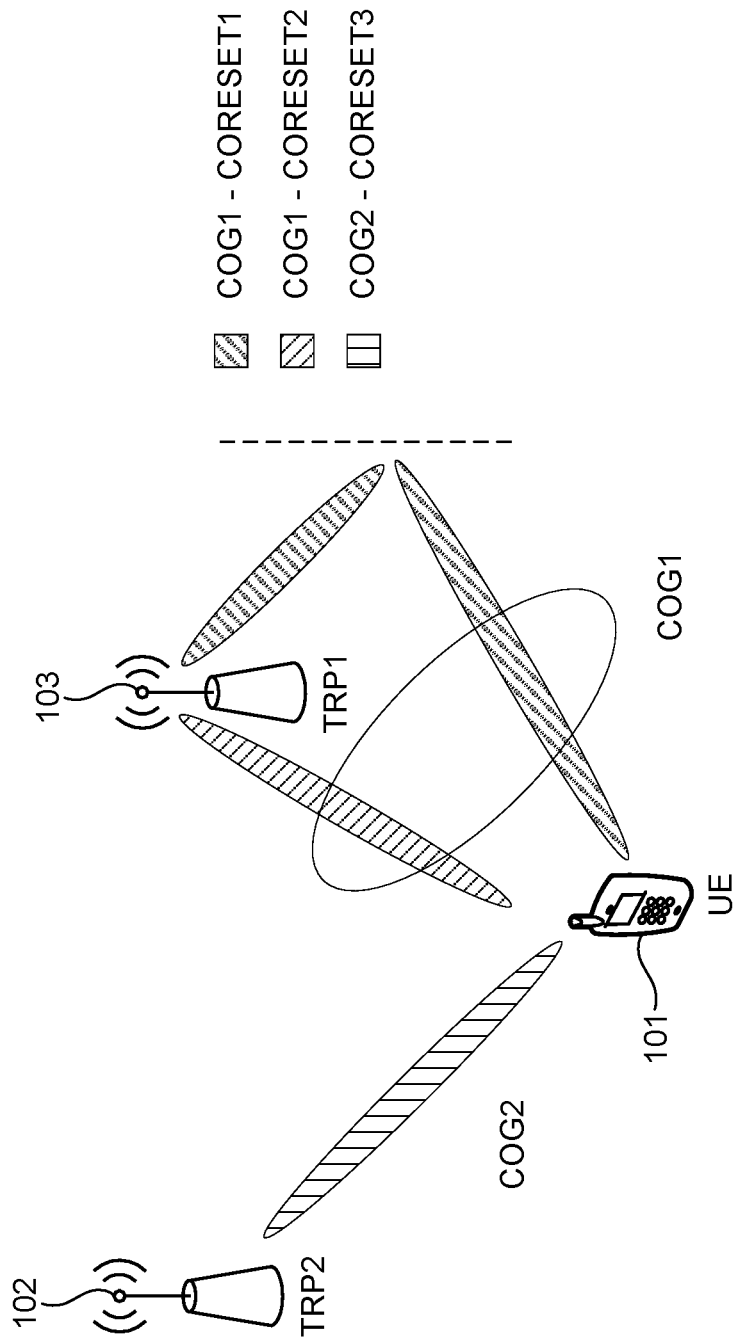
FIG. 5 illustrates a PSI reception outside the active time from multiple CORESETs/TRPs.

UE 101 may monitor one or more PSI in a pre-On-duration window (POW) that is outside the active time as shown in FIG. 5. The time resources of the POW are offset prior to the On Duration of the DRX cycle. The PSI may be transmitted from one or more TRPs on one or more CORESETs. In this example, PSI1 and PSI2 are transmitted by TRP 103 on CORESET1 and CORESET2 (from COG1) respectively while PSI3 is transmitted by TRP 102 on CORESET3 from COG2. Here, UE 101 receives a wake-up indication in the POW and wakes up at the start of the following DRX ON Duration and processes the signals in its active time.

In general, the set of CORESET(s) used for signaling the PSI can be different from the set of CORESET(s) used in the active time. However, FIG. 5 shows a special case where the set of CORESETs are the same inside and outside the active time (e.g., the CORESET indices used in the active time are also the CORESET indices used outside the active time to monitor the PSI).

Content of PSI

A PSI outside the active time may carry one or more of the following information which may be in the form of explicit fields or in the form of implicit information in the DCI or PDCCH, such as the mere presence of the PSI. First information may include, wake up signal (WUS) to wake up UE 101 to monitor certain CORESETs in the active duration. Second information may include go to sleep (GTS) information to indicate UE to not monitor certain CORESETs in the active duration. Third information may include an indication of the number of subsequent active times the WUS/GTS applies to. Such a wake up or sleep across multiple active times may also allow UE 101 to skip monitoring the corresponding POWs. Fourth information may include a BWP indicator to switch UE 101 to a BWP different from the one where UE 101 monitors the POW. Fifth information may include a minimum K0 value or minimum K2 value to expect in the active time. Sixth information may include WUS or GTS on one or more COGs of one or more SCells.

Different TRPs may serve different cells, e.g., PCell, or SCells. Alternatively, each TRP may serve the PCell and one or more SCells. For such scenarios, a COG may span multiple cells including SpCell. The PSI may include a bitmap for multiple COGs. A bit in the bitmap ma indicate whether UE 101 must wake up or skip monitoring the CORESETs in that COG in the active time. Seventh information may include an indication to switch DRX cycle (from short DRX cycle to long DRX cycle or from long cycle to short DRX cycle). Eight information may include trigger of aperiodic CSI-RS or CSI reporting. Ninth information may include activation of semi-persistent CSI-RS or CSI reporting.

UE Procedure to Wake Up, Sleep, or Skip Monitoring.

The multiple PSIs received in a single POW as shown in FIG. 5, may be repetitions of each other which enables robustness. Alternatively, the PSIs may carry independent information based on the transmitting TRP. The PSIs may also explicitly carry information on how UE 101 must monitor the COGs of one or more TRPs in outside the active time.

In general, UE 101 may sleep if it receives GTS indication for the configured COGs. If UE 101 is required to monitor certain COGs, then UE 101 may wake up and monitor those COGs and may skip COGs with GTS indication. PDCCH skipping may be viewed as a micro-sleeping state where UE 101 sleeps for a very short duration of time.

Figure 6B:
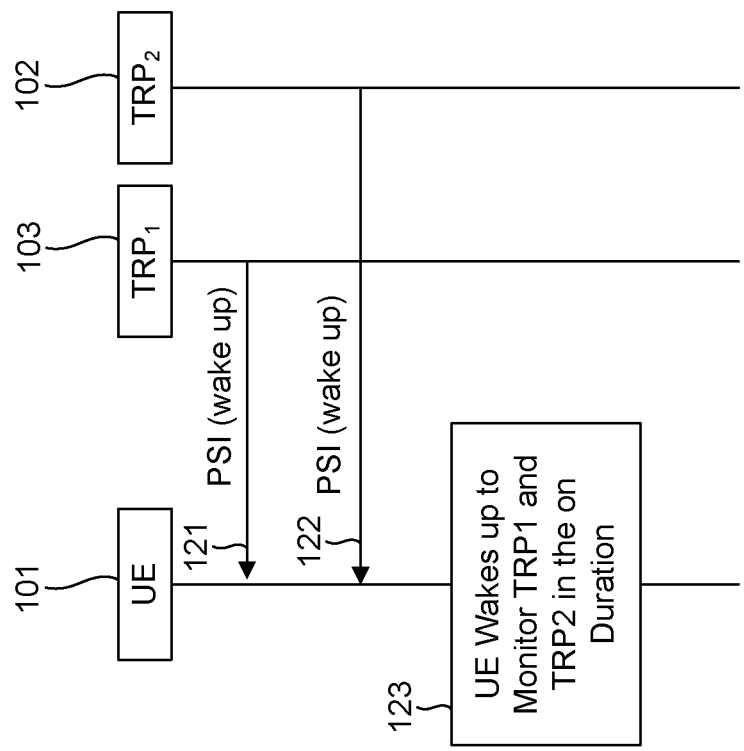
FIG. 6B illustrates a PSI signaling outside active time for PSI is repeated from different TRPs.
Figure 6A:
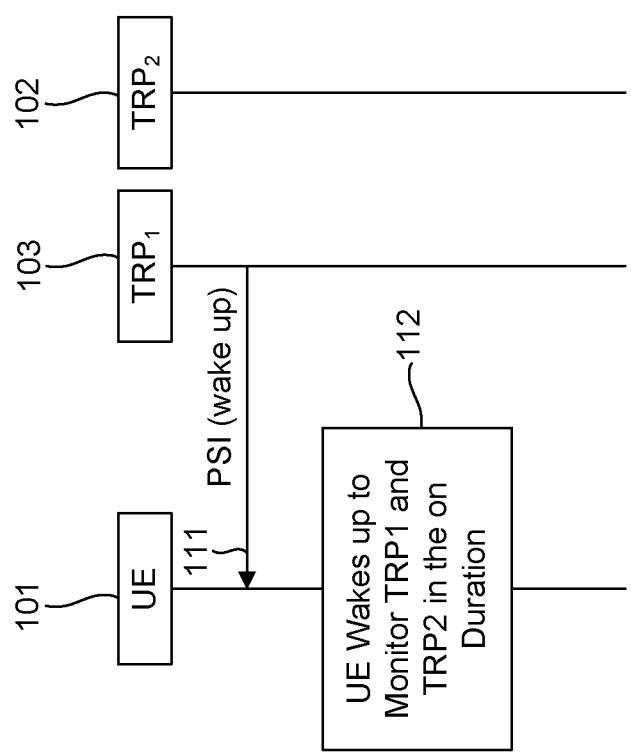
FIG. 6A illustrates a PSI signaling outside active time for single PSI from a TRP wakes-up or puts UE to sleep.

The signaling between the TRPs and UE 101 is shown in FIG. 6A-FIG. 6D for different cases of the PSI signaling and configuration. In FIG. 6A, UE 101 may receive a wake-up indication from TRP 103 (step 111). At step 112, in response to the indication of step 111, UE 101 may wake up to monitor COGs of TRP 103 and TRP 102 in UE active time. An example of this deployment is a case of multiple TRPs with ideal backhaul.

In FIG. 6B, both TRP 103 (step 121) and TRP 102 (step-122) send a wake-up indication to UE 101. The indication may be repeated through transmissions on different CORESETs. UE 101 may receive the PSIs and may wake up to monitor COGs of TRP 103 and TRP 102 in its active time (step 123). If UE 101 successfully receives the PSI from TRP 103, the UE may not need to monitor the repeated PSIs during that POW. An example of this deployment is the case of multiple TRPs with ideal backhaul.

Figure 6D:
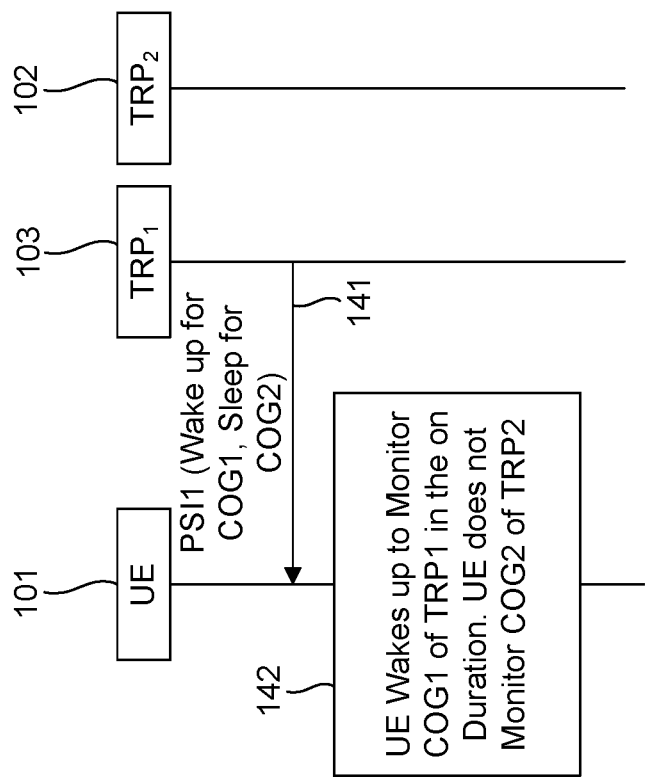
FIG. 6D illustrates a PSI signaling outside active time in which a single PSI indicates wake-up or go-to-sleep separately for multiple TRPs.
Figure 6C:
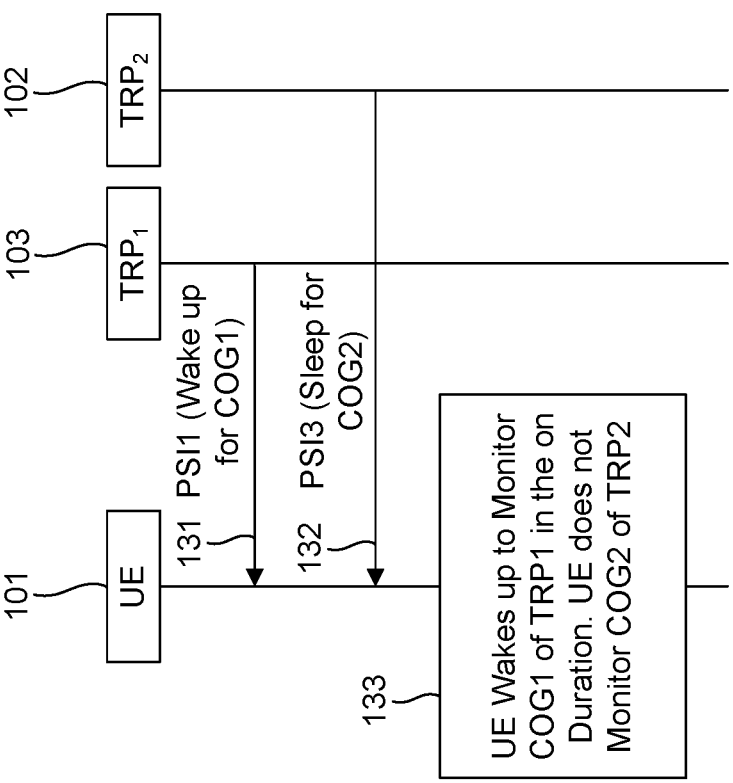
FIG. 6C illustrates a PSI signaling outside active time in which each PSI indicates wake-up or go-to-sleep for a specific TRP.

In FIG. 6C, TRP 103 may transmit PSI1 indicating that UE 101 should wake up to monitor the associated COG1 (step 131). Independently, TRP 102 may transmit go-to-sleep in PSI3 indicating that UE 101 need not monitor the associated COG2 (step 132). Based on step 132, UE 101 may wake up to monitor COG1 in its active time, but may not monitor COG2 of (step 133) or skip monitoring COG2. An example of this deployment is the case of multiple TRPs with non-ideal backhaul. There may be two separate POWs, one for TRP1 and the other for TRP2

In FIG. 6D, TRP 103 may transmit PSI indicating that UE 101 should wake up to monitor COG1 and go-to-sleep for COG2 (step 142). Accordingly, UE 101 may wake up to monitor COG1 in its active time but does not monitor COG2 of (step 142). An example of this deployment is the case of multiple TRPs with ideal backhaul.

The gNB may configure the procedure to be followed by UE 101 through RRC signaling, e.g., whether to expect repetitions (FIG. 6B) or independent PSI signaling per TRP (FIG. 6C), or common PSI indicating per-TRP behavior FIG. 6D. In other words, the proposed common COG (e.g. COG1) can joint PSI(s) from multiple TRP. A gNB may include multiple TRPs.

Although these examples showcase wake-up and go-to-sleep signals triggering on a per-TRP basis, they may be generalized and applied to multiple COGs from a single TRP or to general COGs that may encompass CORESETs from different TRPs. In this way, UE can avoid monitoring PDCCH when PDCCH skipping is applied to COGs associated with UE 101. Therefore UE may determine some of antenna units or panels to be turned off (as they may skip monitoring) and reduce the PDCCH blind decoding effort to achieve the power saving.

A single CORESET may also belong to multiple COGs—this gives the network significant flexibility in determining the extent of UE power savings. For example, CORESETm may belong to COG1 and COG2. COG2 may include several CORESETs associated with more monitoring occasions whereas COG1 may include CORESETs associated with fewer monitoring occasions. Depending on the objective, the network may signal UE 101 to skip COG1 or COG2—these alternatives achieve different levels of power savings as the PDCCH monitoring load is different for these COGs. But in both scenarios, CORESETm may be skipped if GTS is received.

UE 101 procedures associated with PSI signaling are further described below. In general, if a PSI is not received where it is expected, UE 101 may be configured to treat the event as a WUS or a GTS. Both possibilities are considered in the below examples. One or more of the following principles may apply. With regard to a first principle, if PSI(s) indicate to sleep on some or all COGs, UE 101, for example, does not need to wake up until next POW. A second principle may be if PSI(s) indicate to wake-up on COGs, UE 101 wakes up and monitors the COGs. A third principle may be if PSI(s) indicate to wake up for some COGs but GTS for other COGs, UE 101 wakes up to monitor the indicated COGs and skips the monitoring of COGS for which GTS was indicated. A fourth principle may be that absence of PSI is interpreted as WUS or GTS—this may be determined a priori or configured to UE 101 through higher layer signaling. Interpretation of absence of PSI as WUS may ensure high reliability and may avoid missed-detection of WUS whereas, interpretation as GTS may ensure better UE power savings for UE 101. UE 101 may provide feedback to the network on its preferred mode of operation based on its battery status.

PSI Indication Per COG/TRP, Absence of PSI Interpreted as GTS.

Figure 7A:
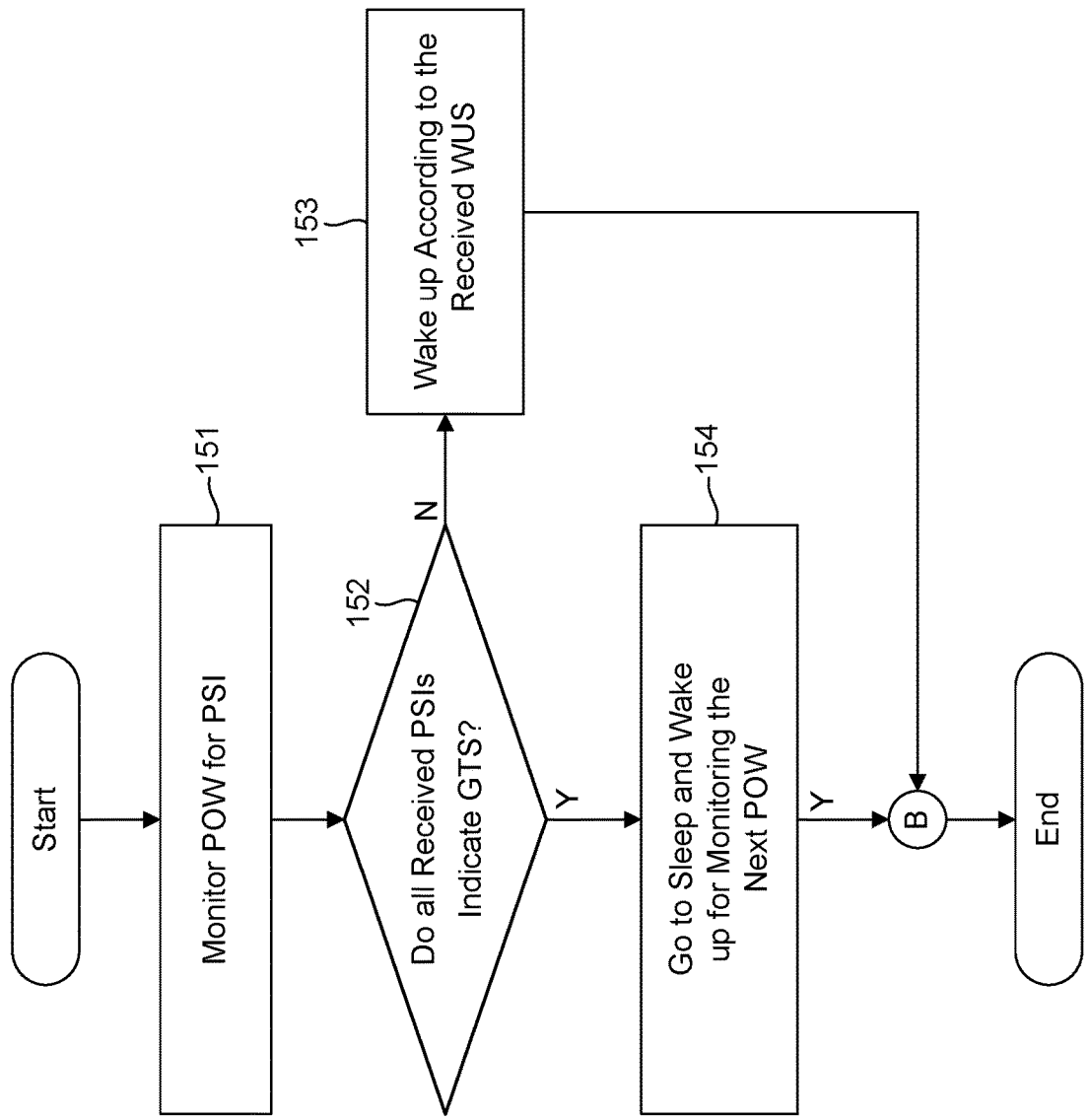
FIG. 7A illustrates a receiving GTS from TRPs in which UE Procedure: UE sleeps till next POW.
Figure 7B:
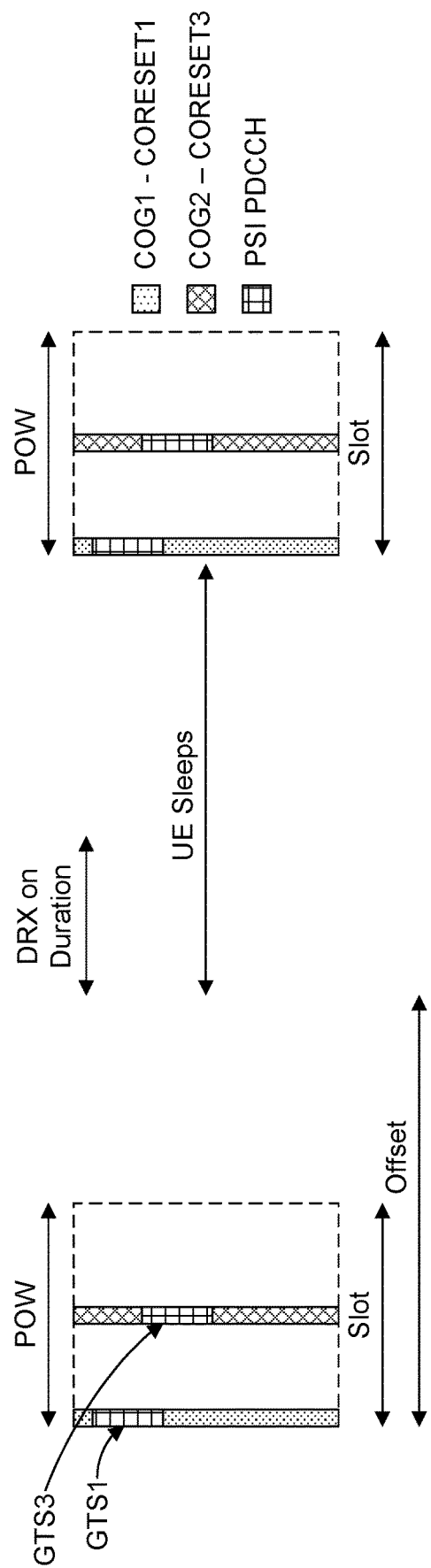
FIG. 7B illustrates a receiving GTS from TRPs for UE Timeline.

If UE 101 detects only GTS from one or more PSI in the POW, UE 101 does not wake up for the following ON Duration. Here, if UE 101 does not detect PSI in a POW, UE 101 may assume that GTS was received. So, UE 101 sleeps until it must wake up to monitor the PSI at the next POW. The procedure is shown in FIG. 7A and the processing timeline of UE 101 is shown in FIG. 7B where GTS1 from TRP 103 and GTS3 from TRP 102 indicate UE to sleep until the next POW.

PSI Indication Per COG/TRP, Absence of PSI Interpreted as WUS.

Figure 8A:
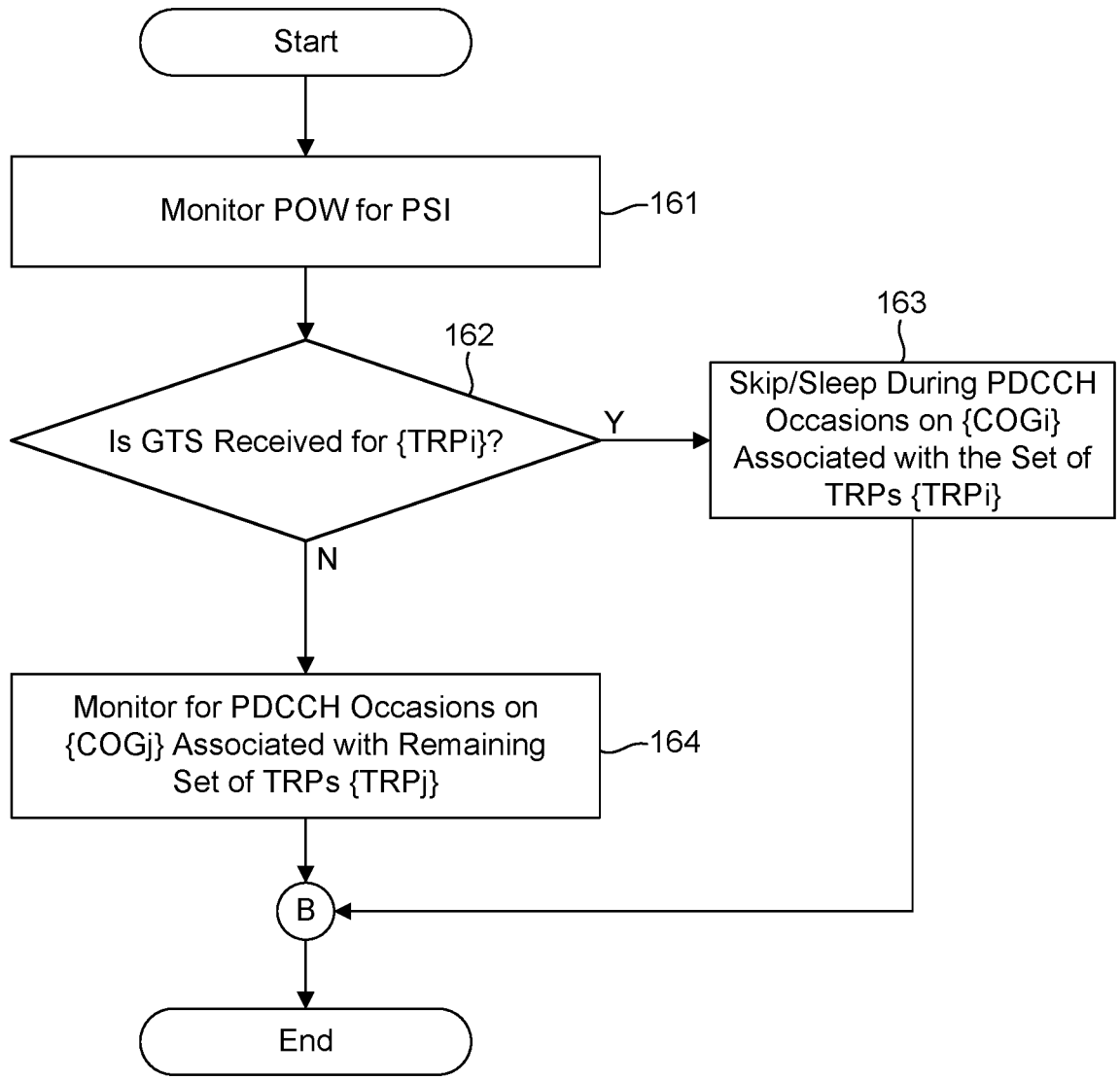
FIG. 8A illustrates a PSI indicated per TRP for UE procedure to skip monitoring TRPs for which GTS is received.

A WUS on one PSI indicates UE 101 needs to monitor only the CORESETs in the COG of the CORESET on which the PSI is received as seen in FIG. 6C. UE 101 may receive multiple PSI on different COGs. UE 101 may identify that PSI1 on COG1 indicates WUS; so, UE 101 may monitor CORESETs in COG1 in the following active time. UE 101 does not monitor CORESETs from COG2 as it receives a GTS or does not receive a PSI from COG2. So, UE 101 may skip the PDCCH monitoring occasions from CORESETs in COG2 in its active time. The procedure is shown in FIG. 8A—UE 101 monitors for PSI in the POW. If UE 101 receives a GTS signal in the set of TRPs denoted by {TRPi}, it skips the associated set of COGs {COGi}. UE 101 may wake up to monitor the remaining set of {COGj} associated with the remaining set of TRPs {TRPj}. Here if a PSI is not received, UE 101 may assume a WUS state. Alternatively, if PSI is not received from an expected CORESET, UE 101 may assume that a GTS was signaled.

Figure 8B:
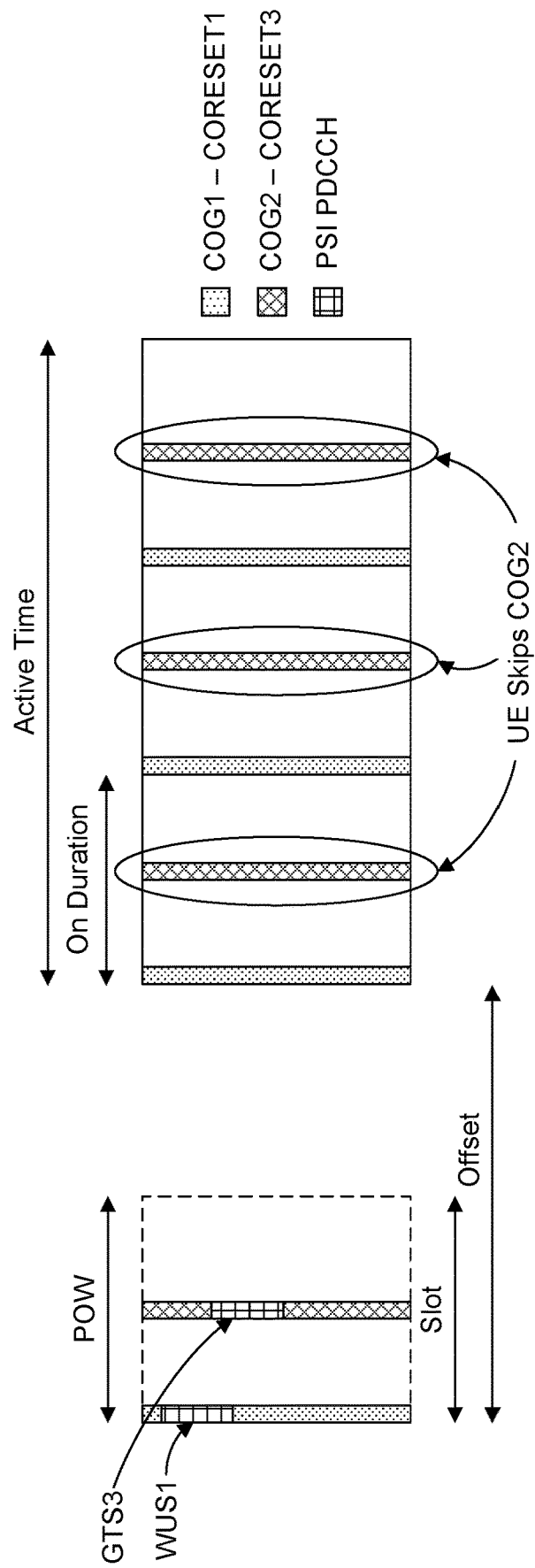
FIG. 8B illustrates a PSI indicated per TRP—UE timeline.

UE 101 processing timeline of UE 101 is shown in FIG. 8B. Here, UE 101 skips the monitoring occasions of COG2 on receiving GTS3 on CORESET3 but monitors COG1 occasions on receiving WUS1.

Single PSI Indicating WUS/GTS for Multiple COGs.

Figure 9A:
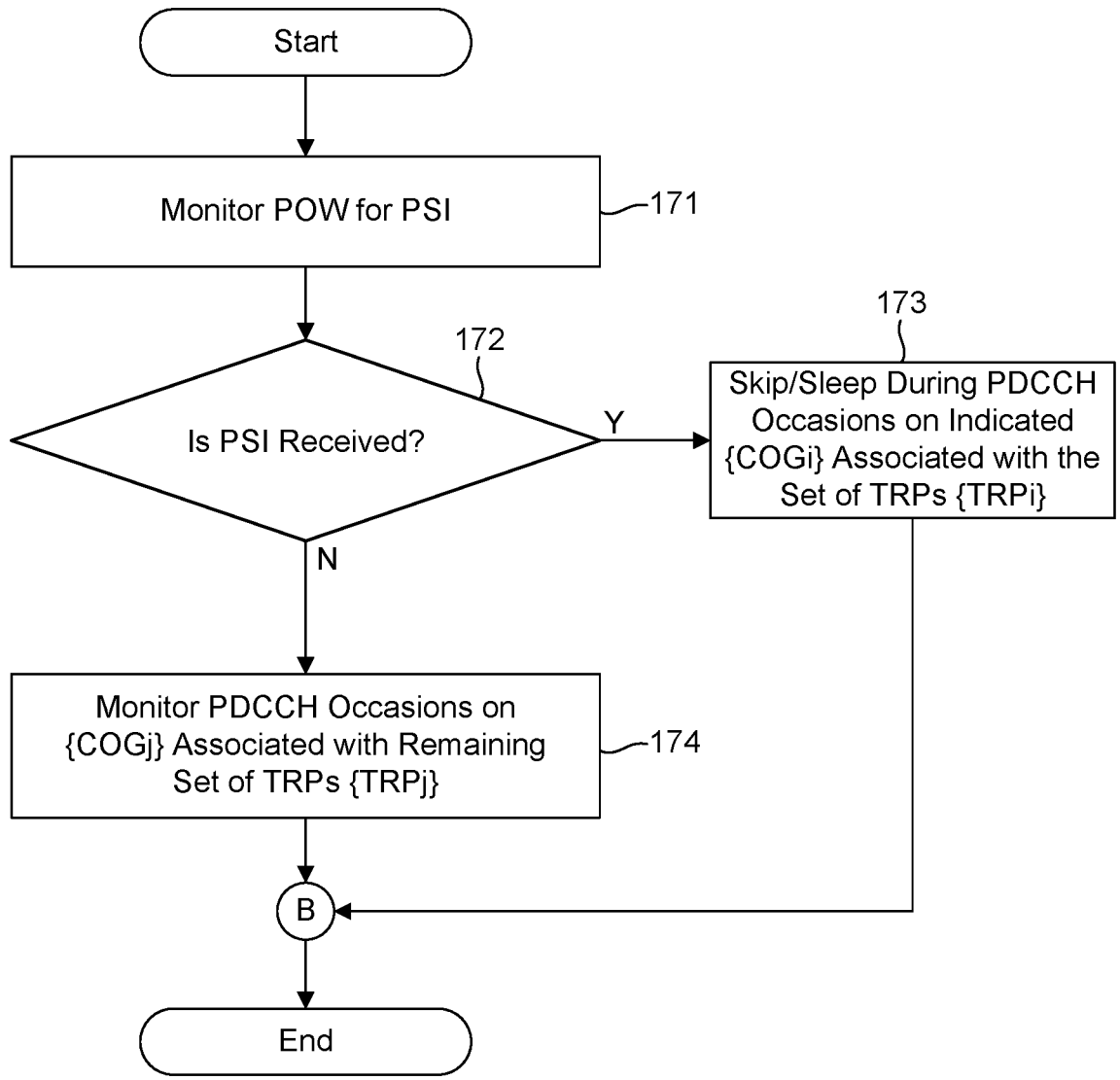
FIG. 9A illustrates a single PSI indicating behavior for multiple TRPs for UE procedure to monitor or skip PDCCH.
Figure 9B:
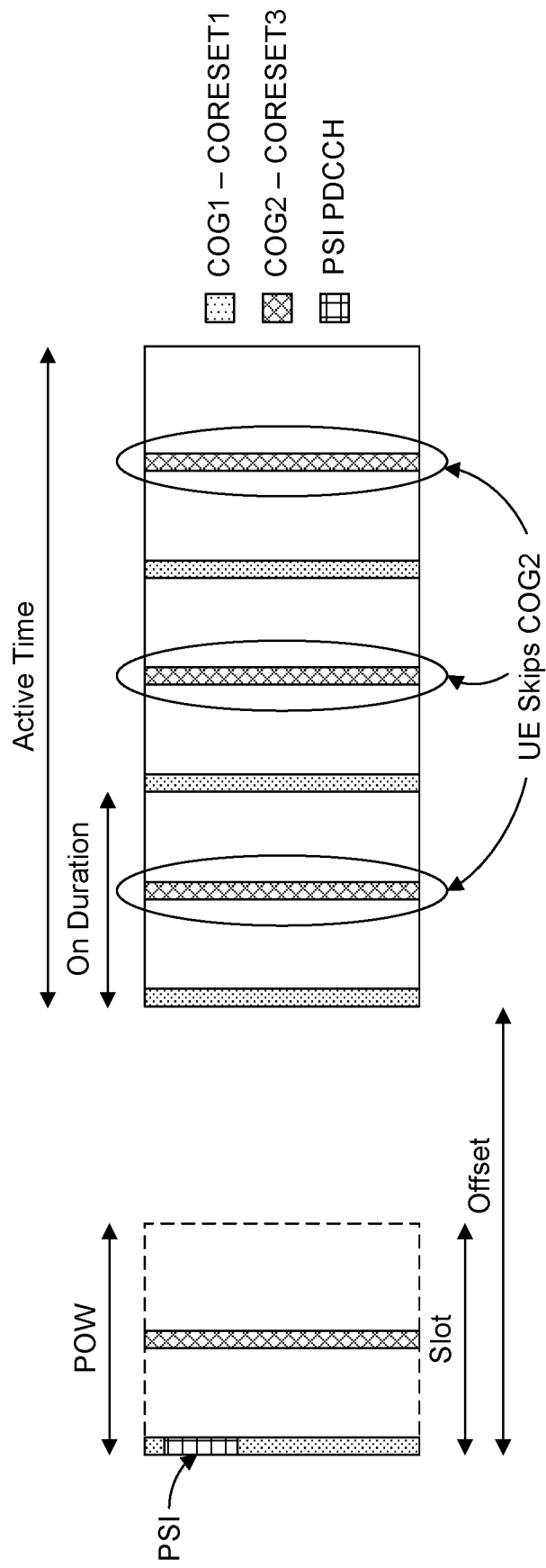
FIG. 9B illustrates a single PSI indicating behavior for multiple TRPs—UE timeline.

As shown in FIG. 6D, a single PSI that may be received on any of the COGs may indicate the WUS or GTS trigger for multiple COGs or CORESETs. The procedure is shown in FIG. 9A. Here, if the PSI is not received on a particular COG, it is assumed that UE 101 may wake up for that COG. As seen in UE 101 timeline in FIG. 9B, a single PSI receiving on CORESET1 of COG1 indicates WUS for COG1 and GTS for COG2. Then UE 101 monitors only the COG1 of TRP 103 in the active time and skips PDCCH monitoring occasions of COG2 in the active time.

If the On Duration of the DRX cycle does not include monitoring occasions of COG1 as shown in FIG. 10A or the monitoring occasion occurs later in the ON Duration as shown in FIG. 10B, then UE 101 may wake up to monitor the first monitoring occasion for COG1 CORESETs. In these examples, a single PSI received on one CORESET indicates UE 101 to wake up to monitor COG2, but skip COG1. UE 101 may be configured to monitor at least N occasions of a PDCCH monitoring occasion of a COG for a grant, even if these occasions occur outside the ON Duration.

The DCI for the single PSI may carry the WUS/GTS indication for multiple COGs. UE 101 is configured with a N-bit bitmap corresponding to N configured COGs. UE 101 skips monitoring COGs for which the bit is reset and wake-up for monitoring COGs for which the bit is set.

Furthermore, the DCI may be common to multiple UEs (e.g., each UE's fields are embedded in a single DCI and each UE knows a priori the location of its fields within the DCI.) This DCI may be transmitted as a group-common PDCCH. It may be scrambled by the MS-RNTI (micro-sleep RNTI) which may be configured to a group of UEs.

For the case where the PSI indication is given jointly for multiple COGs or TRPs, a single DCI may address multiple UEs and provide power savings command for multiple COGs/TRPs.

For the case where multiple PSI indications are received for different COGs, each DCI may address N UEs. The RNTI for the PSI DCI may be different for different COGs. This may allow different sets of UEs to be grouped together for receiving on a particular set of beams (COG/TRP).

Based on the methods described, a PSI received on COG1 outside the active time may control the power savings behavior of UE 101 in COG2 inside the active time.

Configuring the POW.

The configuration of the POW for monitoring the PSI is disclosed in more detail below. In general, multiple CORE-SETs from one or more TRPs may be monitored within the POW and multiple monitoring occasions of a CORESET may be included in a POW. An offset $POW_{offset}$ with respect to the start of the On Duration of a short or long DRX cycle and duration $POW_{offset}$ may be provided for monitoring through RRC signaling. UE 101 may identify the monitoring occasions in one or more of the following examples.

In a first example, a start of the POW is offset by $POW_{offset}$ from the start of the On Duration. UE 101 monitors within duration $POW_{duration}$ of its short or long DRX cycle as shown in FIG. 11A. In a second example, an end of the POW is offset by $POW_{offset}$ from the start of the On Duration. UE 101 monitors within duration $POW_{duration}$ of its short or long DRX cycle as shown in FIG. 11B.

FIG. 11C is associated with a third example. For multiple durations, for example, $POW_{duration}$, short or $POW_{duration, long}$, may be supported by UE 101. A longer duration may be preferred in some scenarios when UE 101 must perform beam management prior to the On Duration, thereby using the resources in the duration for performing measurements and or signaling reports to one or more TRP. If UE 101 has slept for more than Xms, then the long duration may be used. For example, UE 101 uses $POW_{duration, long}$ after a long DRX cycle as shown in FIG. 11C. FIG. 11D is associated with a fourth example. As shown in FIG. 11D, a short and long offset duration may be supported. A longer offset may allow UE 101 to perform beam management prior to the ON Duration. Again, if UE 101 has slept for more than Xms, then the long offset may be used. FIG. 11E is associated with a fifth example. A POW may be configured separately for each CORESET or COG. POWi is configured with $POW_{offset,1}$ and $POW_{duration,i}$. A single CORESET or COG of one TRP is monitored in POWi. This may be useful especially if a large number of beams are used in the system (for example, in FR2) and the gNB cannot schedule the beams within relatively short duration of each other within a POW. An example is shown in FIG. 11E.

FIG. 11F is associated with a sixth example. Not all POWs may be monitored prior to a given On Duration. For example, when UE 101 is in the long DRX, it may monitor the POWs prior to the ON Duration, while in a short DRX cycle UE 101 may monitor only certain POWs as shown in FIG. 11F. So, prior to the long DRX cycle, UE 101 may monitor a large number of beams (e.g. CORESETs) or the PSI as the beam alignment may be disrupted but prior to the short DRX cycle, better beam alignment is expected and therefore, UE 101 may monitor only a subset of those beams for the PSI. This may especially apply to the FR2 case where UE 101 may be configured to monitor several CORESETs for the PSI for robustness.

UE 101 may monitor the POW only prior to certain DRX cycles. For example, UE 101 may not be configured to monitor the POW prior to the short DRX cycles, especially if the cycle's duration is shorter than a pre-defined threshold. This may avoid excessive wake-up to monitor the POW.

Furthermore, the $POW_{offset}$ and $POW_{duration}$ may be defined as a function of the DRX cycle duration.

A POW may include one or more monitoring occasions of one or more CORESETs. In one example, a POW may include CORESETs from one COG, and may map to one TRP. The beams from each TRP are included within one POW. This may allow each TRP to sweep its beams within a short duration of time (e.g., included in the POW). As shown in FIG. 12, UE 101 may be configured to monitor the PSI in POW1 and POW2 which are separated by one slot. Each POW may include multiple CORESETs corresponding to different beams from each TRP. The network may schedule POWs for other UEs in the duration between POW1 and POW2. UE 101 may sleep between the monitoring occasions between POW1 and POW2.

Failure of PSI Detection.

If UE 101 does not receive a PSI over N consecutive POWs, UE 101 may temporarily stop monitoring the POW and wake up by default for the ON Duration in the N+1 instance. This may trigger UE 101 to perform beam management.

In some scenarios, the failure to received PSI on N consecutive POWs may trigger UE 101 to declare beam failure and perform BFR. In some cases, a POW may include one or more RS for beam failure detection (BFD). In some cases, the active time may include one or more RS for beam failure detection. In some cases, UE 101 may omit performing beam failure detection during the active time if it receives a corresponding GTS indication. In some cases, the failure to receive one or more PSIs may trigger UE 101 to perform BFD during the active time.

UE 101 may indicate through higher layer signaling the number of instances over which the POW was not received. If the absence of PSI for a period than a configured threshold (e.g. x ms) in the connected state (e.g. the absence of PSI period can be specified by higher layer configuration) then UE may interpret a possible failure or blockage of the beam carrying the PSI.

Monitoring Power Saving Indications Inside the Active Time.

During the active time, the PSI can dynamically indicate power-savings-configurations (PSC) to UE 101 such as same-slot or cross-slot scheduling parameters, active BWP, maximum number of MIMO layers, etc. The PSI can also indicate dynamically the PDCCH that may be skipped during the active time. For example, TRP 102's DL transmissions to UE 101 may end while TRP 103's DL transmissions to UE 101 may continue. In this case, the PSI may indicate that UE 101 can skip COG2 (associated with TRP 102) monitoring occasions during the remaining active time. The PSI may also indicate UE 101 to skip one or more PDCCH monitoring occasions within the active time between successive grants. The successive grants may include two successive DL grants or two successive UL grants or a DL grant followed by a successive UL grant or an UL grant followed by a successive DL grant.

The PSI may be included in a scheduling DCI, for example, non-fallback DCI scheduling formats, such as format 1_1 or format 0_1.

In some deployments where the non-ideal backhaul exists for multi-TRP transmission, e.g. same (or different) data packet(s) arrive(s) from different TRP, the delta of arriving time is greater than a pre-defined or configured threshold (e.g. y ms). In this case, separate PSIs may be transmitted by the TRPs inside the active time and each TRP controls the power savings behavior of UE 101 only for its CORESETs and transmissions inside the active time. In other words, in non-ideal backhaul for multiple TRP transmission, UE 101 may expect monitoring different CORESTs for separate PSIs from different TRPs. In other deployments where tighter coordination is possible between the TRPs (e.g. ideal-backhaul), a single PSI from one of the TRPs can control the power savings behavior of UE 101 on some or all CORESETs inside the active time including those of other TRPs. In the latter case, a single PSI may include skipping parameter fields per TRP or per CORESET. Alternatively, a single PSI may indicate a single parameter that may apply to all the COGs/TRPs. In general, a PSI received on COG1 inside the active time may control the power savings behavior of UE 101 in COG2 inside the active time.

FIG. 13A illustrates an exemplary system for UE power savings in multi-beam operation. In FIG. 13A, there may be multiple TRPs (e.g. TRP 102 and TRP 103) associated with a gNB and UE 101 may receive the data from the multiple TRPs. FIG. 13B illustrates an exemplary method for UE power savings in multi-beam operation. Here a single PSI may be used for multi-TRP transmission scenario with power saving. A single PSI may be indicated by a PDCCH (e.g. group-common) with a specific DCI format (e.g. the CRC is scrambled with a particular RNTI) and this PDCCH (e.g. group-common) with the specific DCI format is associated with a CORESET where UE 101 can monitor this CORESET and the configured search space (SS) outside the DRX active window in the default or initial BWP in a serving cell. The PSI in this DCI (e.g. group-common) can indicate that UE 101 to switch to a BWP (e.g., activated) for the data transmission in the subsequent DRX cycle. The active DL BWP can be provided by the higher layer (e.g. RRC) configuration and the activated BWP configuration can be modified by MAC or RRC for UE 101 monitoring UE-specific PDCCH in DRX active cycle. If the active DL BWP in DRX active is configured with single or multiple CORESETs/CORESET group (COG) where each CORESET may be associated to different TRP(s) then UE 101 may monitor the PDCCH(s) from multiple TRP transmission. For example, UE 101 may receive from multiple TRP with multiple PDSCHs based on the CORESET configuration of the active BWP in DRX active cycle. In this way, even a single DCI may schedule multiple PDSCH from different TRPs with ideal-backhaul. In addition, it can support separate DCI independently schedule different PDSCH from multiple TRPs. After the data transmission is finished within DRX Active Time, network can send another DCI to indicate UE 101 to switch back to the default or initial BWP to save power.

As shown in FIG. 13C and FIG. 13D, UE 101 may monitor (group common) PDCCH for PSI in the POW. If there is a PSI indicated for UE 101 and detected by UE 101, then UE 101 may perform UE-specific PDCCH for scheduled PDSCH with a configured BWP in DRX active time, otherwise, if there is no PSI for UE 101, then UE 101 may go back to sleep or skip UE-specific PDCCH monitoring. In this manner, power saving may be achieved with multiple TRP transmission. In FIG. 13D, an ideal-backhaul scenario may be assumed between TRP 103 and TRP 102, so a single DCI may jointly schedule multiple (e.g., two) PDSCHs from a TRP (e.g. TRP 103) and UE 101 may perform UE-specific PDCCH decoding based on one CORESET configuration in the active BWP. In FIG. 13D, a nonideal-backhaul scenario may be assumed between TRP 103 and TRP 102, so PDSCH from different TRPs may be separately scheduled via separate DCIs from different CORESETs (e.g., CORESET pool 0 and 1). Therefore, based on the (active) BWP configuration for CORESETs, UE 101 may monitor UE-specific DCI based on the joint or separate scheduling PDSCHs for multiple TRP transmission.

With reference to the method of FIG. 13B, user equipment 101 may monitor a (e.g. group-common) PDCCH for a power-savings indication (PSI) (step 191). UE 101 may detect a PSI in the (e.g. group-common) PDCCH that is indicated for UE 101 (step 192). Based on the PSI, UE 101 may switch, in a subsequent DRX cycle, an activated BWP for data transmission (step 193). If there is no PSI for UE 101, then UE 101 may go back to sleep or skip UE-specific PDCCH monitoring (step 194).

A PSI inside the active time may indicate the PDCCH to be skipped inside the active time in the following examples. In a first example, a PSI from one CORESET indicates the CORESETs, COGs, TRPs whose monitoring occasions may be skipped in the active time. As a specialized case, a PSI may indicate the PDDCH to be skipped only for its own CORESET or COG. In a second example, a PSI from one CORESET indicates the number of consecutive PDDCH to be skipped regardless of whether they correspond to the same or different beam or TRP.

Examples of PDCCH skipping are shown in FIG. 14A and FIG. 14B. In FIG. 14A, the PSI may indicate skipping only for its own COG. Since the PSI is received on COG1 in the ON Duration, UE 101 may monitor COG1 monitoring occasions in the active time. If a PSI is not received on COG2 in the ON Duration, by default UE 101 may skip COG2 monitoring occasions. Thus, the absence of a grant from a TRP in the On Duration may implicitly indicate UE 101 to skip the TRP's COG monitoring occasions.

In FIG. 14B, separate PSI may be received on COG1 and COG2. Each PSI may indicate the number of PDCCH to be skipped on the respective CORESET or COG monitoring occasions. PSI1 may indicate one PDCCH monitoring occasion is to be skipped on COG1. PSI2 may indicate one PDCCH monitoring occasion is to be skipped on COG2. FIG. 14B also shows a configuration in which only one grant may be received (with PSI1 in COG1) in the ON Duration, but UE 101 may set the DRX inactivity timer and monitor both COG1 and COG2.

Content of PSI.

A PSI in the active time may indicate one or more of the following. In a first example, PSI may indicate go to sleep (GTS) to indicate UE to not monitor certain CORESETs or COGs in the active duration of the cell on which it is monitored. This can be interpreted as skipping the PDCCH monitoring occasions associated with those COGs. In a second example, PSI may indicate GTS on one or more COGs of one or more SCells. CORESETs from multiple cells may be grouped into a single COG and a single common indication can be sent to enable UE 101 to sleep during those monitoring occasions. Alternatively, a separate indication bit/field may be used for each COG that may correspond to different cells. In a third example, PSI may indicate duration of the sleep or skipping. UE 101 may skip some PDCCH monitoring occasions but may be awake to monitor others in the active time. In a fourth example, PSI may indicate PDCCH skipping parameters indicating that UE may skip certain monitoring occasions of the PDCCH. For example, UE 101 may periodically skip certain monitoring occasions starting from an offset from the slot in which the PSI is received.

The skipping parameters may be provided as follows, such as Num_PDCCH_skip or Offset_from_PSI. Num_PDCCH_skip: Indicates the number of occasions to be skipped. This may also be indicated in terms of number of slots/mini-slots/symbols to be skipped. Offset_from_PSI: indicates the number of mini-slots/slot/symbol offset after which UE 101 may start skipping the monitoring occasions. The offset it determined from the mini-slot/slot/symbol of the PSI or the mini-slot/slot/symbol of the PDSCH/PUSCH resource granted by the PSI.

The PSI may also indicate that UE 101 may go to sleep for remaining active time. So, Num_PDCCH_skip may be set to a special value to indicate this, e.g., the value 0.

Procedures for PDCCH Skipping.

UE 101 may be configured through RRC signaling to interpret the skipping of PDCCH on a per-CORESET, per-COG, or per-monitoring occasion. Alternatively, UE 101 may indicate this through the PSI. The skipping parameter value set that can be indicated through the PSI, e.g. Num_PDCCH_skip and Offset_from_PSI, may be also be RRC configured.

In general, the PSI may indicate the COGs that may be skipped, the number of occasions to be skipped and the offset from which the skipping applies. The examples in FIG. 15A-FIG. 15C show how PDCCH may be skipped for Num_PDCCH_skip=3 occasions, Offset_from_PSI>1 slot. In FIG. 15A, the PSI indicates the skipping to UE 101 and UE 101 skips three consecutive occasions which may include monitoring occasions on CORESETs of both TRP 103 and TRP 102.

In FIG. 15B, the PSI may indicate skipping over only the CORESET on which the PSI is received. Accordingly, UE 101 skips CORESET1 but monitors CORESET2 of COG2.

In FIG. 15C, the PSI may indicate skipping over the COG of the CORESET on which the PSI is received (e.g., COG1 of TRP 103). So UE 101 may continue to monitor COG2, skips three occasions and then resumes monitoring on COG1.

UE 101 procedure to perform PDCCH skipping is given in FIG. 16. When UE 101 skips the PDCCH monitoring occasions, the DRX inactivity timer may be handled as provided below. In a first example, the DRX inactivity timer continues to decrement even if the PDCCH monitoring occasions is skipped. In a second example, the DRX inactivity timer is frozen for the occasions when PDCCH monitoring occasions is skipped.

K0 and K2 for Multi TRP Signaling (During Active Time).

FIG. 17A illustrates minimum K0 value indication per COG—separate PSI per COG. FIG. 17B illustrates minimum K0 value indication per COG—common PSI for COG1 and COG2. UE 101 may support different K0 and K2 for different TRPs to allow scheduling flexibility to the TRPs. The minimum K0 and K2 values may be configured separately for each TRP or COG. For example, UE 101 is configured a TDRA table PDSCH-TimeDomainResourceAllocation through RRC signaling. This table may include the possible set of K0 values that must be supported by UE 101. An RRC configuration that restricts the set K0 values to the set K0' may be provided to UE 101. The PSI may dynamically indicate one of the values from K0' to UE 101. Such a configuration may be provided for each COG or TRP.

When UE 101 monitors a particular CORESET, it may use the corresponding minimum value for the TRP associated with that CORESET. Thus, UE 101 may apply different minimum K0/K2 values to process different COGs or even CORESETs.

The minimum values may be signaled through the PSI dynamically. A PSI per TRP may provide a value for each TRP or COG or CORESET. Alternatively, a single PSI may indicate the minimum values separately for multiple CORESETs or COGs or TRPs by including K0/K2 fields for multiple COGs or TRPs.

When the PSI indicates a value, both K0 and K2 may be jointly updated by UE 101 for that TRP.

It is also contemplated that UE 101 may use the lowest minimum value for K0 and K2 or a default value for K0 and K2 from the set of values configured for its COGs. This may be especially the case if there is not explicit indication in the PSI.

A single value for minimum K0/K2 may be indicated through the PSI to apply to some or all CORESETs configured to UE 101 in a given BWP.

Table 1 provides example abbreviations and definitions that may be disclosed herein.

TABLE 1

Abbreviations and Definitions

| Abbreviations | Definitions |
| --- | --- |
| BFR | Beam Failure Recovery |
| BWP | Bandwidth Part |
| COG | CORESET Group |
| CORESET | Control Resource Set |
| C-RNTI | Cell Radio-Network Temporary Identifier |
| CSI-RS | Channel State Information Reference Signal |
| DL | Downlink |
| DL-SCH | Downlink Shared Channel |
| DMRS | Demodulation Reference Signal |
| eMBB | enhanced Mobile Broadband |
| eNB | Evolved Node B |
| FDD | Frequency Division Duplex |
| FR1 | Frequency region 1 (sub 6 GHz) |
| FR2 | Frequency region 2 (mmWave) |
| gNB | NR NodeB |
| GTS | Go-to-sleep |
| HARQ | Hybrid ARQ |
| LTE | Long Term Evolution |
| MAC | Medium Access Control |
| MCS | Modulation Coding Scheme |
| MTC | Machine-Type Communications |
| mMTC | Massive Machine Type Communication |
| NR | New Radio |
| OS | OFDM Symbol |
| OFDM | Orthogonal Frequency Division Multiplexing |
| PCell | Primary Cell |
| PHY | Physical Layer |
| PRACH | Physical Random Access Channel |
| PSI | Power Savings Indication |
| QCL | Quasi CoLocation |
| RACH | Random Access Channel |
| RAN | Radio Access Network |
| RAP | Random Access Preamble |
| RAR | Random Access Response |
| RRC | Radio Resource Control |
| RS | Reference signal |
| SCell | Secondary Cell |
| SI | System Information |
| SR | Scheduling Request |
| SSSG | Search Space Set Group |
| TB | Transport Block |
| TCI | Transmission Configuration Indicator |
| TDD | Time Division Duplex |
| TRP | Transmission and Reception Point |
| TTI | Transmission Time Interval |
| UE | User Equipment |
| UL | Uplink |
| URLLC | Ultra-Reliable and Low Latency Communications |
| WUS | Wake-up-signal |

FIG. 18 illustrates an exemplary display (e.g., graphical user interface) that may be generated based on the methods, systems, and devices of UE power savings in multi-beam operation, as discussed herein. Display interface 901 (e.g., touch screen display) may provide text in block 902 associated with of UE power savings in multi-beam operation, such as UE power savings in multi-beam operation related parameters, method flow, and UE power savings in multi-beam operation associated current conditions. Progress of any of the steps (e.g., sent messages or success of steps) discussed herein may be displayed in block 902. In addition, graphical output 902 may be displayed on display interface 901. Graphical output 903 may be the topology of the devices implementing the methods, systems, and devices of UE power savings in multi-beam operation, a graphical output of the progress of any method or systems discussed herein, or the like.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to include a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

FIG. 19A illustrates an example communications system 200 in which the methods and apparatuses of UE power savings in multi-beam operation, such as the systems and methods illustrated in FIG. 4 through FIG. 17B described and claimed herein may be used. The communications system 200 may include wireless transmit/receive units (WTRUs) 202a, 202b, 202c, 202d, 202e, 202f, or 202g (which generally or collectively may be referred to as WTRU 202 or WTRUs 202). The communications system 200 may include, a radio access network (RAN) 203/204/205/203b/204b/205b, a core network 206/207/209, a public switched telephone network (PSTN) 208, the Internet 210, other networks 212, and Network Services 213. Network Services 213 may include, for example, a V2X server, V2X functions, a ProSe server, ProSe functions, IoT services, video streaming, or edge computing, etc.

It will be appreciated that the concepts disclosed herein may be used with any number of WTRUs, base stations, networks, or network elements. Each of the WTRUs 202a, 202b, 202c, 202d, 202e, 202f, or 202g may be any type of apparatus or device configured to operate or communicate in a wireless environment. Although each WTRU 202a, 202b, 202c, 202d, 202e, 202f, or 202g may be depicted in FIG. 19A, FIG. 19B, FIG. 19C, FIG. 19D, FIG. 19E, or FIG. 19F as a hand-held wireless communications apparatus, it is understood that with the wide variety of use cases contemplated for 5G wireless communications, each WTRU may comprise or be embodied in any type of apparatus or device configured to transmit or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus, truck, train, or airplane, and the like.

The communications system 200 may also include a base station 214a and a base station 214b. In the example of FIG. 19A, each base stations 214a and 214b is depicted as a single element. In practice, the base stations 214a and 214b may include any number of interconnected base stations or network elements. Base stations 214a may be any type of device configured to wirelessly interface with at least one of the WTRUs 202a, 202b, and 202c to facilitate access to one or more communication networks, such as the core network 206/207/209, the Internet 210, Network Services 213, or the other networks 212. Similarly, base station 214b may be any type of device configured to wiredly or wirelessly interface with at least one of the Remote Radio Heads (RRHs) 218a, 218b, Transmission and Reception Points (TRPs) 219a, 219b, or Roadside Units (RSUs) 220a and 220b to facilitate access to one or more communication networks, such as the core network 206/207/209, the Internet 210, other networks 212, or Network Services 213. RRHs 218a, 218b may be any type of device configured to wirelessly interface with at least one of the WTRUs 202, e.g., WTRU 202c, to facilitate access to one or more communication networks, such as the core network 206/207/209, the Internet 210, Network Services 213, or other networks 212

TRPs 219a, 219b may be any type of device configured to wirelessly interface with at least one of the WTRU 202d, to facilitate access to one or more communication networks, such as the core network 206/207/209, the Internet 210, Network Services 213, or other networks 212. RSUs 220a and 220b may be any type of device configured to wirelessly interface with at least one of the WTRU 202e or 202f, to facilitate access to one or more communication networks, such as the core network 206/207/209, the Internet 210, other networks 212, or Network Services 213. By way of example, the base stations 214a, 214b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 214a may be part of the RAN 203/204/205, which may also include other base stations or network elements (not shown), such as a Base Station Controller (BSC), a Radio Network Controller (RNC), relay nodes, etc. Similarly, the base station 214b may be part of the RAN 203b/204b/205b, which may also include other base stations or network elements (not shown), such as a BSC, a RNC, relay nodes, etc. The base station 214a may be configured to transmit or receive wireless signals within a particular geographic region, which may be referred to as a cell (not shown). Similarly, the base station 214b may be configured to transmit or receive wired or wireless signals within a particular geographic region, which may be referred to as a cell (not shown) for methods, systems, and devices of UE power savings in multi-beam operation, as disclosed herein. Similarly, the base station 214b may be configured to transmit or receive wired or wireless signals within a particular geographic region, which may be referred to as a cell (not shown). The cell may further be divided into cell sectors. For example, the cell associated with the base station 214a may be divided into three sectors. Thus, in an example, the base station 214a may include three transceivers, e.g., one for each sector of the cell. In an example, the base station 214a may employ multiple-input multiple output (MIMO) technology and, therefore, may utilize multiple transceivers for each sector of the cell.

The base stations 214a may communicate with one or more of the WTRUs 202a, 202b, 202c, or 202g over an air interface 215/216/217, which may be any suitable wireless communication link (e.g., radio frequency (RF), microwave, infrared (IR), ultraviolet (UV), visible light, cmWave, mmWave, etc.). The air interface 215/216/217 may be established using any suitable radio access technology (RAT).

The base stations 214b may communicate with one or more of the RRHs 218a, 218b, TRPs 219a, 219b, or RSUs 220a, 220b, over a wired or air interface 215b/216b/217b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 215b/216b/217b may be established using any suitable radio access technology (RAT).

The RRHs 218a, 218b, TRPs 219a, 219b or RSUs 220a, 220b, may communicate with one or more of the WTRUs 202c, 202d, 202e, 202f over an air interface 215c/216c/217c, which may be any suitable wireless communication link (e.g., radio frequency (RF), microwave, infrared (IR), ultraviolet (UV), visible light, cmWave, mmWave, etc.). The air interface 215c/216c/217c may be established using any suitable radio access technology (RAT).

The WTRUs 202a, 202b, 202c, 202d, 202e, or 202f may communicate with one another over an air interface 215d/216d/217d, such as Sidelink communication, which may be any suitable wireless communication link (e.g., radio frequency (RF), microwave, infrared (IR), ultraviolet (UV), visible light, cmWave, mmWave, etc.). The air interface 215d/216d/217d may be established using any suitable radio access technology (RAT).

The communications system 200 may be a multiple access system and may employ one or more channel access schemes, such as CDMA, TDMA, FDMA, OFDMA, SC-FDMA, and the like. For example, the base station 214a in the RAN 203/204/205 and the WTRUs 202a, 202b, 202c, or RRHs 218a, 218b, TRPs 219a, 219b and RSUs 220a, 220b, in the RAN 203b/204b/205b and the WTRUs 202c, 202d, 202e, 202f, may implement a radio technology such as Universal Mobile Telecommunications System (UMTS) Terrestrial Radio Access (UTRA), which may establish the air interface 215/216/217 or 215c/216c/217c respectively using wideband CDMA (WCDMA). WCDMA may include communication protocols such as High-Speed Packet Access (HSPA) or Evolved HSPA (HSPA+). HSPA may include High-Speed Downlink Packet Access (HSDPA) or High-Speed Uplink Packet Access (HSUPA).

In an example, the base station 214a and the WTRUs 202a, 202b, 202c, or RRHs 218a, 218b, TRPs 219a, 219b, or RSUs 220a, 220b in the RAN 203b/204b/205b and the WTRUs 202c, 202d, may implement a radio technology such as Evolved UMTS Terrestrial Radio Access (E-UTRA), which may establish the air interface 215/216/217 or 215c/216c/217c respectively using Long Term Evolution (LTE) or LTE-Advanced (LTE-A). In the future, the air interface 215/216/217 or 215c/216c/217c may implement 3GPP NR technology. The LTE and LTE-A technology may include LTE D2D and V2X technologies and interfaces (such as Sidelink communications, etc.). Similarly, the 3GPP NR technology includes NR V2X technologies and interface (such as Sidelink communications, etc.).

The base station 214a in the RAN 203/204/205 and the WTRUs 202a, 202b, 202c, and 202g or RRHs 218a, 218b, TRPs 219a, 219b or RSUs 220a, 220b in the RAN 203b/204b/205b and the WTRUs 202c, 202d, 202e, 202f may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 214c in FIG. 19A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like, for implementing the methods, systems, and devices of UE power savings in multi-beam operation as disclosed herein. In an example, the base station 214c and the WTRUs 202, e.g., WTRU 202e, may implement a radio technology such as IEEE 802.11 to establish a wireless local area network (WLAN). similarly, the base station 214c and the WTRUs 202d, may implement a radio technology such as IEEE 802.15 to establish a wireless personal area network (WPAN). In yet another example, the base station 214c and the WTRUs 202, e.g., WTRU 202e, may utilize a cellular-based RAT (e.g., WCDMA, CDMA2000, GSM, LTE, LTE-A, NR, etc.) to establish a picocell or femtocell. As shown in FIG. 19A, the base station 214c may have a direct connection to the Internet 210. Thus, the base station 214c may not be required to access the Internet 210 via the core network 206/207/209.

The RAN 203/204/205 or RAN 203b/204b/205b may be in communication with the core network 206/207/209, which may be any type of network configured to provide voice, data, messaging, authorization and authentication, applications, or voice over internet protocol (VoIP) services to one or more of the WTRUs 202a, 202b, 202c, 202d. For example, the core network 206/207/209 may provide call control, billing services, mobile location-based services, pre-paid calling, Internet connectivity, packet data network connectivity, Ethernet connectivity, video distribution, etc., or perform high-level security functions, such as user authentication.

Although not shown in FIG. 19A, it will be appreciated that the RAN 203/204/205 or RAN 203b/204b/205b or the core network 206/207/209 may be in direct or indirect communication with other RANs that employ the same RAT as the RAN 203/204/205 or RAN 203b/204b/205b or a different RAT. For example, in addition to being connected to the RAN 203/204/205 or RAN 203b/204b/205b, which may be utilizing an E-UTRA radio technology, the core network 206/207/209 may also be in communication with another RAN (not shown) employing a GSM or NR radio technology.

The core network 206/207/209 may also serve as a gateway for the WTRUs 202a, 202b, 202c, 202d, 202e to access the PSTN 208, the Internet 210, or other networks 212. The PSTN 208 may include circuit-switched telephone networks that provide plain old telephone service (POTS). The Internet 210 may include a global system of interconnected computer networks and devices that use common communication protocols, such as the transmission control protocol (TCP), user datagram protocol (UDP) and the internet protocol (IP) in the TCP/IP internet protocol suite. The networks 212 may include wired or wireless communications networks owned or operated by other service providers. For example, the networks 212 may include any type of packet data network (e.g., an IEEE 802.3 Ethernet network) or another core network connected to one or more RANs, which may employ the same RAT as the RAN 203/204/205 or RAN 203b/204b/205b or a different RAT.

Some or all of the WTRUs 202a, 202b, 202c, 202d, 202e, and 202f in the communications system 200 may include multi-mode capabilities, e.g., the WTRUs 202a, 202b, 202c, 202d, 202e, and 202f may include multiple transceivers for communicating with different wireless networks over different wireless links for implementing methods, systems, and devices of UE power savings in multi-beam operation, as disclosed herein. For example, the WTRU 202g shown in FIG. 19A may be configured to communicate with the base station 214a, which may employ a cellular-based radio technology, and with the base station 214c, which may employ an IEEE 802 radio technology.

Although not shown in FIG. 19A, it will be appreciated that a User Equipment may make a wired connection to a gateway. The gateway maybe a Residential Gateway (RG). The RG may provide connectivity to a Core Network 206/207/209. It will be appreciated that many of the ideas included herein may equally apply to UEs that are WTRUs and UEs that use a wired connection to connect to a network. For example, the ideas that apply to the wireless interfaces 215, 216, 217 and 215c/216c/217c may equally apply to a wired connection.

FIG. 19B is a system diagram of an example RAN 203 and core network 206 that may implement methods, systems, and devices of UE power savings in multi-beam operation, as disclosed herein. As noted above, the RAN 203 may employ a UTRA radio technology to communicate with the WTRUs 202a, 202b, and 202c over the air interface 215. The RAN 203 may also be in communication with the core network 206. As shown in FIG. 19B, the RAN 203 may include Node-Bs 240a, 240b, and 240c, which may each include one or more transceivers for communicating with the WTRUs 202a, 202b, and 202c over the air interface 215. The Node-Bs 240a, 240b, and 240c may each be associated with a particular cell (not shown) within the RAN 203. The RAN 203 may also include RNCs 242a, 242b. It will be appreciated that the RAN 203 may include any number of Node-Bs and Radio Network Controllers (RNCs.)

As shown in FIG. 19B, the Node-Bs 240a, 240b may be in communication with the RNC 242a. Additionally, the Node-B 240c may be in communication with the RNC 242b. The Node-Bs 240a, 240b, and 240c may communicate with the respective RNCs 242a and 242b via an Iub interface. The RNCs 242a and 242b may be in communication with one another via an Iur interface. Each of the RNCs 242a and 242b may be configured to control the respective Node-Bs 240a, 240b, and 240c to which it is connected. In addition, each of the RNCs 242a and 242b may be configured to carry out or support other functionality, such as outer loop power control, load control, admission control, packet scheduling, handover control, macro-diversity, security functions, data encryption, and the like.

The core network 206 shown in FIG. 19B may include a media gateway (MGW) 244, a Mobile Switching Center (MSC) 246, a Serving GPRS Support Node (SGSN) 248, or a Gateway GPRS Support Node (GGSN) 250. While each of the foregoing elements are depicted as part of the core network 206, it will be appreciated that any one of these elements may be owned or operated by an entity other than the core network operator.

The RNC 242a in the RAN 203 may be connected to the MSC 246 in the core network 206 via an IuCS interface. The MSC 246 may be connected to the MGW 244. The MSC 246 and the MGW 244 may provide the WTRUs 202a, 202b, and 202c with access to circuit-switched networks, such as the PSTN 208, to facilitate communications between the WTRUs 202a, 202b, and 202c, and traditional land-line communications devices.

The RNC 242a in the RAN 203 may also be connected to the SGSN 248 in the core network 206 via an IuPS interface. The SGSN 248 may be connected to the GGSN 250. The SGSN 248 and the GGSN 250 may provide the WTRUs 202a, 202b, and 202c with access to packet-switched networks, such as the Internet 210, to facilitate communications between and the WTRUs 202a, 202b, and 202c, and IP-enabled devices.

The core network 206 may also be connected to the other networks 212, which may include other wired or wireless networks that are owned or operated by other service providers.

FIG. 19C is a system diagram of an example RAN 204 and core network 207 that may implement methods, systems, and devices (e.g., apparatus) of UE power savings in multi-beam operation, as disclosed herein. As noted above, the RAN 204 may employ an E-UTRA radio technology to communicate with the WTRUs 202a, 202b, and 202c over the air interface 216. The RAN 204 may also be in communication with the core network 207.

The RAN 204 may include eNode-Bs 260a, 260b, and 260c, though it will be appreciated that the RAN 204 may include any number of eNode-Bs. The eNode-Bs 260a, 260b, and 260c may each include one or more transceivers for communicating with the WTRUs 202a, 202b, and 202c over the air interface 216. For example, the eNode-Bs 260a, 260b, and 260c may implement MIMO technology. Thus, the eNode-B 260a, for example, may use multiple antennas to transmit wireless signals to, and receive wireless signals from, the WTRU 202a.

Each of the eNode-Bs 260a, 260b, and 260c may be associated with a particular cell (not shown) and may be configured to handle radio resource management decisions, handover decisions, scheduling of users in the uplink or downlink, and the like. As shown in FIG. 19C, the eNode-Bs 260a, 260b, and 260c may communicate with one another over an X2 interface.

The core network 207 shown in FIG. 19C may include a Mobility Management Gateway (MME) 262, a serving gateway 264, and a Packet Data Network (PDN) gateway 266. While each of the foregoing elements are depicted as part of the core network 207, it will be appreciated that any one of these elements may be owned or operated by an entity other than the core network operator.

The MME 262 may be connected to each of the eNode-Bs 260a, 260b, and 260c in the RAN 204 via an S1 interface and may serve as a control node. For example, the MME 262 may be responsible for authenticating users of the WTRUs 202a, 202b, and 202c, bearer activation/deactivation, selecting a particular serving gateway during an initial attach of the WTRUs 202a, 202b, and 202c, and the like. The MME 262 may also provide a control plane function for switching between the RAN 204 and other RANs (not shown) that employ other radio technologies, such as GSM or WCDMA.

The serving gateway 264 may be connected to each of the eNode-Bs 260a, 260b, and 260c in the RAN 204 via the S1 interface. The serving gateway 264 may generally route and forward user data packets to/from the WTRUs 202a, 202b, and 202c. The serving gateway 264 may also perform other functions, such as anchoring user planes during inter-eNode B handovers, triggering paging when downlink data is available for the WTRUs 202a, 202b, and 202c, managing and storing contexts of the WTRUs 202a, 202b, and 202c, and the like.

The serving gateway 264 may also be connected to the PDN gateway 266, which may provide the WTRUs 202a, 202b, and 202c with access to packet-switched networks, such as the Internet 210, to facilitate communications between the WTRUs 202a, 202b, 202c, and IP-enabled devices.

The core network 207 may facilitate communications with other networks. For example, the core network 207 may provide the WTRUs 202a, 202b, and 202c with access to circuit-switched networks, such as the PSTN 208, to facilitate communications between the WTRUs 202a, 202b, and 202c and traditional land-line communications devices. For example, the core network 207 may include, or may communicate with, an IP gateway (e.g., an IP Multimedia Subsystem (IMS) server) that serves as an interface between the core network 207 and the PSTN 208. In addition, the core network 207 may provide the WTRUs 202a, 202b, and 202c with access to the networks 212, which may include other wired or wireless networks that are owned or operated by other service providers.

FIG. 19D is a system diagram of an example RAN 205 and core network 209 that may implement methods, systems, and devices of UE power savings in multi-beam operation, as disclosed herein. The RAN 205 may employ an NR radio technology to communicate with the WTRUs 202a and 202b over the air interface 217. The RAN 205 may also be in communication with the core network 209. A Non-3GPP Interworking Function (N3IWF) 299 may employ a non-3GPP radio technology to communicate with the WTRU 202c over the air interface 298. The N3IWF 299 may also be in communication with the core network 209.

The RAN 205 may include gNode-Bs 280a and 280b. It will be appreciated that the RAN 205 may include any number of gNode-Bs. The gNode-Bs 280a and 280b may each include one or more transceivers for communicating with the WTRUs 202a and 202b over the air interface 217. When integrated access and backhaul connection are used, the same air interface may be used between the WTRUs and gNode-Bs, which may be the core network 209 via one or multiple gNBs. The gNode-Bs 280a and 280b may implement MIMO, MU-MIMO, or digital beamforming technology. Thus, the gNode-B 280a, for example, may use multiple antennas to transmit wireless signals to, and receive wireless signals from, the WTRU 202a. It should be appreciated that the RAN 205 may employ of other types of base stations such as an eNode-B. It will also be appreciated the RAN 205 may employ more than one type of base station. For example, the RAN may employ eNode-Bs and gNode-Bs.

The N3IWF 299 may include a non-3GPP Access Point 280c. It will be appreciated that the N3IWF 299 may include any number of non-3GPP Access Points. The non-3GPP Access Point 280c may include one or more transceivers for communicating with the WTRUs 202c over the air interface 298. The non-3GPP Access Point 280c may use the 802.11 protocol to communicate with the WTRU 202c over the air interface 298.

Each of the gNode-Bs 280a and 280b may be associated with a particular cell (not shown) and may be configured to handle radio resource management decisions, handover decisions, scheduling of users in the uplink or downlink, and the like. As shown in FIG. 19D, the gNode-Bs 280a and 280b may communicate with one another over an Xn interface, for example.

The core network 209 shown in FIG. 19D may be a 5G core network (5GC). The core network 209 may offer numerous communication services to customers who are interconnected by the radio access network. The core network 209 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless or network communications or a computer system, such as system 90 illustrated in FIG. 19G.

In the example of FIG. 19D, the 5G Core Network 209 may include an access and mobility management function (AMF) 272, a Session Management Function (SMF) 274, User Plane Functions (UPFs) 276a and 276b, a User Data Management Function (UDM) 297, an Authentication Server Function (AUSF) 290, a Network Exposure Function (NEF) 296, a Policy Control Function (PCF) 284, a Non-3GPP Interworking Function (N3IWF) 299, a User Data Repository (UDR) 278. While each of the foregoing elements are depicted as part of the 5G core network 209, it will be appreciated that any one of these elements may be owned or operated by an entity other than the core network operator. It will also be appreciated that a 5G core network may not consist of all of these elements, may consist of additional elements, and may consist of multiple instances of each of these elements. FIG. 19D shows that network functions directly connect to one another, however, it should be appreciated that they may communicate via routing agents such as a diameter routing agent or message buses.

In the example of FIG. 19D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 272 may be connected to the RAN 205 via an N2 interface and may serve as a control node. For example, the AMF 272 may be responsible for registration management, connection management, reachability management, access authentication, access authorization. The AMF may be responsible forwarding user plane tunnel configuration information to the RAN 205 via the N2 interface. The AMF 272 may receive the user plane tunnel configuration information from the SMF via an N11 interface. The AMF 272 may generally route and forward NAS packets to/from the WTRUs 202*a*, 202*b*, and 202*c* via an N1 interface. The N1 interface is not shown in FIG. 19D.

The SMF 274 may be connected to the AMF 272 via an N11 interface. Similarly the SMF may be connected to the PCF 284 via an N7 interface, and to the UPFs 276*a* and 276*b* via an N4 interface. The SMF 274 may serve as a control node. For example, the SMF 274 may be responsible for Session Management, IP address allocation for the WTRUs 202*a*, 202*b*, and 202*c*, management and configuration of traffic steering rules in the UPF 276*a* and UPF 276*b*, and generation of downlink data notifications to the AMF 272.

The UPF 276*a* and UPF 176*b* may provide the WTRUs 202*a*, 202*b*, and 202*c* with access to a Packet Data Network (PDN), such as the Internet 210, to facilitate communications between the WTRUs 202*a*, 202*b*, and 202*c* and other devices. The UPF 276*a* and UPF 276*b* may also provide the WTRUs 202*a*, 202*b*, and 202*c* with access to other types of packet data networks. For example, Other Networks 212 may be Ethernet Networks or any type of network that exchanges packets of data. The UPF 276*a* and UPF 276*b* may receive traffic steering rules from the SMF 274 via the N4 interface. The UPF 276*a* and UPF 276*b* may provide access to a packet data network by connecting a packet data network with an N6 interface or by connecting to each other and to other UPFs via an N9 interface. In addition to providing access to packet data networks, the UPF 276 may be responsible packet routing and forwarding, policy rule enforcement, quality of service handling for user plane traffic, downlink packet buffering.

The AMF 272 may also be connected to the N3IWF 299, for example, via an N2 interface. The N3IWF facilitates a connection between the WTRU 202*c* and the 5G core network 270, for example, via radio interface technologies that are not defined by 3GPP. The AMF may interact with the N3IWF 299 in the same, or similar, manner that it interacts with the RAN 205.

The PCF 284 may be connected to the SMF 274 via an N7 interface, connected to the AMF 272 via an N15 interface, and to an Application Function (AF) 288 via an N5 interface. The N15 and N5 interfaces are not shown in FIG. 19D. The PCF 284 may provide policy rules to control plane nodes such as the AMF 272 and SMF 274, allowing the control plane nodes to enforce these rules. The PCF 284 may send policies to the AMF 272 for the WTRUs 202*a*, 202*b*, and 202*c* so that the AMF may deliver the policies to the WTRUs 202*a*, 202*b*, and 202*c* via an N1 interface. Policies may then be enforced, or applied, at the WTRUs 202*a*, 202*b*, and 202*c*.

The UDR 278 may act as a repository for authentication credentials and subscription information. The UDR may connect to network functions, so that network function can add to, read from, and modify the data that is in the repository. For example, the UDR 278 may connect to the PCF 284 via an N36 interface. Similarly, the UDR 278 may connect to the NEF 296 via an N37 interface, and the UDR 278 may connect to the UDM 297 via an N35 interface.

The UDM 297 may serve as an interface between the UDR 278 and other network functions. The UDM 297 may authorize network functions to access of the UDR 278. For example, the UDM 297 may connect to the AMF 272 via an N8 interface, the UDM 297 may connect to the SMF 274 via an N10 interface. Similarly, the UDM 297 may connect to the AUSF 290 via an N13 interface. The UDR 278 and UDM 297 may be tightly integrated.

The AUSF 290 performs authentication related operations and connects to the UDM 278 via an N13 interface and to the AMF 272 via an N12 interface.

The NEF 296 exposes capabilities and services in the 5G core network 209 to Application Functions (AF) 288. Exposure may occur on the N33 API interface. The NEF may connect to an AF 288 via an N33 interface and it may connect to other network functions in order to expose the capabilities and services of the 5G core network 209.

Application Functions 288 may interact with network functions in the 5G Core Network 209. Interaction between the Application Functions 288 and network functions may be via a direct interface or may occur via the NEF 296. The Application Functions 288 may be considered part of the 5G Core Network 209 or may be external to the 5G Core Network 209 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 19D, in a network slicing scenario, a WTRU 202*a*, 202*b*, or 202*c* may connect to an AMF 272, via an N1 interface. The AMF may be logically part of one or more slices. The AMF may coordinate the connection or communication of WTRU 202*a*, 202*b*, or 202*c* with one or more UPF 276*a* and 276*b*, SMF 274, and other network functions. Each of the UPFs 276*a* and 276*b*, SMF 274, and other network functions may be part of the same slice or different slices. When they are part of different slices, they may be isolated from each other in the sense that they may utilize different computing resources, security credentials, etc.

The core network 209 may facilitate communications with other networks. For example, the core network 209 may include, or may communicate with, an IP gateway, such as an IP Multimedia Subsystem (IMS) server, that serves as an interface between the 5G core network 209 and a PSTN 208. For example, the core network 209 may include, or communicate with a short message service (SMS) service center that facilities communication via the short message service. For example, the 5G core network 209 may facilitate the exchange of non-IP data packets between the WTRUs 202a, 202b, and 202c and servers or applications functions 288. In addition, the core network 270 may provide the WTRUs 202a, 202b, and 202c with access to the networks 212, which may include other wired or wireless networks that are owned or operated by other service providers.

The core network entities described herein and illustrated in FIG. 19A, FIG. 19C, FIG. 19D, or FIG. 19E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIG. 19A, FIG. 19B, FIG. 19C, FIG. 19D, or FIG. 19E are provided by way of example only, and it is understood that the subject matter disclosed and claimed herein may be embodied or implemented in any similar communication system, whether presently defined or defined in the future.

FIG. 19E illustrates an example communications system 211 in which the systems, methods, apparatuses that implement UE power savings in multi-beam operation, described herein, may be used. Communications system 211 may include Wireless Transmit/Receive Units (WTRUs) A, B, C, D, E, F, a base station gNB 221, a V2X server 224, and Road Side Units (RSUs) 223a and 223b. In practice, the concepts presented herein may be applied to any number of WTRUs, base station gNBs, V2X networks, or other network elements. One or several or all WTRUs A, B, C, D, E, and F may be out of range of the access network coverage 231. WTRUs A, B, and C form a V2X group, among which WTRU A is the group lead and WTRUs B and C are group members.

WTRUs A, B, C, D, E, and F may communicate with each other over a Uu interface 229 via the gNB 221 if they are within the access network coverage 231. In the example of FIG. 19E, WTRUs B and F are shown within access network coverage 231. WTRUs A, B, C, D, E, and F may communicate with each other directly via a Sidelink interface (e.g., PC5 or NR PC5) such as interface 225a, 225b, or 228, whether they are under the access network coverage 231 or out of the access network coverage 231. For instance, in the example of FIG. 19E, WRTU D, which is outside of the access network coverage 231, communicates with WTRU F, which is inside the coverage 231.

WTRUs A, B, C, D, E, and F may communicate with RSU 223a or 223b via a Vehicle-to-Network (V2N) 233 or Sidelink interface 225b. WTRUs A, B, C, D, E, and F may communicate to a V2X Server 224 via a Vehicle-to-Infrastructure (V2I) interface 227. WTRUs A, B, C, D, E, and F may communicate to another UE via a Vehicle-to-Person (V2P) interface 228.

FIG. 19F is a block diagram of an example apparatus or device WTRU 202 that may be configured for wireless communications and operations in accordance with the systems, methods, and apparatuses that implement UE power savings in multi-beam operation, described herein, such as a WTRU 202 of FIG. 19A, FIG. 19B, FIG. 19C, FIG. 19D, or FIG. 19E, or FIG. 4-FIG. 6D (e.g., UEs). As shown in FIG. 19F, the example WTRU 202 may include a processor 218, a transceiver 220, a transmit/receive element 222, a speaker/microphone 224, a keypad 226, a display/touchpad/indicators 228, non-removable memory 230, removable memory 232, a power source 234, a global positioning system (GPS) chipset 236, and other peripherals 238. It will be appreciated that the WTRU 202 may include any sub-combination of the foregoing elements. Also, the base stations 214a and 214b, or the nodes that base stations 214a and 214b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 19F and may be an exemplary implementation that performs the disclosed systems and methods for UE power savings in multi-beam operation described herein.

The processor 218 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 218 may perform signal coding, data processing, power control, input/output processing, or any other functionality that enables the WTRU 202 to operate in a wireless environment. The processor 218 may be coupled to the transceiver 220, which may be coupled to the transmit/receive element 222. While FIG. 19F depicts the processor 218 and the transceiver 220 as separate components, it will be appreciated that the processor 218 and the transceiver 220 may be integrated together in an electronic package or chip.

The transmit/receive element 222 of UE 201 may be configured to transmit signals to, or receive signals from, a base station (e.g., the base station 214a of FIG. 19A) over the air interface 215/216/217 or another UE over the air interface 215d/216d/217d. For example, the transmit/receive element 222 may be an antenna configured to transmit or receive RF signals. The transmit/receive element 222 may be an emitter/detector configured to transmit or receive IR, UV, or visible light signals, for example. The transmit/receive element 222 may be configured to transmit and receive both RF and light signals. It will be appreciated that the transmit/receive element 222 may be configured to transmit or receive any combination of wireless or wired signals.

In addition, although the transmit/receive element 222 is depicted in FIG. 19F as a single element, the WTRU 202 may include any number of transmit/receive elements 222. More specifically, the WTRU 202 may employ MIMO technology. Thus, the WTRU 202 may include two or more transmit/receive elements 222 (e.g., multiple antennas) for transmitting and receiving wireless signals over the air interface 215/216/217.

The transceiver 220 may be configured to modulate the signals that are to be transmitted by the transmit/receive element 222 and to demodulate the signals that are received by the transmit/receive element 222. As noted above, the WTRU 202 may have multi-mode capabilities. Thus, the transceiver 220 may include multiple transceivers for enabling the WTRU 202 to communicate via multiple RATs, for example NR and IEEE 802.11 or NR and E-UTRA, or to communicate with the same RAT via multiple beams to different RRHs, TRPs, RSUs, or nodes.

The processor 218 of the WTRU 202 may be coupled to, and may receive user input data from, the speaker/microphone 224, the keypad 226, or the display/touchpad/indicators 228 (e.g., a liquid crystal display (LCD) display unit or organic light-emitting diode (OLED) display unit. The processor 218 may also output user data to the speaker/microphone 224, the keypad 226, or the display/touchpad/indicators 228. In addition, the processor 218 may access information from, and store data in, any type of suitable memory, such as the non-removable memory 230 or the removable memory 232. The non-removable memory 230 may include random-access memory (RAM), read-only memory (ROM), a hard disk, or any other type of memory storage device. The removable memory 232 may include a subscriber identity module (SIM) card, a memory stick, a secure digital (SD) memory card, and the like. The processor 218 may access information from, and store data in, memory that is not physically located on the WTRU 202, such as on a server that is hosted in the cloud or in an edge computing platform or in a home computer (not shown). The processor 218 may be configured to control lighting patterns, images, or colors on the display or indicators 228 in response to whether the setup of UE power savings in multi-beam operation in some of the examples described herein are successful or unsuccessful, or otherwise indicate a status of UE power savings in multi-beam operation and associated components. The control lighting patterns, images, or colors on the display or indicators 228 may be reflective of the status of any of the method flows or components in the FIG.'s illustrated or discussed herein (e.g., FIG. 4-FIG. 18D, etc.). Disclosed herein are messages and procedures of UE power savings in multi-beam operation. The messages and procedures may be extended to provide interface/API for users to request resources via an input source (e.g., speaker/microphone 224, keypad 226, or display/touchpad/indicators 228) and request, configure, or query UE power savings in multi-beam operation related information, among other things that may be displayed on display 228.

The processor 218 may receive power from the power source 234, and may be configured to distribute or control the power to the other components in the WTRU 202. The power source 234 may be any suitable device for powering the WTRU 202. For example, the power source 234 may include one or more dry cell batteries, solar cells, fuel cells, and the like.

The processor 218 may also be coupled to the GPS chipset 236, which may be configured to provide location information (e.g., longitude and latitude) regarding the current location of the WTRU 202. In addition to, or in lieu of, the information from the GPS chipset 236, the WTRU 202 may receive location information over the air interface 215/216/217 from a base station (e.g., base stations 214a, 214b) or determine its location based on the timing of the signals being received from two or more nearby base stations. It will be appreciated that the WTRU 202 may acquire location information by way of any suitable location-determination method.

The processor 218 may further be coupled to other peripherals 238, which may include one or more software or hardware modules that provide additional features, functionality, or wired or wireless connectivity. For example, the peripherals 238 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 202 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 202 may connect to other components, modules, or systems of such apparatuses or devices via one or more interconnect interfaces, such as an interconnect interface that may include one of the peripherals 238.

FIG. 19G is a block diagram of an exemplary computing system 90 in which one or more apparatuses of the communications networks illustrated in FIG. 19A, FIG. 19C, FIG. 19D and FIG. 19E as well as UE power savings in multi-beam operation, such as the systems and methods illustrated in FIG. 1 through FIG. 18B described and claimed herein may be embodied, such as certain nodes or functional entities in the RAN 203/204/205, Core Network 206/207/209, PSTN 208, Internet 210, Other Networks 212, or Network Services 213. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, or any other functionality that enables the computing system 90 to operate in a communications network. Coprocessor 81 is an optional processor, distinct from main processor 91, that may perform additional functions or assist processor 91. Processor 91 or coprocessor 81 may receive, generate, and process data related to the methods and apparatuses disclosed herein for power savings operations.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally include stored data that cannot easily be modified. Data stored in RAM 82 may be read or changed by processor 91 or other hardware devices. Access to RAM 82 or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may include peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may include communication circuitry, such as for example a wireless or wired network adapter 97, that may be used to connect computing system 90 to an external communications network or devices, such as the RAN 203/204/205, Core Network 206/207/209, PSTN 208, Internet 210, WTRUs 202, or Other Networks 212 of FIG. 19A, FIG. 19B, FIG. 19C, FIG. 19D, or FIG. 19E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 218 or 91, cause the processor to perform or implement the systems, methods and processes described herein. Specifically, any of the steps, operations, or functions described herein may be implemented in the form of such computer executable instructions, executing on the processor of an apparatus or computing system configured for wireless or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

In describing preferred methods, systems, or apparatuses of the subject matter of the present disclosure—UE power savings in multi-beam operation—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably. In addition, the use of the word "or" is generally used inclusively unless otherwise provided herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims. It is understood that the entities performing the steps illustrated herein, may be logical entities. The steps may be stored in a memory of, and executing on a processor of, a device, server, or computer system such as those illustrated in FIG. 19C or FIG. 19D. Skipping steps, combining steps, or adding steps between exemplary methods disclosed herein is contemplated.

Methods, systems, and apparatuses, among other things, as described herein may provide for means for the following: 1) Multiple CORESETs may be grouped into a CORESET-Group COG; 2) The PSI is transmitted as a control information in a search space associated with a CORESET; 3) UE is instructed to sleep in order to skip monitoring a COG in the active time or wake up to monitor a COG in the active time through a power-savings indication (PSI) that is monitored in the pre-OnDuration-Window (POW) occurring prior to the DRX ON Duration; 4) The CORESETs in a COG may correspond to transmissions from a single TRP; 5) The CORESETs in a COG may correspond to the receptions of single panel of the UE; 6) The CORESETs in a COG may correspond to multiple CORESETs grouped based on UE feedback; 7) A CORESET may belong to multiple COGs; 8) A UE may be configured with multiple COGs; 9) The COGs are configured to the UE through RRC signaling; 10) A CORESET from a COG in which the PSI is received outside the active time indicates the UE to perform power savings as per that PSI in the CORESETs in the COG within the active time; 11) A CORESET from a COG in which the PSI is received within the active time indicates the UE to perform power savings as per that PSI in the CORESETs in that COG within the active time; 12) A PSI received on a CORESET1 from a COG1 may indicate the UE power savings behavior (sleep/skip/wake up) on COG2 to which CORESET1 does not belong to; 13) PSI indicated in COG1 inside or outside the active time may indicate the sleep/wake-up state for COG2 in the active time; 14) PSI received outside the active time may indicate the UE to skip monitoring occasions of a CORESET or a COG or TRP or panel within the active time; 15) PSI received in active time may indicate the UE to skip PDCCH monitoring in N successive monitoring occasions where the occasion belongs to one CORESET or one COG or one TRP or one panel; 16) If the PSI outside the active time indicates a UE to skip monitoring CORESET1, the UE need not monitor CORESET1 even if it is within the ON Duration of the DRX cycle; 17) If the PSI outside the active time indicates a UE to wake up to monitoring CORESET1 occasions, but CORESET1 occasions do not occur within the ON Duration, the UE continues to monitor after the ON Duration even if does not receive a grant in the ON Duration; 18) A single PSI may provide the power savings indication for multiple CORESETs or COGs or TRPs or panels; 19) The PSI received outside the active time may be common to multiple UEs, with the PSI instruction for each UE in a separate field; 20) If a UE does not receive PSI for a pre-determined or pre-configured duration, it may perform one or more beam management procedures such as beam alignment, beam failure detection, and beam failure recovery; 21) The POW is configured as an offset from the DRX On-duration. The POW consists of one or more PDCCH monitoring occasions from one or more beams; 22) Multiple POWs may be configured to a UE; 23) POW parameters such as offset and duration may depend on whether the POW precedes the short DRX cycle or the long DRX cycle; or 24) Minimum values of grant-to-PDSCH (K0) and grant-to-PUSCH (K2) times may be indicated to the UE during the active time. Different K0 and K2 values may be applied to different CORESETs or COGs or TRPs or panels. All combinations in this paragraph and following paragraph (including the removal or combining of steps) are contemplated in a manner that is consistent with the other portions of the detailed description.

Methods, systems, and apparatuses, among other things, as described herein may provide for receiving a wake-up indication from a first transmission and reception point (TRP); and in response to the wake-up indication, waking up to monitor control resource set (CORESET) groups (COGs) of the first TRP and a second TRP. Methods, systems, and apparatuses, among other things, as described herein may provide for receiving a second wake-up indication from the second TRP, wherein the second TRP may be received at approximately the same time as the wake-up indication, and wherein the waking up to monitor the COGs of the first TRP and the second TRP may be based on the receiving of the second wake-up indication from the second TRP. The wake-up indication may be received through repeated transmissions on different CORESETs. Methods, systems, and apparatuses, among other things, as described herein may provide for receiving a second wake-up indication from the second TRP; and based on receiving the second wake-up indication from the second TRP, receiving instructions to not monitor for repeated power-savings indications (PSIs) during a pre-OnDuration-window (POW). The first TRP may be associated with a first COG of the COGs and the second TRP may be associated with a second COG of the COGs. Methods, systems, and apparatuses, among other things, as described herein may provide for receiving a go-to-sleep indication from the second TRP, wherein the first TRP may be associated with a first COG of the COGs and the second TRP may be associated with a second COG of the COGs; and based on receiving the go-to-sleep indication from the second TRP, not monitoring the second COG, while monitoring the first COG. Methods, systems, and apparatuses, among other things, as described herein may provide for receiving a go-to-sleep indication from the first TRP, wherein the first TRP may be associated with a first COG of the COGs and the second TRP may be associated with a second COG of the COGs; and based on receiving the go-to-sleep indication from the first TRP, not monitoring the second COG, while monitoring the first COG. All combinations in this paragraph and the below paragraph (including the removal or combining of steps) are contemplated in a manner that is consistent with the other portions of the detailed description.

A single PSI can be indicated by a (group-common) PDCCH (i.e., for PDCCH, group-common is an example) with a specific DCI format (e.g. the CRC is scramble with a particular RNTI) and this (group-common) PDCCH with the specific DCI format is associated with a CORESET where UE 101 can monitor this CORESET and the configured search space (SS) outside the DRX active window in the default or initial BWP in a serving cell. The PSI in this (group-common) DCI can indicate that UE 101 to switch to a (activated) BWP (i.e., for BWP, activated is an example) for the data transmission in the subsequent DRX cycle. The active DL BWP can be provided by the higher layer (e.g. RRC) configuration and the activated BWP configuration can be modified by either MAC or RRC for UE 101 monitoring UE-specific PDCCH in DRX active cycle. If the active DL BWP in DRX active is configured with single or multiple CORESETs/CORESET group (COG) where each CORESET may be associated to different TRP(s) then UE 101 can monitor the PDCCH(s) from multiple TRP transmission. More specific, UE 101 can receive from multiple TRP with multiple PDSCHs based on the CORESET configuration of the active BWP in DRX active cycle. In this way, even a single DCI can schedule multiple PDSCH from different TRPs with ideal-backhaul. In addition, it can support separate DCI independently schedule different PDSCH from multiple TRPs. After the data transmission is finished within DRX Active Time, network can send another DCI to indicate UE 101 to switch back to the default or initial BWP to save power. Method or systems may provide for monitoring, by a user equipment, a group-common PDCCH for a power-savings indication (PSI); detecting, by the user equipment, a PSI in the group-common PDCCH; and based on the PSI, switching, in a subsequent DRX cycle, an activated BWP for data transmission or reception. All combinations in this paragraph (including the removal or combining of steps) are contemplated in a manner that is consistent with the other portions of the detailed description.

What is claimed:
1. A device that performs wireless communication comprising:
a processor; and
a memory coupled with the processor, the memory comprising executable instructions stored thereon that when executed by the processor cause the processor to effectuate operations comprising:
receiving configuration information indicating a plurality of control resource set (CORESET) information, wherein each respective CORESET information of the plurality of CORESET information comprises a set of power saving parameters;
receiving, using a first set of power saving parameters, a first physical downlink control channel (PDCCH) transmission from a first transmission and reception point (TRP) using a first CORESET information of the plurality of CORESET information;
receiving, using a second set of power saving parameters, second PDCCH transmission from a second TRP using a second CORESET information of the plurality of CORESET information;
receiving a power saving indicator (PSI) from the first TRP indicating a third set of power saving parameters; and receiving additional PDCCH transmissions from the first TRP and the second TRP by:
using the respective CORESET information, and
using the third set of power saving parameters.

2. The device of claim 1, wherein the third set of power saving parameters comprises an indication of a CORESET, a CORESET group, or a TRP in which a monitoring occasion is skipped during an active time.

3. The device of claim 1, wherein the additional PDCCH transmissions comprises a wake-up indication.

4. The device of claim 1, the operations further comprising receiving a second wake-up indication from the second TRP from the second PDCCH transmission.

5. The device of claim 1, wherein the additional PDCCH transmissions comprises a go-to-sleep indication.

6. The device of claim 1, the operations further comprising:
receiving a go-to-sleep indication from the second TRP, wherein the first TRP is associated with a first CORESET group (COG) of a plurality of COGs and the second TRP is associated with a second COG of the plurality of COGs; and
based on receiving the go-to-sleep indication from the second TRP, skip monitoring the second COG that corresponds to an indicated monitoring occasion, while monitoring the first COG.

7. The device of claim 1, the operations further comprising:
based on the the third set of power saving parameters, switching, in a subsequent DRX cycle, an activated BWP for data transmission and reception.

8. A method comprising:
receiving configuration information indicating a plurality of control resource set (CORESET) information, wherein each respective CORESET information of the plurality of CORESET information comprises a set of power saving parameters;
receiving, using a first set of power saving parameters, a first physical downlink control channel (PDCCH) transmission from a first transmission and reception point (TRP) using a first CORESET information of the plurality of CORESET information;
receiving, using a second set of power saving parameters, second PDCCH transmission from a second TRP using a second CORESET information of the plurality of CORESET information;
receiving a power saving indicator (PSI) from the first TRP indicating a third set of power saving parameters; and
receiving additional PDCCH transmissions from the first TRP and the second TRP by:
using the respective CORESET information, and
using the third set of power saving parameters.

9. The method of claim 8, wherein the third set of power saving parameters comprises an indication of a CORESET, a CORESET group, or a TRP in which a monitoring occasion is skipped during an active time.

10. The method of claim 8, wherein the additional PDCCH transmissions comprises a wake-up indication.

11. The method of claim 8, further comprising: receiving a second wake-up indication from the second TRP from the second PDCCH transmission.

12. The method of claim 8, wherein the additional PDCCH transmissions comprises a go-to-sleep indication.

13. The method of claim 8, further comprising:
receiving a go-to-sleep indication from the second TRP, wherein the first TRP is associated with a first CORESET group (COG) of a plurality of COGs and the second TRP is associated with a second COG of the plurality of COGs; and
based on receiving the go-to-sleep indication from the second TRP, skip monitoring the second COG that corresponds to an indicated monitoring occasion, while monitoring the first COG.

14. A computer readable storage medium storing computer executable instructions that when executed by a computing device cause the computing device to effectuate operations comprising:
receiving configuration information indicating a plurality of control resource set (CORESET) information, wherein each respective CORESET information of the plurality of CORESET information comprises a set of power saving parameters;
receiving, using a first set of power saving parameters, a first physical downlink control channel (PDCCH) transmission from a first transmission and reception point (TRP) using a first CORESET information of the plurality of CORESET information;
receiving, using a second set of power saving parameters, second PDCCH transmission from a second TRP using a second CORESET information of the plurality of CORESET information;
receiving a power saving indicator (PSI) from the first TRP indicating a third set of power saving parameters; and
receiving additional PDCCH transmissions from the first TRP and the second TRP by:
using the respective CORESET information, and
using the third set of power saving parameters.

15. The computer readable storage medium of claim 14, wherein the third set of power saving parameters comprises an indication of a CORESET, a CORESET group, or a TRP in which a monitoring occasion is skipped during an active time.

16. The computer readable storage medium of claim 14, wherein the additional PDCCH transmissions comprises a wake-up indication.

17. The computer readable storage medium of claim 14, the operations further comprising: receiving a second wake-up indication from the second TRP from the second PDCCH transmission.

18. The computer readable storage medium of claim 14, additional PDCCH transmissions comprises a go-to-sleep indication.

19. The computer readable storage medium of claim 14, the operations further comprising:
receiving a go-to-sleep indication from the second TRP, wherein the first TRP is associated with a first CORESET group (COG) of a plurality of COGs and the second TRP is associated with a second COG of the plurality of COGs; and
based on receiving the go-to-sleep indication from the second TRP, skip monitoring the second COG that corresponds to an indicated monitoring occasion, while monitoring the first COG.

* * * * *